US010499421B2

(12) United States Patent
Luo et al.

(10) Patent No.: US 10,499,421 B2
(45) Date of Patent: Dec. 3, 2019

(54) TECHNIQUES FOR CONFIGURING PREAMBLE AND OVERHEAD SIGNALS FOR TRANSMISSIONS IN AN UNLICENSED RADIO FREQUENCY SPECTRUM BAND

(71) Applicant: QUALCOMM Incorporated, San Diego, CA (US)

(72) Inventors: Tao Luo, San Diego, CA (US); Shimman Arvind Patel, San Diego, CA (US); Wanshi Chen, San Diego, CA (US); Naga Bhushan, San Diego, CA (US); Yongbin Wei, San Diego, CA (US); Hao Xu, San Diego, CA (US); Aleksandar Damnjanovic, Del Mar, CA (US); Tingfang Ji, San Diego, CA (US); Durga Prasad Malladi, San Diego, CA (US); Srinivas Yerramalli, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 55 days.

(21) Appl. No.: 14/584,149

(22) Filed: Dec. 29, 2014

(65) Prior Publication Data

US 2015/0271847 A1 Sep. 24, 2015

Related U.S. Application Data

(60) Provisional application No. 61/992,174, filed on May 12, 2014, provisional application No. 61/969,080, filed on Mar. 21, 2014.

(51) Int. Cl.
*H04W 74/00* (2009.01)
*H04L 5/00* (2006.01)
(Continued)

(52) U.S. Cl.
CPC ........... *H04W 74/002* (2013.01); *H04L 5/001* (2013.01); *H04L 5/003* (2013.01); *H04L 5/0028* (2013.01);
(Continued)

(58) Field of Classification Search
None
See application file for complete search history.

(56) References Cited

U.S. PATENT DOCUMENTS 5,479,444 A * 12/1995 Malkamaki .......... H04B 7/2656
370/337
8,107,456 B2 * 1/2012 Park .................. H04W 56/0045
370/324
(Continued)

FOREIGN PATENT DOCUMENTS

EP 2015478 A2 1/2009
JP 2000236338 A 8/2000
(Continued)

OTHER PUBLICATIONS

IPEA/EPO, Second Written Opinion of the International Preliminary Examining Authority, Int'l. App. No. PCT/US2015/019463, dated Mar. 22, 2016, European Patent Office, Rijswijk, NL, 9 pgs.
(Continued)

*Primary Examiner* — Ayaz R Sheikh
*Assistant Examiner* — Faiyazkhan Ghafoerkhan
(74) *Attorney, Agent, or Firm* — Dalei Dong; Holland & Hart LLP

(57) ABSTRACT

Techniques are described for wireless communication. A first method includes transmitting a first signal to indicate accessing a first channel in a radio frequency spectrum band, and transmitting information with the first signal in the radio frequency spectrum band. A second method includes winning contention to access a radio frequency spectrum band, and after the winning contention to access the radio frequency spectrum band, transmitting a first signal to align a starting point of a second signal with a reference boundary associated with the radio frequency spectrum band. A third method includes winning contention to access a radio frequency spectrum band during a first frame period, the first frame selected from a plurality of different frame periods, and transmitting a signal at a periodicity during one or more
(Continued)

subframes of the first frame period for each of the plurality of different frame periods.

11 Claims, 34 Drawing Sheets

(51) Int. Cl.
| | |
|---|---|
| *H04W 56/00* | (2009.01) |
| *H04W 74/08* | (2009.01) |
| *H04L 5/14* | (2006.01) |
| *H04L 27/26* | (2006.01) |

(52) U.S. Cl.
CPC .......... *H04L 5/0053* (2013.01); *H04L 5/0064* (2013.01); *H04L 5/0091* (2013.01); *H04L 5/0092* (2013.01); *H04L 5/14* (2013.01); *H04L 27/261* (2013.01); *H04L 27/2613* (2013.01); *H04W 56/00* (2013.01); *H04W 74/0808* (2013.01); *H04W 74/0833* (2013.01); *H04L 5/0023* (2013.01)

(56) References Cited

U.S. PATENT DOCUMENTS

| | | | | |
|---|---|---|---|---|
| 8,649,366 | B2* | 2/2014 | Park | H04W 56/0045 370/324 |
| 9,049,655 | B2* | 6/2015 | Park | H04W 56/0045 |
| 9,220,115 | B2* | 12/2015 | Bhushan | H04W 74/08 |
| 9,345,047 | B2* | 5/2016 | Damnjanovic | H04W 74/08 |
| 2004/0085917 | A1* | 5/2004 | Fitton | H04L 1/0061 370/292 |
| 2005/0277423 | A1* | 12/2005 | Sandhu | H04B 7/0851 455/450 |
| 2008/0137760 | A1* | 6/2008 | Forck | H04B 7/04 375/260 |
| 2008/0310396 | A1* | 12/2008 | Park | H04W 56/0045 370/350 |
| 2009/0040974 | A1* | 2/2009 | Goldhamer | H04W 74/02 370/329 |
| 2009/0067448 | A1 | 3/2009 | Stanwood et al. | |
| 2009/0154602 | A1* | 6/2009 | Furman | H04L 7/042 375/324 |
| 2010/0014460 | A1* | 1/2010 | Shin | H04J 3/0679 370/328 |
| 2010/0232310 | A1 | 9/2010 | Hu | |
| 2010/0290360 | A1* | 11/2010 | Ge | H04L 27/2657 370/252 |
| 2012/0087328 | A1* | 4/2012 | Park | H04W 56/0045 370/329 |
| 2012/0140664 | A1* | 6/2012 | Walton | H04B 7/0413 370/252 |
| 2012/0207036 | A1* | 8/2012 | Ong | H04W 74/0816 370/252 |
| 2012/0230205 | A1* | 9/2012 | An | H04W 52/0216 370/242 |
| 2012/0250636 | A1* | 10/2012 | Wang | H04W 72/08 370/329 |
| 2012/0281792 | A1* | 11/2012 | Swarts | H04J 11/0069 375/343 |
| 2012/0294233 | A1* | 11/2012 | Radunovic | H04L 27/0006 370/328 |
| 2013/0088992 | A1* | 4/2013 | Moorti | H04B 1/38 370/252 |
| 2013/0203458 | A1 | 8/2013 | Charbit et al. | |
| 2013/0208587 | A1 | 8/2013 | Bala et al. | |
| 2013/0272262 | A1* | 10/2013 | Li | H04W 28/02 370/330 |
| 2013/0308486 | A1* | 11/2013 | Moorti | H04B 1/38 370/252 |
| 2014/0044105 | A1* | 2/2014 | Bontu | H04L 5/001 370/336 |
| 2014/0044120 | A1* | 2/2014 | Park | H04W 56/0045 370/350 |
| 2014/0314048 | A1* | 10/2014 | Yi | H04W 36/0072 370/332 |
| 2014/0341018 | A1 | 11/2014 | Bhushan et al. | |
| 2014/0362794 | A1* | 12/2014 | Zhao | H04W 56/0045 370/329 |
| 2015/0163805 | A1 | 6/2015 | Cattoni et al. | |
| 2015/0195849 | A1 | 7/2015 | Bashar et al. | |
| 2015/0222336 | A1* | 8/2015 | Yilmaz | H04B 7/024 370/252 |
| 2015/0223183 | A1* | 8/2015 | Park | H04W 56/0045 370/350 |
| 2015/0271847 | A1* | 9/2015 | Luo | H04W 74/002 370/329 |
| 2015/0326350 | A1* | 11/2015 | Macikunas | G01S 5/0027 714/776 |
| 2015/0326369 | A1 | 11/2015 | Kim et al. | |
| 2015/0341921 | A1* | 11/2015 | Chen | H04W 72/0413 370/330 |
| 2015/0349931 | A1* | 12/2015 | Damnjanovic | H04L 5/0007 370/280 |
| 2016/0095018 | A1* | 3/2016 | Vajapeyam | H04W 36/0005 370/331 |
| 2016/0164644 | A1 | 6/2016 | Charbit et al. | |
| 2016/0174257 | A1 | 6/2016 | Webb | |
| 2016/0174263 | A1 | 6/2016 | Webb | |
| 2016/0249384 | A1 | 8/2016 | Di Girolamo et al. | |
| 2016/0380685 | A1* | 12/2016 | Kasher | H04B 7/0617 370/329 |
| 2016/0381708 | A1* | 12/2016 | Li | H04W 28/02 370/330 |
| 2017/0085346 | A1* | 3/2017 | Tiirola | H04W 28/26 |
| 2017/0251495 | A1 | 8/2017 | Webb | |
| 2018/0167974 | A1* | 6/2018 | Li | H04W 28/02 |
| 2018/0270815 | A1 | 9/2018 | Bala et al. | |
| 2019/0246422 | A1 | 8/2019 | Luo et al. | |

FOREIGN PATENT DOCUMENTS

| | | |
|---|---|---|
| JP | 2014014117 A | 1/2014 |
| WO | WO-2013167557 A1 | 11/2013 |

OTHER PUBLICATIONS

ETRI, "Design of Variable-Length Preamble for Modified LBE and Fine Frequency/Time," 3GPP TSG-RAN1#80, Athens, Greece, R1-150647, Feb. 9-13, 2015, 6 pgs., XP_50933849A, 3rd Generation Partnership Project.

ETRI, "Preamble Field for Time-Aligned Load Based Equipment Type LBT Mechanism," 3GPP TSG-RAN1#79, San Francisco, USA, R1-144919, Nov. 17-21, 2014, 5 pgs., XP_50875973A, 3rd Generation Partnership Project.

Goldhamer, "Topics Related to EN 301 893," ETSI TC BRAN, BRAN(14)000020, BRAN-RCWG, Feb. 4, 2014, 4 pgs., XP_14196443A, Israel Association of Electronics & Software Industries (IAESI).

ISA/EPO, International Search Report and Written Opinion of the International Searching Authority, Int'l App. No. PCT/US2015/019463, dated Aug. 31, 2015, European Patent Office, Rijswijk, NL, 23 pgs.

QUALCOMM Incorporated, "Candidate Solutions for LAA-LTE," 3GPP TSG RAN WG1 #79, San Francisco, USA, R1-145084, Nov. 17-21, 2014, 7 pgs., XP_50876118A, 3rd Generation Partnership Project.

ISA/EPO, Partial International Search Report of the International Searching Authority, Int'l Appl. No. PCT/US2015/019463, dated Jun. 2, 2015, European Patent Office, Rijswijk, NL, 5 pgs.

Sesia et al, LTE—the UMTS Long Term Evolution: From Theory to Practice, Second Edition, Aug. 2011, 15 pgs. (Cover, 168-169, 202-203, 348-349, 370-373, 376-377, 384-385), XP_002739351, ISBN 978-0470660256, John Wiley & Sons Ltd., West Sussex, UK.

* cited by examiner

TECHNIQUES FOR CONFIGURING PREAMBLE AND OVERHEAD SIGNALS FOR TRANSMISSIONS IN AN UNLICENSED RADIO FREQUENCY SPECTRUM BAND

CROSS REFERENCES

The present application for patent claims priority to U.S. Provisional Patent Application No. 61/969,080 by Luo et al., entitled "Techniques for Configuring Preamble and Overhead Signals for Transmissions in an Unlicensed Radio Frequency Spectrum Band," filed Mar. 21, 2014, and U.S. Provisional Patent Application No. 61/992,174 by Luo et al., entitled "Techniques for Configuring Preamble and Overhead Signals for Transmissions in an Unlicensed Radio Frequency Spectrum Band," filed May 12, 2014, assigned to the assignee hereof, and which are hereby incorporated by reference in its entirety.

FIELD OF THE DISCLOSURE

The present disclosure, for example, relates to wireless communication systems, and more particularly to techniques for configuring preamble and overhead signals for transmissions in a radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple UEs. A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Also, a plurality of mobile network operators may compete with each other to access a shared licensed radio frequency spectrum which the operators are authorized to access. Prior to gaining access to and transmitting data over the licensed radio frequency spectrum band, a transmitting apparatus may, in some examples, perform a listen before talk (LBT) procedure to gain access to the radio frequency spectrum band. An LBT procedure may include performing a clear channel assessment (CCA) to determine whether a channel of the radio frequency spectrum band is available. When it is determined that the channel of the radio frequency spectrum band is not available (e.g., because another device is already using the channel of the radio frequency spectrum band), a CCA may be performed for the channel again at a later time.

In some cases, transmissions by one or more nodes over a radio frequency spectrum band (e.g., Wi-Fi nodes and/or nodes of other operators) may prevent a base station or UE from gaining access to the radio frequency spectrum, resulting in the base station or UE being "starved" of use of the radio frequency spectrum band. In some cases, this starvation problem may be mitigated by using an LBT protocol configured for load based equipment (LBT-LBE) instead of an LBT protocol configured for frame based equipment (LBT-FBE). In an LBT-LBE protocol, an extended CCA procedure including a plurality of N CCA procedures may be performed. The extended CCA procedure performed in conjunction with an LBT-LBE protocol may provide a base station or UE a better chance to gain access to a radio frequency spectrum band (e.g., compared to a single CCA procedure performed in conjunction with an LBT-FBE protocol).

SUMMARY

The present disclosure, for example, relates to one or more techniques for configuring preamble and overhead signals for transmissions in a radio frequency spectrum band. In some examples, the techniques may include transmitting information in a preamble signal in a radio frequency spectrum band. The transmitted information may aid a receiving apparatus in decoding a transmission that follows the information and/or enable the receiving apparatus to conserve power, etc. In some examples, the techniques may include transmitting a first signal to align a starting point of a second signal with a reference boundary associated with a radio frequency spectrum band. The first signal may be transmitted after winning contention to access the radio frequency spectrum band. The first signal may be used, for example, to reserve the channel and/or transmit information over the channel. In some examples, the techniques may include transmitting a signal to convert a location of overhead signals in relation to the timing of a radio frame boundary. In some examples, the techniques may include configuring one or more overhead channel transmissions at a periodicity, at a time or times and/or at a frequency location and/or locations, regardless of the duration (e.g., two milliseconds, five milliseconds, and/or ten milliseconds) of an LBT radio frame period in which an LBT procedure occurs. This may, in some examples, reduce the processing burden associated with the overhead transmissions.

In a first set of illustrative examples, a method for wireless communication is described. In one example, the method may include transmitting a first signal to indicate accessing a first channel in a radio frequency spectrum band, and transmitting information with the first signal in the radio frequency spectrum band.

In some examples of the method, the information may include system information. In some examples, the information may indicate a frame structure for transmission in the radio frequency spectrum band. In some examples, the information may indicate an uplink configuration or a downlink configuration for transmission in the radio frequency spectrum band. In some examples, the information may indicate a number of subframes of a frame that are used for transmission in the radio frequency spectrum band.

In some examples of the method, the transmitting information with the first signal may include transmitting information as part of the first signal. The first signal may, in some examples, be generated based at least in part on a sequence. The sequence may, in some examples, be a function of the information. In some examples, the information may include a cell identifier (ID), a public land mobile network ID, or a combination thereof.

In some examples of the method, the transmitting information with the first signal may include transmitting information in a second signal along with the first signal. The second signal may be separate from the first signal.

In some examples, the method may include selecting a first phase from among a plurality of phases for transmission of the first signal. Different phases of the plurality of phases may correspond to different information. In these examples, the transmitting information with the first signal may include transmitting the first signal at the first phase.

In some examples, the first signal and the information may be transmitted during a single orthogonal frequency-division multiplexing (OFDM) symbol period of the radio frequency spectrum band.

In some examples, the first signal may be transmitted during a first OFDM symbol period of the radio frequency spectrum band and a second OFDM symbol period of the radio frequency spectrum band, and the information may be transmitted during the second OFDM symbol period. In these examples, the method may include transmitting a second signal carrying the information during the second OFDM symbol period of the radio frequency spectrum band. In these latter examples, the first signal may provide a phase reference for the second signal.

In some examples, the information may indicate a number of antennas to use for receiving a transmission carried on a component carrier in the radio frequency spectrum band. In these examples, the method may include adjusting a modulation and coding scheme (MCS) for transmission of the component carrier in the radio frequency spectrum band based at least in part on the number of antennas to use to receive the component carrier in the radio frequency spectrum band. In some examples, the number of antennas to use for receiving a transmission carried on the component carrier in the radio frequency spectrum band may be determined based at least in part on an uplink configuration or a downlink configuration associated with the component carrier. In some examples, the number of antennas to use for receiving a transmission carried on the component carrier in the radio frequency spectrum band may be determined based at least in part on a clear channel assessment (CCA) procedure associated with each of a plurality of component carriers used to serve a user equipment (UE). In some examples, the method may include selecting the number of antennas to use for receiving a transmission carried on the component carrier in the radio frequency spectrum band for each subframe of a frame of the component carrier in the radio frequency spectrum band.

In a second set of illustrative examples, an apparatus for wireless communication is described. In one example, the apparatus may include means for transmitting a first signal to indicate accessing a first channel in a radio frequency spectrum band, and means for transmitting information with the first signal in the radio frequency spectrum band. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to transmit a first signal to indicate accessing a first channel in a radio frequency spectrum band, and to transmit information with the first signal in the radio frequency spectrum band. In some examples, the instructions may also be executable by the processor to implement one or more aspects of the method for wireless communication described above with respect to the first set of illustrative examples.

In a fourth set of illustrative examples, a computer program product for communication by a wireless communication apparatus in a wireless communication system is described. In one example, the computer program product may include a non-transitory computer-readable medium storing instructions executable by a processor to cause the wireless communication apparatus to transmit a first signal to indicate accessing a first channel in a radio frequency spectrum band, and to transmit information with the first signal in the radio frequency spectrum band. In some examples, the instructions may also be executable by the processor to cause the wireless communication apparatus to implement one or more aspects of the method for wireless communication described above with respect to the first set of illustrative examples.

In a fifth set of illustrative examples, a method for wireless communication is described. In one example, the method may include winning contention to access a radio frequency spectrum band. The method may also include, after the winning contention to access the radio frequency spectrum band, transmitting a first signal to align a starting point of a second signal with a reference boundary associated with the radio frequency spectrum band.

In some examples, the method may include accessing timing information, and determining the reference boundary based at least in part on the timing information and the winning contention to access the radio frequency spectrum band.

In some examples of the method, the first signal may include a variable length training sequence. In some examples, the first signal may include a variable length training sequence and at least one fixed length training sequence.

In some examples, the method may include transmitting information as part of the first signal.

In some examples, the first signal may be usable for automatic gain control (AGC) by a user equipment (UE).

In some examples, the method may include operating in an LBT-LBE mode of operation in the radio frequency spectrum band. In some examples of the method, the reference boundary may include a boundary of an OFDM symbol period. In these examples, the first signal may be associated with a contention priority, and the first signal may be transmitted during a portion of the OFDM symbol period based at least in part on the contention priority. In some examples of the method, the reference boundary may include a boundary of a slot of a frame associated with the radio frequency spectrum band. In some examples of the method, the reference boundary may include a boundary of a subframe of a frame associated with the radio frequency spectrum band.

In some examples of the method, the second signal may include a signal indicating the winning contention to access the radio frequency spectrum band. In some examples, the first signal may be transmitted before the second signal.

In a sixth set of illustrative examples, an apparatus for wireless communication is described. In one example, the apparatus may include means for winning contention to access a radio frequency spectrum band. The apparatus may also include means for, after the winning contention to access the radio frequency spectrum band, transmitting a first signal to align a starting point of a second signal with a reference boundary associated with the radio frequency spectrum band. In some examples, the apparatus may further include means for implementing one or more aspects of the method for wireless communication described above with respect to the fifth set of illustrative examples.

In a seventh set of illustrative examples, another apparatus for wireless communication is described. In one example, the apparatus may include a processor, memory in electronic communication with the processor, and instructions stored in the memory. The instructions may be executable by the processor to win contention to access a radio frequency spectrum band. The instructions may also be executable by the processor to, after winning contention to access the radio frequency spectrum band, transmit a first signal to align a starting point of a second signal with a reference boundary associated with the radio frequency spectrum band. In some examples, the instructions may also be executable by the processor to implement one or more aspects of the method for wireless communication described above with respect to the fifth set of illustrative examples.

In an eighth set of illustrative examples, a computer program product for communication by a wireless communication apparatus in a wireless communication system is described. In one example, the computer program product may include a non-transitory computer-readable medium storing instructions executable by a processor to cause the wireless communication apparatus to win contention to access a radio frequency spectrum band. The instructions may also be executable by the processor to cause the wireless communication apparatus to, after winning contention to access the radio frequency spectrum band, transmit a first signal to align a starting point of a second signal with a reference boundary associated with the radio frequency spectrum band. In some examples, the instructions may also be executable by the processor to cause the wireless communication apparatus to implement one or more aspects of the method for wireless communication described above with respect to the fifth set of illustrative examples.

In a ninth set of illustrative examples, a method for wireless communication is described. In one example, the method may include winning contention to access a radio frequency spectrum band during a first frame period. The first frame may be selected from a plurality of different frame periods. The method may also include transmitting a signal at a periodicity during one or more subframes of the first frame period for each of the plurality of different frame periods.

In some examples of the method, the periodicity may be a fixed periodicity.

In some examples of the method, the transmitting the signal at the periodicity may include transmitting the signal at a fixed time and a fixed frequency location.

In some examples of the method, the signal may be transmitted in an overhead channel.

In some examples of the method, the first frame period may include a listen before talk (LBT) frame period.

In some examples, the method may include determining whether the signal collides with a timing of a contention procedure, and preventing transmission of the signal based at least in part on the determination that the signal collides with the timing of the contention procedure.

In a tenth set of illustrative examples, an apparatus for wireless communication is described. In one example, the apparatus may include means for winning contention to access a radio frequency spectrum band during a first frame period. The first frame may be selected from a plurality of different frame periods. The apparatus may also include means for transmitting a signal at a periodicity during one or more subframes of the first frame period for each of the plurality of different frame periods. In some examples, the apparatus may further include means for implementing one or more aspects of the method for wireless communication described above with respect to the ninth set of illustrative examples.

In an eleventh set of illustrative examples, another apparatus for wireless communication is described. In one example, the apparatus may include a processor, memory in electronic communication with the processor, and instructions stored in the memory. The instructions may be executable by the processor to win contention to access a radio frequency spectrum band during a first frame period. The first frame may be selected from a plurality of different frame periods. The instructions may also be executable by the processor to transmit a signal at a periodicity during one or more subframes of the first frame period for each of the plurality of different frame periods. In some examples, the instructions may also be executable by the processor to implement one or more aspects of the method for wireless communication described above with respect to the ninth set of illustrative examples.

In a twelfth set of illustrative examples, a computer program product for communication by a wireless communication apparatus in a wireless communication system is described. In one example, the computer program product may include a non-transitory computer-readable medium storing instructions executable by a processor to cause the wireless communication apparatus to win contention to access a radio frequency spectrum band during a first frame period. The first frame may be selected from a plurality of different frame periods. The instructions may also be executable by the processor to cause the wireless communication apparatus to transmit a signal at a periodicity during one or more subframes of the first frame period for each of the plurality of different frame periods. In some examples, the instructions may also be executable by the processor to cause the wireless communication apparatus to implement one or more aspects of the method for wireless communication described above with respect to the ninth set of illustrative examples.

In a thirteenth set of illustrative examples, another method for wireless communication is described. In one example, the method may include winning contention to access a radio frequency spectrum band; after the winning contention to access the radio frequency spectrum band, transmitting a first signal to indicate a timing of a radio frame boundary associated with the radio frequency spectrum band; and transmitting a second signal to convey location information for overhead signals in relation to the timing of the radio frame boundary.

In some examples of the method, the second signal may include radio resource control (RRC) signaling. In some examples of the method, the second signal may convey location information for a downlink control channel in relation to the radio frame boundary. In some examples, the second signal may convey location information for resources used for channel state information (CSI) feedback.

In some examples, the method may include operating in a listen-before-talk (LBT) load based equipment (LBE)

mode of operation over the radio frequency spectrum band. In some examples, the first signal may include the second signal.

In a fourteenth set of illustrative examples, an apparatus for wireless communication is described. In one example, the apparatus may include means for winning contention to access a radio frequency spectrum band; means for transmitting, after the winning contention to access the radio frequency spectrum band, a first signal to indicate a timing of a radio frame boundary associated with the radio frequency spectrum band; and means for transmitting a second signal to convey location information for overhead signals in relation to the timing of the radio frame boundary. In some examples, the apparatus may further include means for implementing one or more aspects of the method for wireless communication described above with respect to the thirteenth set of illustrative examples.

In a fifteenth set of illustrative examples, another apparatus for wireless communication is described. In one example, the apparatus may include a processor, memory in electronic communication with the processor, and instructions stored in the memory. The instructions may be executable by the processor to win contention to access a radio frequency spectrum band; to transmit, after the winning contention to access the radio frequency spectrum band, a first signal to indicate a timing of a radio frame boundary associated with the radio frequency spectrum band; and to transmit a second signal to convey location information for overhead signals in relation to the timing of the radio frame boundary. In some examples, the instructions may also be executable by the processor to implement one or more aspects of the method for wireless communication described above with respect to the thirteenth set of illustrative examples.

In a sixteenth set of illustrative examples, a computer program product for communication by a wireless communication apparatus in a wireless communication system is described. In one example, the computer program product may include a non-transitory computer-readable medium storing instructions executable by a processor to cause the wireless communication apparatus to win contention to access a radio frequency spectrum band; to transmit, after the winning contention to access the radio frequency spectrum band, a first signal to indicate a timing of a radio frame boundary associated with the radio frequency spectrum band; and to transmit a second signal to convey location information for overhead signals in relation to the timing of the radio frame boundary. In some examples, the instructions may also be executable by the processor to cause the wireless communication apparatus to implement one or more aspects of the method for wireless communication described above with respect to the thirteenth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
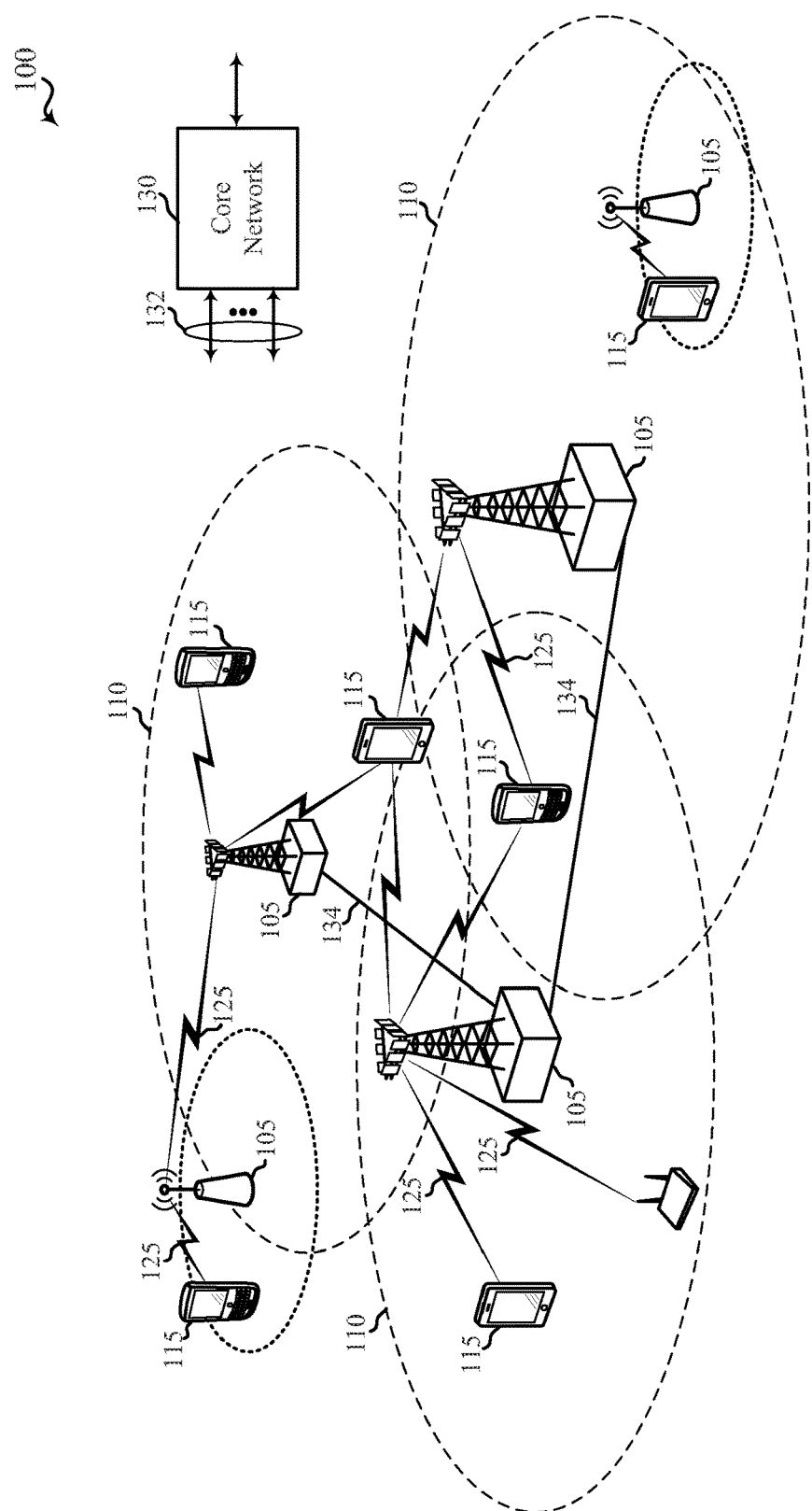
FIG. 1 shows a block diagram of a wireless communication system, in accordance with various aspects of the present disclosure.

Techniques are described in which preamble and/or overhead signals are configured for transmissions in a radio frequency spectrum band (e.g., an unlicensed radio frequency spectrum band for which apparatuses may need to contend for access because the radio frequency spectrum band is available for unlicensed use, such as Wi-Fi use, or a shared licensed radio frequency band which a plurality of mobile network operators are authorized to access). In some examples, the radio frequency spectrum band may be used for cellular communications (e.g., Long Term Evolution (LTE) communications and/or LTE-Advanced (LTE-A) communications).

With increasing data traffic in cellular networks, the offloading of at least some data traffic to a radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. Prior to gaining access to, and communicating data over, the radio frequency spectrum band, a transmitting apparatus may, in some examples, perform an LBT procedure to gain access to the radio frequency spectrum band. Such an LBT procedure may include performing a CCA to determine whether a channel of the radio frequency spectrum band is available. When it is determined that a channel is not available, a CCA may be performed for the channel again at a later time.

In some examples of the described techniques, information (e.g., N bits of information) may be transmitted over a channel in a radio frequency spectrum band by transmitting the information with a signal that indicates accessing (e.g., the reserving of) the channel in the radio frequency spectrum band. In an example, the information may be transmitted as part of the signal that indicates accessing the channel in the radio frequency spectrum band. In another example, the information may be transmitted as a separate signal along with the signal that indicates accessing the channel in the radio frequency spectrum band. The transmitted information may aid a receiving apparatus in decoding a transmission that follows the information and/or enable the receiving apparatus to conserve power, etc.

In some examples of the described techniques, a first signal may be transmitted when a successful contention procedure (e.g., an LBT procedure) concludes before a reference boundary associated with a radio frequency spectrum band (e.g., before a boundary of a next orthogonal frequency-division multiplexing (OFDM) symbol period associated with the radio frequency spectrum band, a boundary of a slot of a frame associated with the radio frequency spectrum band, and/or a boundary of a subframe of a frame associated with the radio frequency spectrum band). The first signal may be used to align a starting point of a second signal with the reference boundary associated with the radio frequency spectrum band. In some examples, the commencement of the first signal may not coincide with a reference boundary of the radio frequency spectrum band, and the length of the first signal may be variable due to variances in the timing between when a contention procedure is performed and when a reference boundary (e.g., a boundary of a next OFDM symbol period) occurs.

In some examples of the described techniques, one or more overhead channel transmissions (e.g., eCRS and/or CSI-RS transmissions) may be transmitted with a periodicity, at a time or times and/or at a frequency location and/or locations, regardless of the duration (e.g., two milliseconds, five milliseconds, and/or ten milliseconds) of an LBT radio frame period. For example, one or more overhead channel transmissions may be made during one or more subframes regardless of the duration of an LBT radio frame in which the subframes occur.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses may not contend for access because the spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as Wi-Fi use). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a particular mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and/or a standalone mode in which LTE/LTE-A downlink and uplink communications between a base station 105 and a UE 115 may take place in an unlicensed radio frequency spectrum band. Base stations 105 as well as UEs 115 may in some examples support one or more of these or similar modes of operation. OFDMA waveforms may be used in the communication links 125 for LTE/LTE-A downlink communications in a licensed radio frequency spectrum band and/or an unlicensed radio frequency spectrum band, while OFDMA, SC-FDMA and/or resource block interleaved FDMA waveforms may be used in the communication links 125 for LTE/LTE-A uplink communications in a licensed radio frequency spectrum band and/or an unlicensed radio frequency spectrum band.

Figure 2:
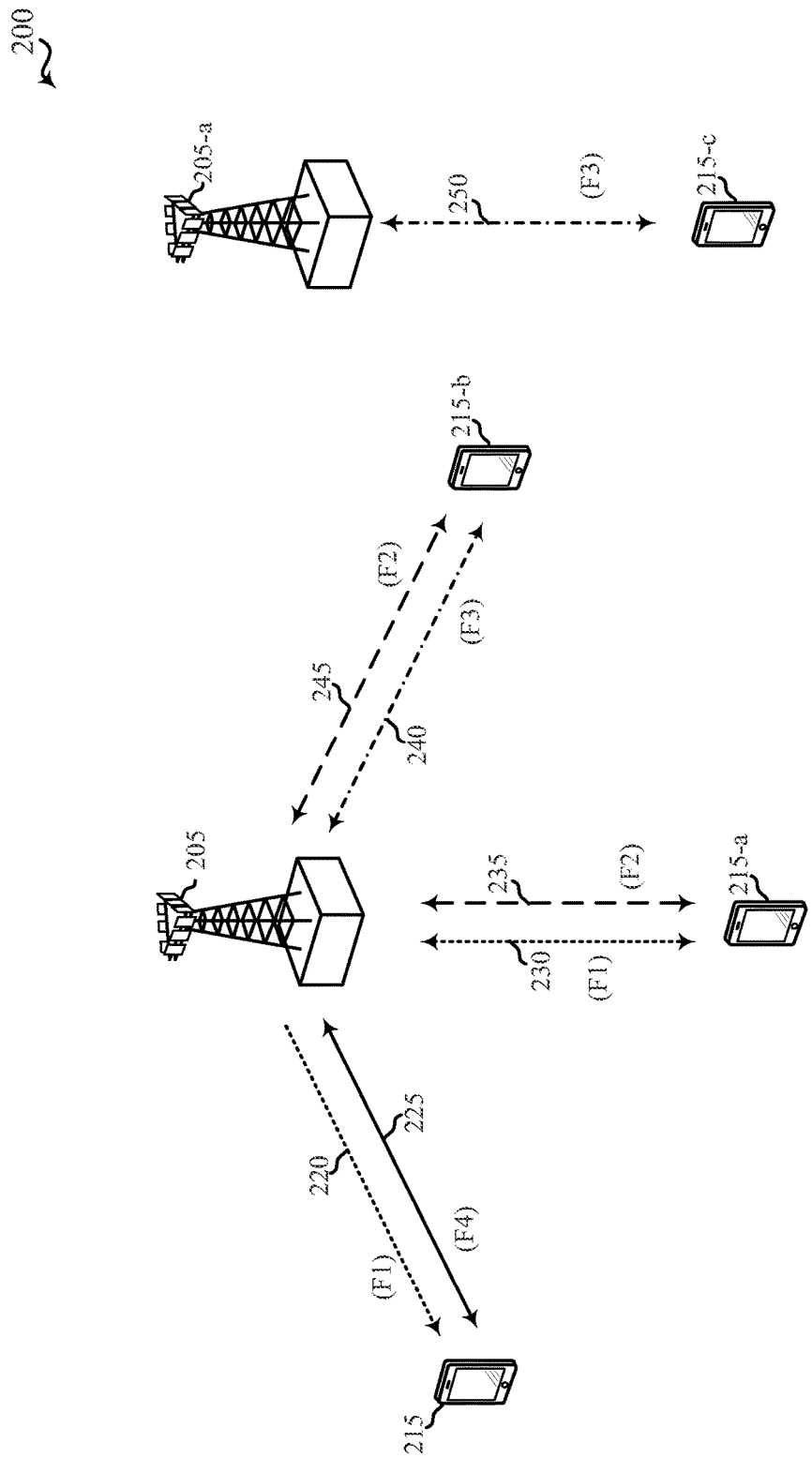
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using shared access radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-a may transmit OFDMA waveforms to the fourth UE 215-c using a bidirectional link 250 and may receive OFDMA waveforms, SC-FDMA waveforms, and/or resource block interleaved FDMA waveforms from the fourth UE 215-c using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, and/or 205-a described with reference to FIGS. 1 and/or 2, and/or one of the UEs 115, 215, 215-a, 215-b, and/or 215-c described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA) procedure. The outcome of the CCA procedure may indicate to the transmitting device whether a channel of an unlicensed radio frequency spectrum band is available or in use for the gating interval (also referred to as an LBT radio frame or a CCA frame). When a CCA procedure indicates that the channel is available (e.g., "clear" for use) for a corresponding LBT radio frame, the transmitting apparatus may reserve and/or use the channel of the unlicensed radio frequency spectrum band during part or all of the LBT radio frame. When the CCA procedure indicates that the channel is not available (e.g., that the channel is in use or reserved by another apparatus), the transmitting apparatus may be prevented from using the channel during the LBT radio frame.

In some cases, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in an unlicensed radio frequency spectrum band, and to synchronize at least one boundary of the periodic gating interval with at least one boundary of a periodic frame structure (e.g., a periodic LTE/LTE-A radio frame structure) associated with the cellular downlink. Examples of such synchronization are shown in FIG. 3.

Figure 3:
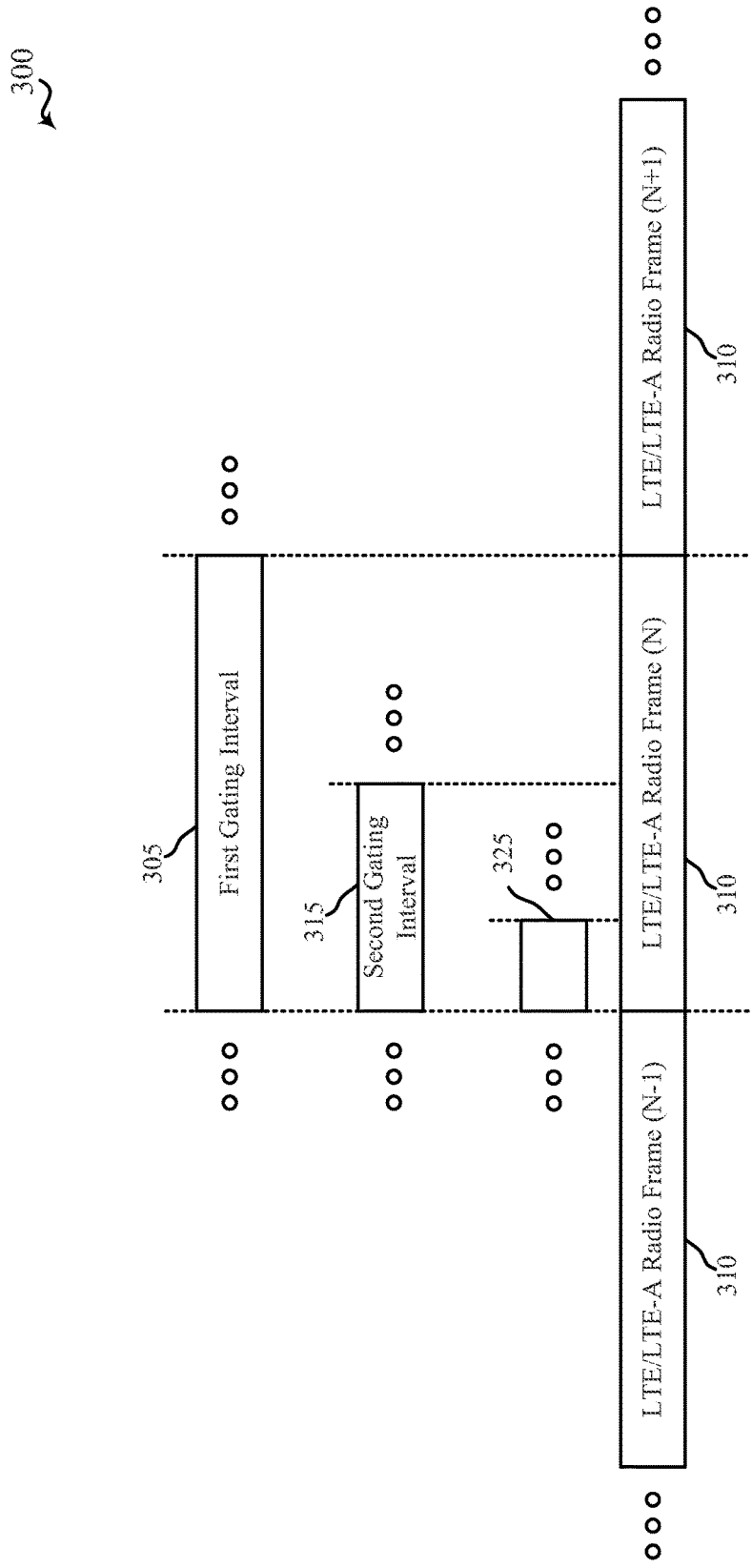
FIG. 3 shows examples of a gating interval (or LBT radio frame) for a cellular downlink in an unlicensed radio frequency spectrum band, in accordance with various aspects of the present disclosure.

FIG. 3 shows examples 300 of a gating interval (or LBT radio frame) for a cellular downlink in an unlicensed radio frequency spectrum band, in accordance with various aspects of the present disclosure. A first gating interval 305, a second gating interval 315, and/or a third gating interval 325 may be used as a periodic gating interval by an eNB or UE that supports transmissions over the unlicensed radio frequency spectrum band. Examples of such an eNB may include the base stations 105, 205, and/or 205-a described with reference to FIGS. 1 and/or 2, and examples of such a UE may include the UEs 115, 215, 215-a, 215-b, and/or 215-c described with reference to FIGS. 1 and/or 2. The first gating interval 305, the second gating interval 315, and/or the third gating interval 325 may in some examples be used with the wireless communication system 100 and/or 200 described with reference to FIGS. 1 and/or 2.

By way of example, the duration of the first gating interval 305 is shown to be equal to (or approximately equal to) a duration of an LTE/LTE-A radio frame 310 of a periodic frame structure associated with a cellular downlink. In some examples, "approximately equal" means the duration of the first gating interval 305 is within a cyclic prefix (CP) duration of the duration of the periodic frame structure.

At least one boundary of the first gating interval 305 may be synchronized with at least one boundary of the periodic frame structure that includes the LTE/LTE-A radio frames N−1 to N+1. In some cases, the first gating interval 305 may have boundaries that are aligned with the frame boundaries of the periodic frame structure. In other cases, the first gating interval 305 may have boundaries that are synchronized with, but offset from, the frame boundaries of the periodic frame structure. For example, the boundaries of the first gating interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic frame structure associated with the cellular downlink. In some examples, an "approximate sub-multiple of" means the duration of the second gating interval 315 and/or the third gating interval 325 is within a cyclic prefix (CP) duration of the duration of a sub-multiple of (e.g., half or one-fifth) the periodic frame structure. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of an unlicensed radio frequency spectrum band.

Figure 4:
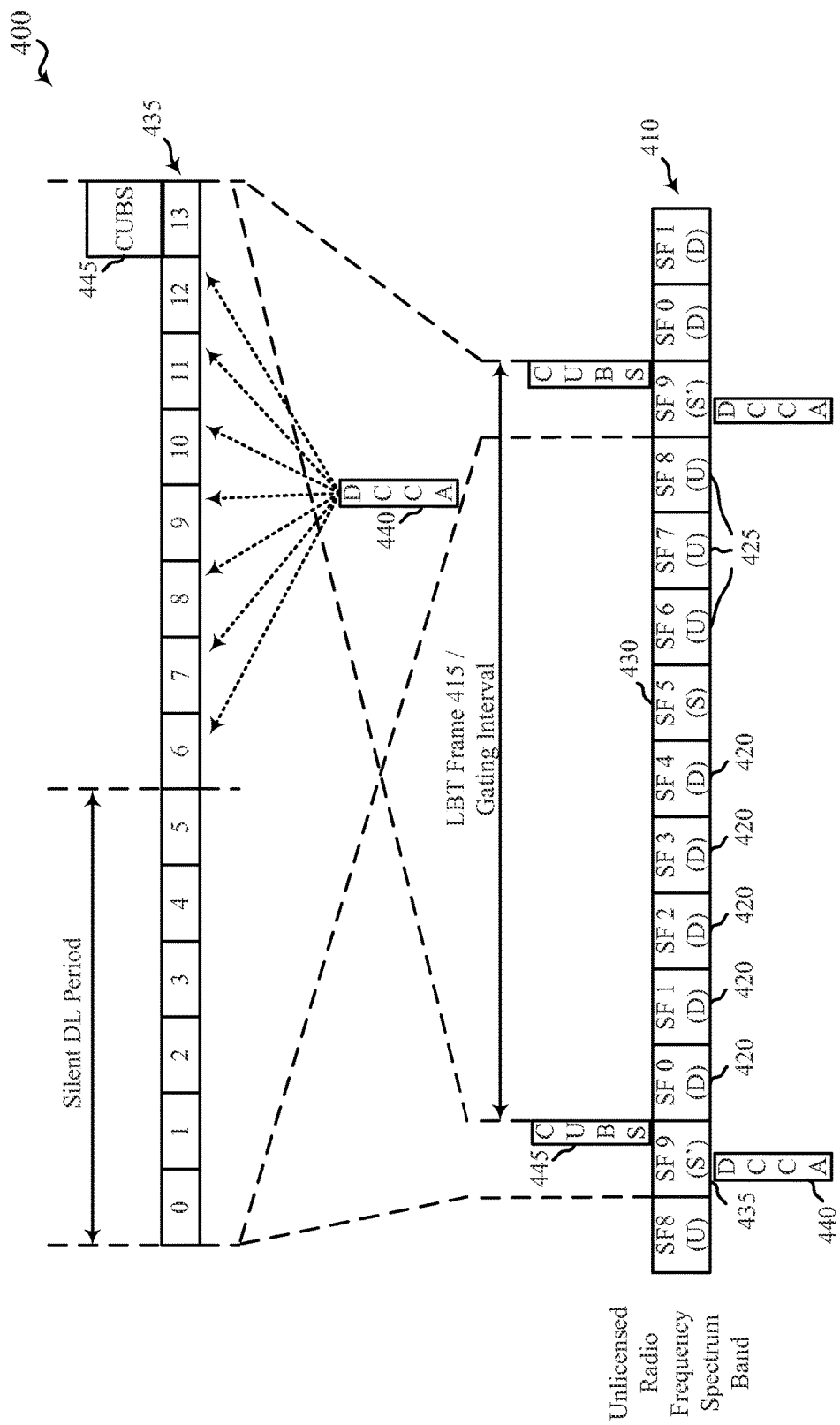
FIG. 4 shows an example of a wireless communication over an unlicensed radio frequency spectrum band, in accordance with various aspects of the present disclosure.

FIG. 4 shows an example 400 of a wireless communication 410 over an unlicensed radio frequency spectrum band, in accordance with various aspects of the present disclosure. An LBT radio frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 435 may provide a transition between uplink subframes 425 and downlink subframes 420. During the S' subframe 435, a downlink clear channel assessment (DCCA) procedure 440 may be performed by one or more base stations, such as one or more of the base stations 105, 205, and/or 205-a described with reference to FIGS. 1 and/or 2, to reserve, for a period of time, the channel over which the wireless communication 410 occurs. Following a successful DCCA procedure 440 by a base station, the base station may transmit a channel usage beacon signal (CUBS) 445 to provide an indication to other base stations and/or apparatuses (e.g., UEs, Wi-Fi access points, etc.) that the base station has reserved the channel. In some examples, a CUBS 445 may be transmitted using a plurality of interleaved resource blocks. Transmitting a CUBS 445 in this manner may enable the CUBS 445 to occupy at least a certain percentage of the available frequency bandwidth in the unlicensed radio frequency spectrum band and satisfy one or more regulatory requirements (e.g., a requirement that the CUBS 445 occupy at least 80% of the available frequency bandwidth). The CUBS 445 may in some examples take a form similar to that of an LTE/LTE-A cell-specific reference signal (CRS) and/or channel state information reference signal (CSI-RS).

The S' subframe 435 may include 14 OFDM symbols, numbered 0 through 13 in FIG. 4. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for the DCCA procedure 440. In the example 400, the S' subframe 435 includes seven DCCA slots, included in symbols 6 through 12. Use of the DCCA slots by different network operators may be coordinated to provide more efficient system operation. In some examples, in order to determine which of the seven possible DCCA slots to use to perform a DCCA procedure 440, a base station 105 may evaluate a mapping-function of the form:

$$F_D(\text{GroupID}, t) \in \{1, 2, 3, 4, 5, 6, 7\}$$

where GroupID is a "deployment group-id" assigned to the base station 105, and t is the LBT radio frame number corresponding to a gating interval or frame for which the DCCA procedure 440 is performed.

Figure 5:
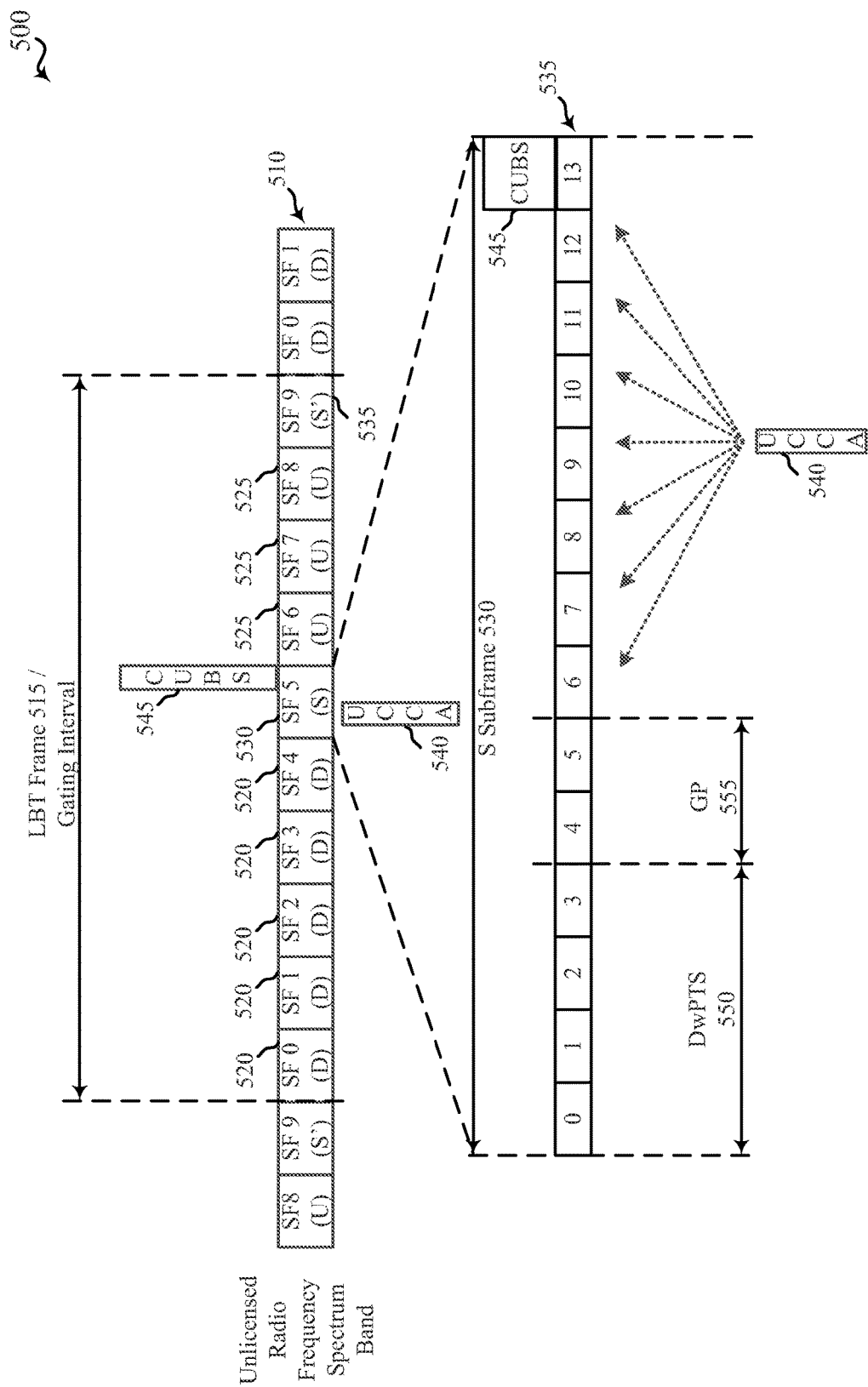
FIG. 5 shows an example of a wireless communication over an unlicensed radio frequency spectrum band, in accordance with various aspects of the present disclosure.

FIG. 5 shows an example 500 of a wireless communication 510 over an unlicensed radio frequency spectrum band, in accordance with various aspects of the present disclosure. An LBT radio frame 515, which may correspond to a gating interval such as the first gating interval 305 described with reference to FIG. 3 and/or the LBT radio frame 415 described with reference to FIG. 4, may have a duration of ten milliseconds and include a number of downlink subframes 520, a number of uplink subframes 525, and two types of special subframes (e.g., an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S subframe 530, an uplink CCA (UCCA) procedure 540 may be performed by one or more UEs, such as one or more of the UEs 115, 215, 215-a, 215-b, and/or 215-c described above with reference to FIGS. 1 and/or 2, to reserve, for a period of time, the channel over which the wireless communication 510 occurs. Following a successful UCCA procedure 540 by a UE, the UE may transmit a CUBS 545 to provide an indication to other UEs and/or apparatuses (e.g., base stations, Wi-Fi access points, etc.) that the UE has reserved the channel. In some examples, a CUBS 545 may be transmitted using a plurality of interleaved resource blocks. Transmitting a CUBS 545 in this manner may enable the CUBS 545 to occupy at least a certain percentage of the available frequency bandwidth in the unlicensed radio frequency spectrum band and satisfy one or more regulatory requirements (e.g., a requirement that the CUBS 545 occupy at least 80% of the available frequency bandwidth). The CUBS 545 may in some examples take a form similar to that of an LTE/LTE-A cell-specific reference signal (CRS) and/or channel state information reference signal (CSI-RS).

The S subframe 530 may include 14 OFDM symbols, numbered 0 through 13 in FIG. 5. A first portion of the S subframe 530, symbols 0 through 3 in this example, may be used as a downlink pilot time slot (DwPTS) 550, and a second portion of the S subframe 530 may be used as a guard period (GP) 555. A third portion of the S subframe 530 may be used for UCCA procedure 540. In the example 500, the S subframe 530 includes seven UCCA slots, included in symbols 6 through 12. Use of the UCCA slots by different UEs may be coordinated to provide more efficient system operation. In some examples, in order to determine which of the seven possible UCCA slots to use to perform a UCCA procedure 540, a UE may evaluate a mapping-function of the form:

$$F_U(\text{GroupID}, t) \in \{1,2,3,4,5,6,7\}$$

where GroupID is a "deployment group-id" assigned to the UE, and t is the LBT radio frame number corresponding to a frame for which a UCCA procedure 540 is performed.

The mapping function for a DCCA procedure 440 and/or a UCCA procedure 540 may be constructed based on different criteria, depending on whether the mapping function will have an orthogonalization or a non-orthogonalization property. In examples with orthogonal LBT access, the mapping function may have an orthogonalization property according to:

$$F_{D/U}(x,t) \neq F_{D/U}(y,t)$$

$$\text{GroupID } x, y \in \{1,2,3,4,5,6,7\}$$

for all time t, whenever x≠y represent different group-ids. In this case, base stations and/or UEs with different group-ids may perform CCA procedures (e.g., DCCA procedures 440 and/or UCCA procedures 540) during non-overlapping CCA slots. In the absence of interference, the base station or UE with the group-id which maps to an earlier CCA slot may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier CCA slot (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, leading to enhanced system throughput. Base stations and/or UEs of different deployments may be assigned different group-ids, so that with orthogonal CCA slot mapping, access to the channel is mutually exclusive.

In examples with non-orthogonal, or overlapping, CCA slot access, the mapping function may allow more than seven group ids. In some situations, for example, it may be useful to support more than seven deployment group-ids, in which case it is not possible to maintain the orthogonality property of CCA slot mapping functions. In such cases, it may be desirable to reduce the frequency of collision between any two group-ids. In some examples, non-orthogonal CCA slot mapping sequences may also be used to provide fair channel access among deployments without tight coordination on LBT opportunities. One example of a non-orthogonal CCA slot mapping sequence is given by:

$$F_{D/U}(x,t) = R_{1,7}(x,t)$$

$$\text{GroupID} x = \in \{1,2,\ldots 2^{16}\}$$

where $R_{1,7}(x,t)$ is a pseudo-random number generator between 1 and 7 chosen independently for GroupID x. In this case, there could be potential collisions between base stations and/or UEs of different GroupID's in the same LBT radio frame t.

Thus, CCA slots may be selected according to the noted mapping functions and used for a DCCA procedure 440 and/or a UCCA procedure 540.

In each of FIGS. 4 and 5, the period between successful performance of a DCCA procedure 440 and the start of a transmission period for which the DCCA procedure 440 was performed (see, e.g., FIG. 4), or the period between successful performance of a UCCA procedure 540 and the start of a transmission period for which the UCCA procedure 540 was performed (see, e.g., FIG. 5), may be referred to as a preamble. Because of variability in when a DCCA procedure 440 or UCCA procedure 540 is performed, the length of a preamble may vary. However, in each of the examples shown in FIGS. 4 and 5, the preamble ends following transmission of the CUBS 445 (see, e.g., FIG. 4) or the CUBS 545 (see, e.g., FIG. 5).

Figure 6:
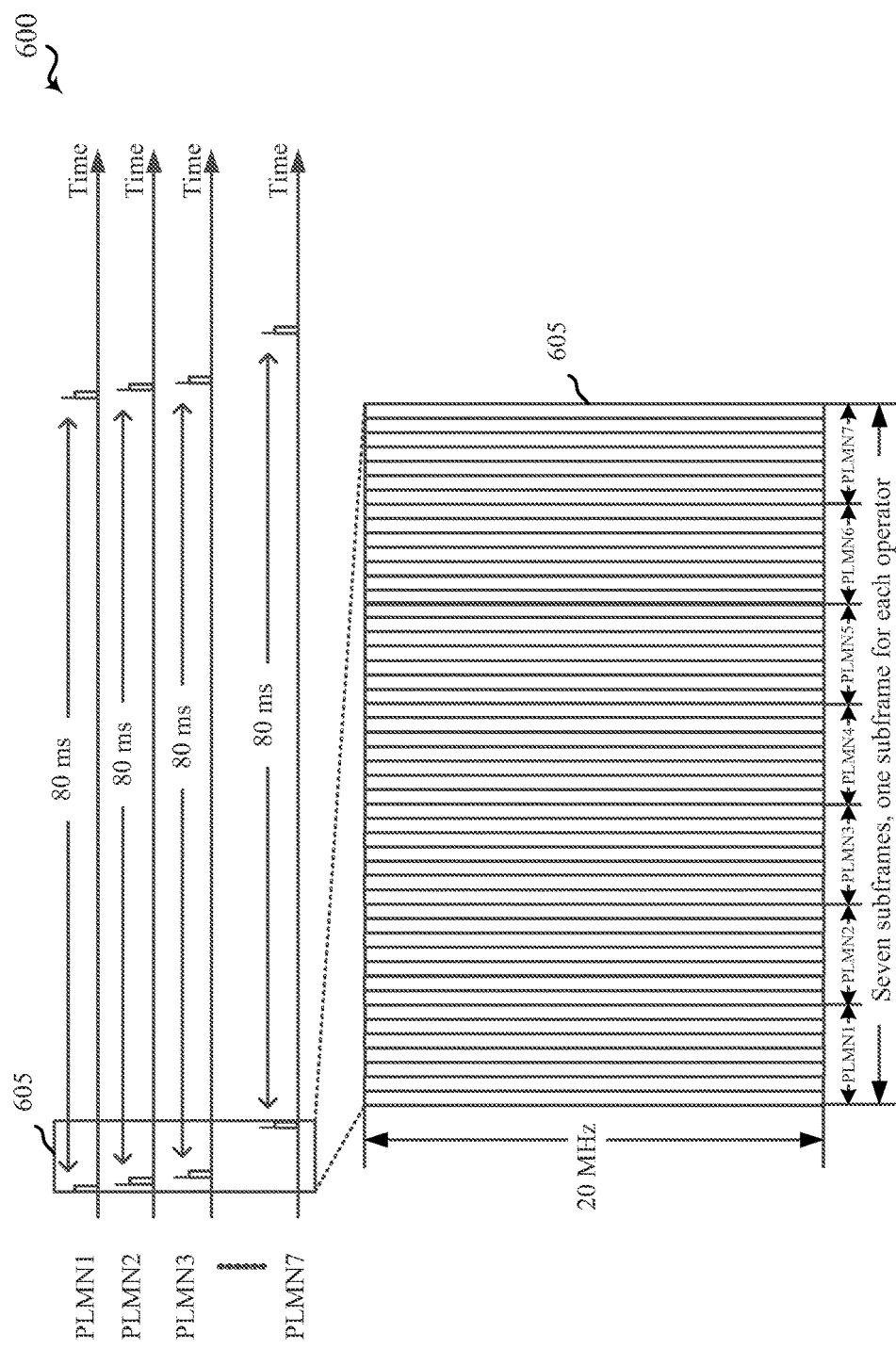
FIG. 6 shows an example of resource allocations for CCA-Exempt Transmissions (CETs) of synchronous operators in an unlicensed radio frequency spectrum band, in accordance with various aspects of the present disclosure.

FIG. 6 shows an example 600 of resource allocations for CCA-Exempt Transmissions (CETs) of synchronous operators in an unlicensed radio frequency spectrum band, in accordance with various aspects of the present disclosure. A CET may be made without a need to perform a CCA (e.g., a DCCA or an uplink CCA (UCCA)) to first gain access to the unlicensed radio frequency spectrum band. Instead, an operator is exempted from performing a CCA for the purpose of transmitting a CET.

As shown, an allocation of resources 605 for CETs may be made, for example, once every eighty milliseconds (80 ms) or once every CET period, where the CET period may have a configurable periodicity. Each of a number of operators in the unlicensed radio frequency spectrum band (e.g., different PLMNs) may be provided a separate subframe (shown) or subframes (not shown) for transmitting CETs. By way of example, FIG. 6 shows adjacent CET subframes for seven different operators (e.g., operators PLMN1, PLMN2, . . . , PLMN7). Such a CET transmission framework may be applicable to a downlink and/or uplink between a base station and a UE.

In some examples of an LBT-LBE protocol, a transmitting apparatus may perform a CCA procedure and, when the CCA procedure is successful, immediately begin transmitting over a channel of an unlicensed radio frequency spectrum band. However, when the CCA procedure is unsuccessful, the transmitting apparatus may perform an extended CCA procedure by selecting a random integer, N, between 1 and q, where q has a value of 4≤q≤32 advertised by an operator or vendor. Upon selecting a value for the random integer, N, the transmitting apparatus may wait to access an unlicensed radio frequency spectrum band for N CCA procedures where a channel of the unlicensed radio frequency spectrum band is found to be clear. Upon the channel of the unlicensed radio frequency spectrum band being found clear for the N CCA procedures, the transmitting apparatus may transmit over the unlicensed radio frequency spectrum band for at most ($13/32$)×q milliseconds (msec) before needing to perform another extended CCA procedure. The ($13/32$)×q msec transmission time is therefore a maximum channel occupancy time (i.e., MaxChannelOccupancyTime). Upon receiving a transmission from the transmitter, a receiver may immediately begin an acknowledgement/non-acknowledgement (ACK/NAK) transmission, provided the last successful CCA procedure or extended CCA procedure was performed less than MaxChannelOccupancyTime ago.

Under most conditions, the use of an LBT-FBE protocol by a transmitting apparatus provides sufficient access to an unlicensed radio frequency spectrum band. The use of an LBT-FBE protocol can be advantageous in that it enables frequency reuse 1 among base stations or eNBs associated with the same operator. However, under some scenarios, one or more Wi-Fi nodes may prevent an LTE/LTE-A node from accessing a channel of an unlicensed radio frequency spectrum band. In these scenarios, use of an LBT-LBE protocol may be advantageous over an LBT-FBE protocol (despite the fact that use of an LBT-LBE protocol may prevent frequency reuse 1 under some conditions), in that a transmitting apparatus may persistently attempt to access the unlicensed radio frequency spectrum band when employing an LBT-LBE protocol. For example, the transmitting apparatus may attempt to access the medium for a random duration of N CCA procedures, but for a maximum duration controlled by the parameter q. A smaller value of q implies a shorter maximum extended CCA procedure duration and shorter radio frame length. One disadvantage of an LBT-LBE protocol compared to an LTB-FBE protocol is that the random integer, N, on which an extended CCA procedure is based provides for asynchronous operation of a plurality of transmitters, potentially leading to inefficient operation (e.g., dimension loss).

A transmitting apparatus capable of using an LBT-FBE protocol under most conditions, and an LBT-LBE protocol when necessary, may be useful in some wireless communication systems. Such a transmitting apparatus may use a same or similar LBT radio frame structure when using either the LBT-FBE protocol or the LBT-LBE protocol, but may use somewhat different CCA procedures for the different protocols. In some examples, the differences in CCA procedures (e.g., access procedures) used by an LBT-LBE protocol and an LBT-FBE protocol may not be defined in 3GPP specifications, but rather in a corresponding ETSI document.

Figure 7:
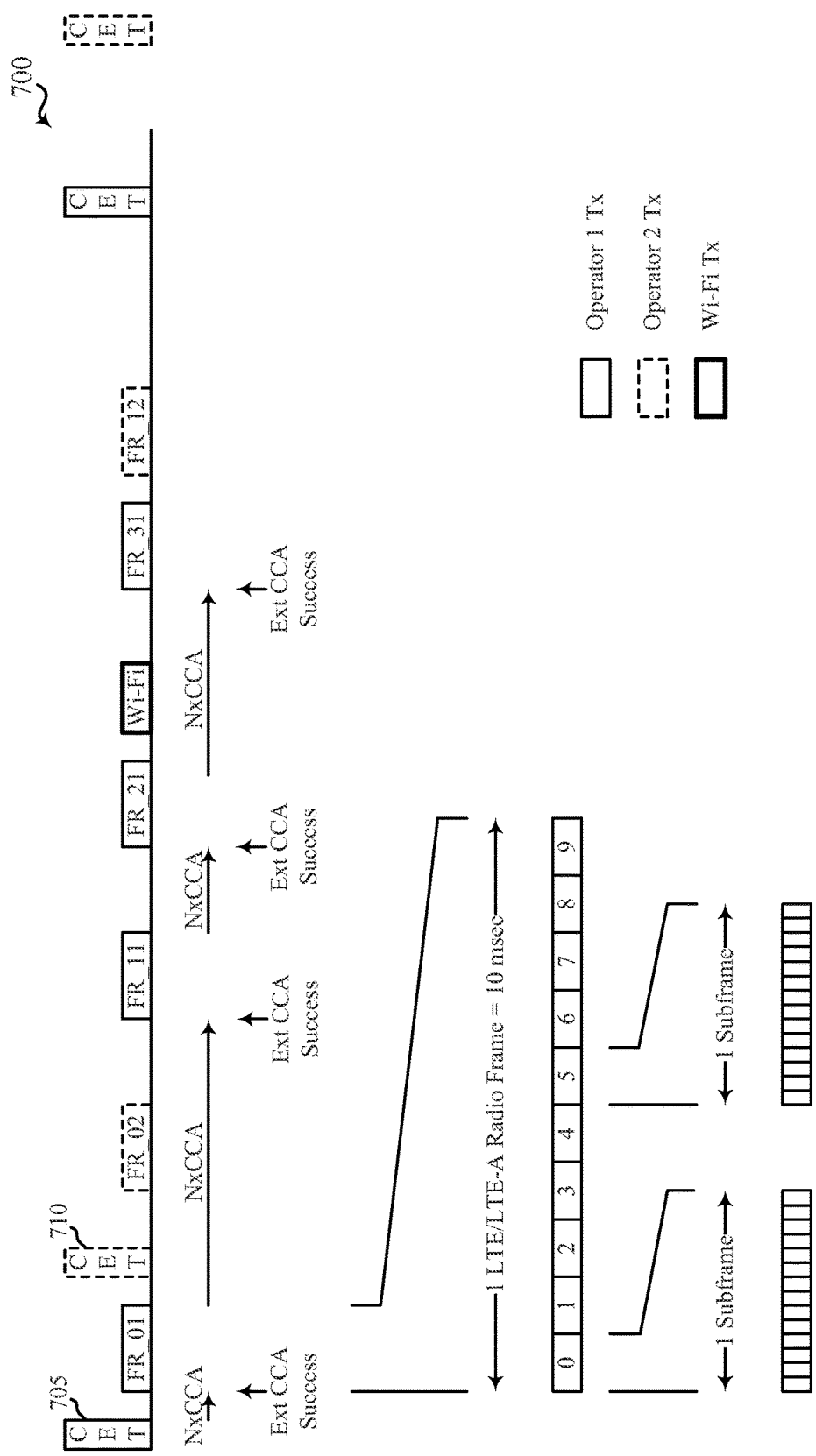
FIG. 7 shows a timing diagram of wireless communications over an unlicensed radio frequency spectrum band, in accordance with various aspects of the present disclosure.

FIG. 7 shows a timing diagram 700 of wireless communications over an unlicensed radio frequency spectrum band, in accordance with various aspects of the present disclosure. In some examples, the unlicensed radio frequency spectrum band may be a radio frequency spectrum band for which apparatuses may need to contend for access because the radio frequency spectrum band is available, at least in part, for unlicensed use (e.g., Wi-Fi use and/or LTE/LTE-A use in an unlicensed radio frequency spectrum band).

By way of example, the wireless communications shown in FIG. 7 include communications (or transmissions (Tx)) by an Operator 1, an Operator 2, and a Wi-Fi node. By way of further example, transmitters of Operator 1 and Operator 2, as well as the Wi-Fi node, may be within CCA range of each other. Operator 1 may transmit a CCA-Exempt Transmission (CET) 705 over the unlicensed radio frequency spectrum band, followed by a first number of radio frames (e.g., radio frames FR_01, FR_11, FR_21, and/or FR_31). Operator 2 may transmit a CET 710 over the unlicensed radio frequency spectrum band, followed by a second number of radio frames (e.g., radio frames FR_02 and/or FR_12). The Wi-Fi node may also transmit over the unlicensed radio frequency spectrum band (e.g., the transmission labeled Wi-Fi). When a transmitter associated with Operator 1 is transmitting over a channel of the unlicensed radio frequency spectrum band, Operator 2 and the Wi-Fi node may be prevented from accessing the channel of the unlicensed radio frequency spectrum band. When a transmitter associated with Operator 2 is transmitting over a channel of the unlicensed radio frequency spectrum band, transmitters of Operator 1 and the Wi-Fi node may be prevented from accessing the channel of the unlicensed radio frequency spectrum band. When the Wi-Fi node is transmitting over a channel of the unlicensed radio frequency spectrum band, transmitters associated with Operator 1 and Operator 2 may be prevented from accessing the channel of the unlicensed radio frequency spectrum band.

In some examples, the transmitters of Operator 1 and Operator 2 may gain access to the unlicensed radio frequency spectrum band (or a channel thereof) by performing an extended CCA procedure labeled NxCCA. Access is only gained when an extended CCA procedure is successful (labeled as Ext CCA Success).

In some examples, each radio frame transmitted by Operator 1 or Operator 2 may be an LTE/LTE-A radio frame having 10 subframes and a duration of 10 msec. Each subframe may include, for example, fourteen OFDM symbols. The subframes may variously include data subframes, uplink subframes, or special subframes (e.g., subframes used to transmit control information, synchronization signals, some data, etc.).

The use of an LBT-LBE protocol (e.g., operation in an LBT-LBE mode of operation over an unlicensed radio frequency spectrum band) does not necessarily impact radio resource management (RRM) measurements, because the measurements can be performed on a CET transmitted by a transmitting apparatus. However, with respect to reference and control channel transmissions, the reference and control channel transmissions over an unlicensed radio frequency spectrum band may be defined based on the start (e.g., a frame boundary) of an LBT radio frame. Thus, the use of an LBT-LBE protocol can impact higher layer control signaling design, such as the configuration of channel state information (CSI) resources. This may be addressed (when using either an LBT-LBE protocol or an LBT-FBE protocol) by transmitting a signal to convey location information of overhead signals in relation to the timing of a radio frame boundary. In some examples, the signal to convey location information of overhead signals in relation to the timing of a radio frame boundary may include radio resource control (RRC) signaling. In some examples, the signal to convey location information of overhead signals in relation to the timing of a radio frame boundary may convey location information for a downlink control channel in relation to the radio frame boundary and/or location information for resources used for CSI feedback. In some examples, the signal to convey location information of overhead signals in relation to the timing of a radio frame boundary may be provided in a CUBS and/or a CUBS may include the downlink control channel, information indicating a CSI configuration, and/or the resources used for CSI feedback.

When using an LBT-LBE protocol, it may be useful to transmit downlink grants on a secondary serving cell (e.g., over an unlicensed radio frequency spectrum band, with data on an enhanced physical downlink control channel (EPDCCH) or on a new control channel), because cross carrier scheduling may be problematic due to a possible lack of subframe alignment between a primary serving cell and the secondary serving cell.

In some examples, a UE operating under an LBT protocol may detect a base station or eNB discovery signal (e.g., a primary synchronization signal (PSS), a secondary synchronization signal (SSS), and/or a dedicated reference signal (DRS)) in a CET transmitted by the base station or eNB. Upon detecting the discovery signal, the UE may assume an OFDM symbol period timing based on the detected discovery signal. When operating under an LBT-FBE protocol, subframe timing may not differ from one LBT frame to another. However, subframe timing may in some cases differ from one LBT radio frame to another when operating under an LBT-LBE protocol. A UE capable of operating under either of an LBT-FBE protocol or an LBT-LBE protocol may therefore not assume subframe or frame timing based on the detection of a discovery signal.

In some examples of the wireless communication system 100 and/or 200 described with reference to FIGS. 1 and/or 2, it may be desirable to use a preamble such as the preamble described with reference to FIGS. 4 and/or 5 to transmit information (e.g., N bits of information) over a channel in a radio frequency spectrum band. For example, the information may be transmitted with a signal that indicates accessing (e.g., the reserving of) a channel in the radio frequency spectrum band. In some examples, the signal that indicates accessing the channel in the radio frequency spectrum band may include a CUBS such as the CUBS 445 and/or 545 described with reference to FIGS. 4 and/or 5.

The transmitted information may include various types of information. In some examples, the information may include a cell identifier (ID), a public land mobile network (PLMN) ID, or a combination thereof. In some examples, the information may indicate a frame structure for transmission in the radio frequency spectrum band (e.g., the LBT radio frame duration). In some examples, the information may indicate a number of subframes and/or symbols that will be used for transmission in a frame structure in the radio frequency spectrum band (e.g., five subframes are used for transmission in a ten millisecond frame duration that includes ten subframes). An indication of a number of subframes and/or symbols that will be used for transmission in a frame structure in the radio frequency spectrum band may enable a receiving apparatus, such as a UE, to enter a low power state at an earlier time (e.g., immediately after receiving the transmitted subframes), thereby conserving power. In some examples, the information may indicate an uplink configuration and/or a downlink configuration for transmission in the radio frequency spectrum band (e.g., an uplink configuration and/or a downlink configuration of a frame structure in the radio frequency spectrum band). An indication of an uplink configuration and/or a downlink configuration for transmission in the radio frequency spectrum band may improve the performance of enhanced Interference Mitigation & Traffic Adaptation (eIMTA) functionality. In some examples, the information may indicate whether a maximum number of subframes, of a frame, are used for transmission in the radio frequency spectrum band (e.g., a single bit may be used to indicate whether a maximum number of subframes are used for transmission in a frame structure of the radio frequency spectrum band, or whether fewer than the maximum number of subframes are used for transmission in the frame structure of the radio frequency spectrum band). In some examples, the information may indicate a number of antennas to use for receiving a transmission carried on a component carrier in the radio frequency spectrum band. The information may also or alternatively include any combination of the above types of information and/or other types of information, including other types of system information.

In some examples, information may be transmitted with a signal that indicates accessing a channel in the radio frequency spectrum band by transmitting the information as part of the signal that indicates accessing the channel in the radio frequency spectrum band (e.g., as part of a CUBS). In these examples, the CUBS, for example, may be generated based at least in part on a sequence. The sequence may be a function of the information to be transmitted. For example, the sequence may be a function of a cell ID, a PLMN ID, or a combination thereof. The sequence may also or alternatively be a function of any one or combination of the types of information referenced herein.

In other examples in which the information is transmitted as part of a signal that indicates accessing a channel in the radio frequency spectrum band (e.g., as part of a CUBS), the information may be transmitted by selecting a phase from among a plurality of phases for transmission of the signal. The selected phase may correspond to the information to be transmitted, whereas other phases in the plurality of phases may correspond to different information. In another example, different phase offsets between a plurality of signals that indicate accessing a channel in the radio frequency spectrum band may correspond to different information to be transmitted.

In some examples, information may be transmitted with a signal (e.g., a CUBS) that indicates accessing a channel in the radio frequency spectrum band by transmitting the information in a second signal, which second signal may be transmitted along with the signal that indicates accessing a channel in the radio frequency spectrum band. In some examples, the second signal may be interleaved with, or transmitted adjacent to, the signal that indicates accessing a channel in the radio frequency spectrum band, as described with reference to FIG. 8.

Figure 8A:
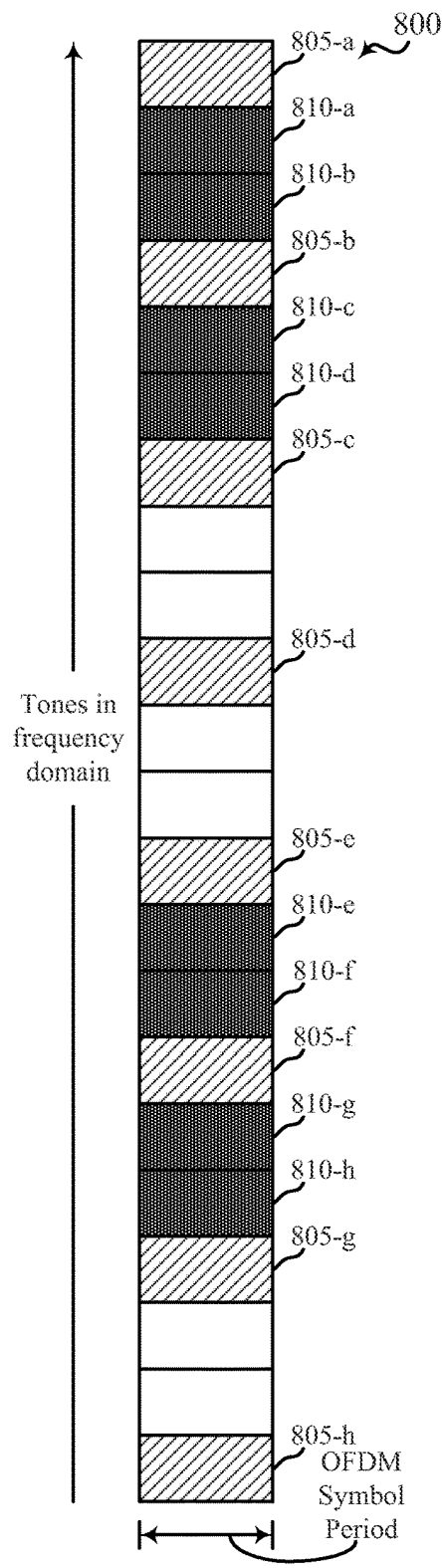
FIG. 8A shows an example of how information may be transmitted with a first signal (e.g., a channel usage beacon signal (CUBS)) that indicates accessing a channel in a radio frequency spectrum band, in accordance with various aspects of the present disclosure.

FIG. 8A shows an example 800 of how information may be transmitted with a first signal 805 (e.g., a CUBS) that indicates accessing a channel in a radio frequency spectrum band, in accordance with various aspects of the present disclosure.

As shown, the first signal 805 may be transmitted as a plurality of tones (e.g., a first tone 805-a, a second tone 805-b, a third tone 805-c, a fourth tone 805-d, a fifth tone 805-e, a sixth tone 805-f, a seventh tone 805-g, and/or an eighth tone 805-h) using a first plurality of interleaved resource blocks in the frequency domain. In some examples, the first signal 805 may be transmitted using more, fewer, and/or different tones. Transmitting the first signal 805 in this manner may enable the first signal 805 to occupy at least a certain percentage of the available frequency bandwidth in the radio frequency spectrum band and satisfy one or more regulatory requirements (e.g., a requirement that the first signal 805 occupy at least 80% of the available frequency bandwidth). The first signal 805 may in some examples take a form similar to that of an LTE/LTE-A cell-specific reference signal (CRS) and/or channel state information reference signal (CSI-RS).

The information may be transmitted in a second signal 810. The second signal 810 may also be transmitted as a plurality of tones (e.g., a ninth tone 810-a, a tenth tone 810-b, an eleventh tone 810-c, a twelfth tone 810-d, a thirteenth tone 810-e, a fourteenth tone 810-f, a fifteenth tone 810-g, and/or a sixteenth tone 810-h) using a second plurality of interleaved resource blocks in the frequency domain. In some examples, the second signal 810 may be transmitted using more, fewer, and/or different tones. The second signal 810 may in some examples take a form similar to that of an LTE/LTE-A physical control format indicator channel (PCFICH).

As shown, the first signal 805 and the second signal 810 may be transmitted during a single OFDM symbol period of the radio frequency spectrum band. The first signal 805 may provide automatic gain control (AGC) information for the second signal 810.

Figure 8B:
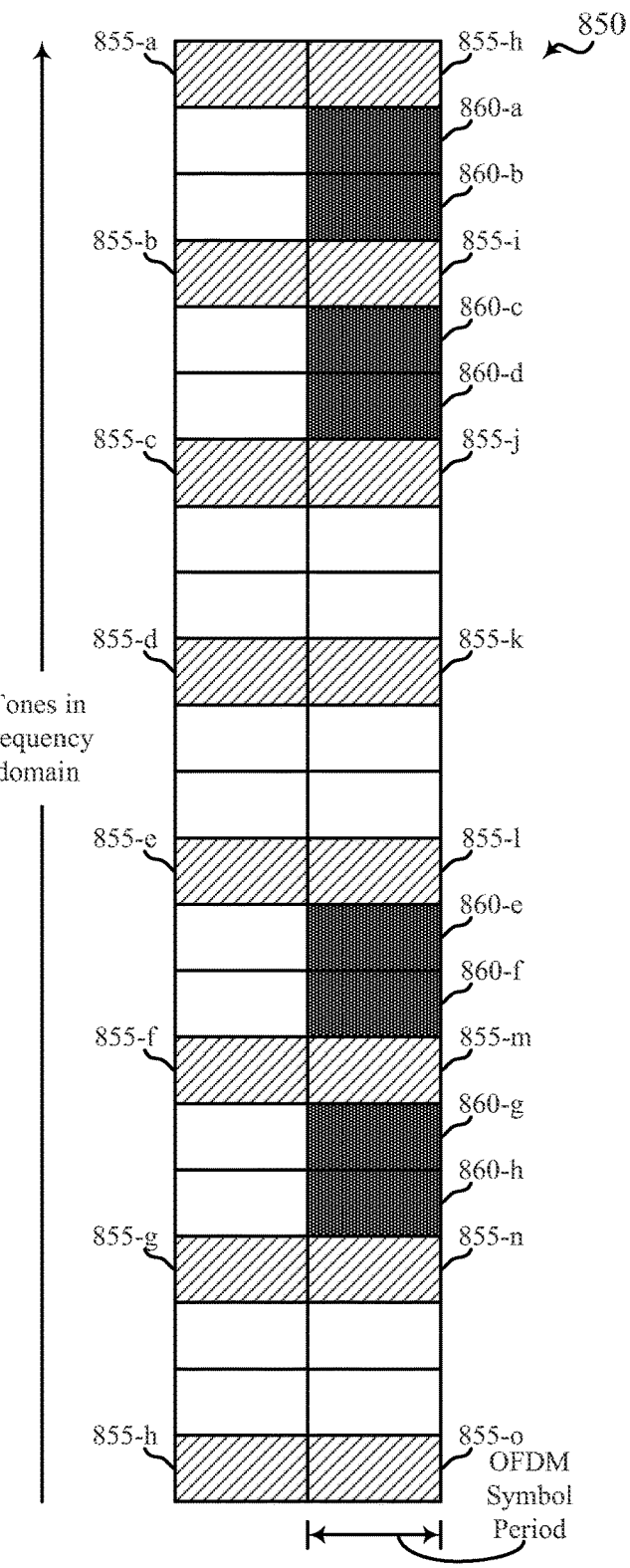
FIG. 8B shows an example of how information may be transmitted with a first signal (e.g., a CUBS) that indicates accessing a channel in a radio frequency spectrum band, in accordance with various aspects of the present disclosure.

FIG. 8B shows an example 850 of how information may be transmitted with a first signal 855 (e.g., a CUBS) that indicates accessing a channel in a radio frequency spectrum band, in accordance with various aspects of the present disclosure.

As shown, the first signal 855 may be transmitted as a plurality of tones (e.g., a first tone 855-a, a second tone 855-b, a third tone 855-c, a fourth tone 855-d, a fifth tone 855-e, a sixth tone 855-f, a seventh tone 855-g, an eighth tone 855-h, a ninth tone 855-i, an eleventh tone 855-j, a twelfth tone 855-k, a thirteenth tone 855-l, a fourteenth tone 855-m, a fifteenth tone 855-n, and/or a sixteenth tone 855-o) over a plurality of OFDM symbol periods (e.g., two OFDM symbol periods). In some examples, the first signal 855 may be transmitted using more, fewer, and/or different tones. Transmitting the first signal 855 in this manner may enable the first signal 855 to occupy at least a certain percentage of the available frequency bandwidth in the radio frequency spectrum band and/or satisfy one or more regulatory requirements (e.g., a requirement that the first signal 855 occupy at least 80% of the available frequency bandwidth). The first signal 855 may in some examples take a form similar to that of an LTE/LTE-A cell-specific reference signal (CRS) and/or channel state information reference signal (CSI-RS).

The information may be transmitted in a second signal 860. The second signal 860 may also be transmitted as a plurality of tones (e.g., a seventeenth tone 860-a, an eighteenth tone 860-b, a nineteenth tone 860-c, a twentieth tone 860-d, a twenty-first tone 860-e, a twenty-second tone 860-f, a twenty-third tone 860-g, and/or a twenty-fourth tone 860-h) using a second plurality of interleaved resource blocks in the frequency domain. In some examples, the second signal 860 may be transmitted using more, fewer, and/or different tones. The second signal 860 may in some examples take a form similar to that of an LTE/LTE-A physical control format indicator channel (PCFICH).

As shown, the first signal 855 may be transmitted during a first OFDM symbol period of the radio frequency spectrum band and a second OFDM symbol period of the radio frequency spectrum band, and the second signal 860 may be transmitted during the second OFDM symbol period of the radio frequency spectrum band. In some examples, the first OFDM symbol period of the radio frequency spectrum band and the second OFDM symbol period of the radio frequency spectrum band may be adjacent OFDM symbol periods (as shown). The first signal 855 may provide AGC information and/or a phase reference for the second signal 860.

Figure 9:
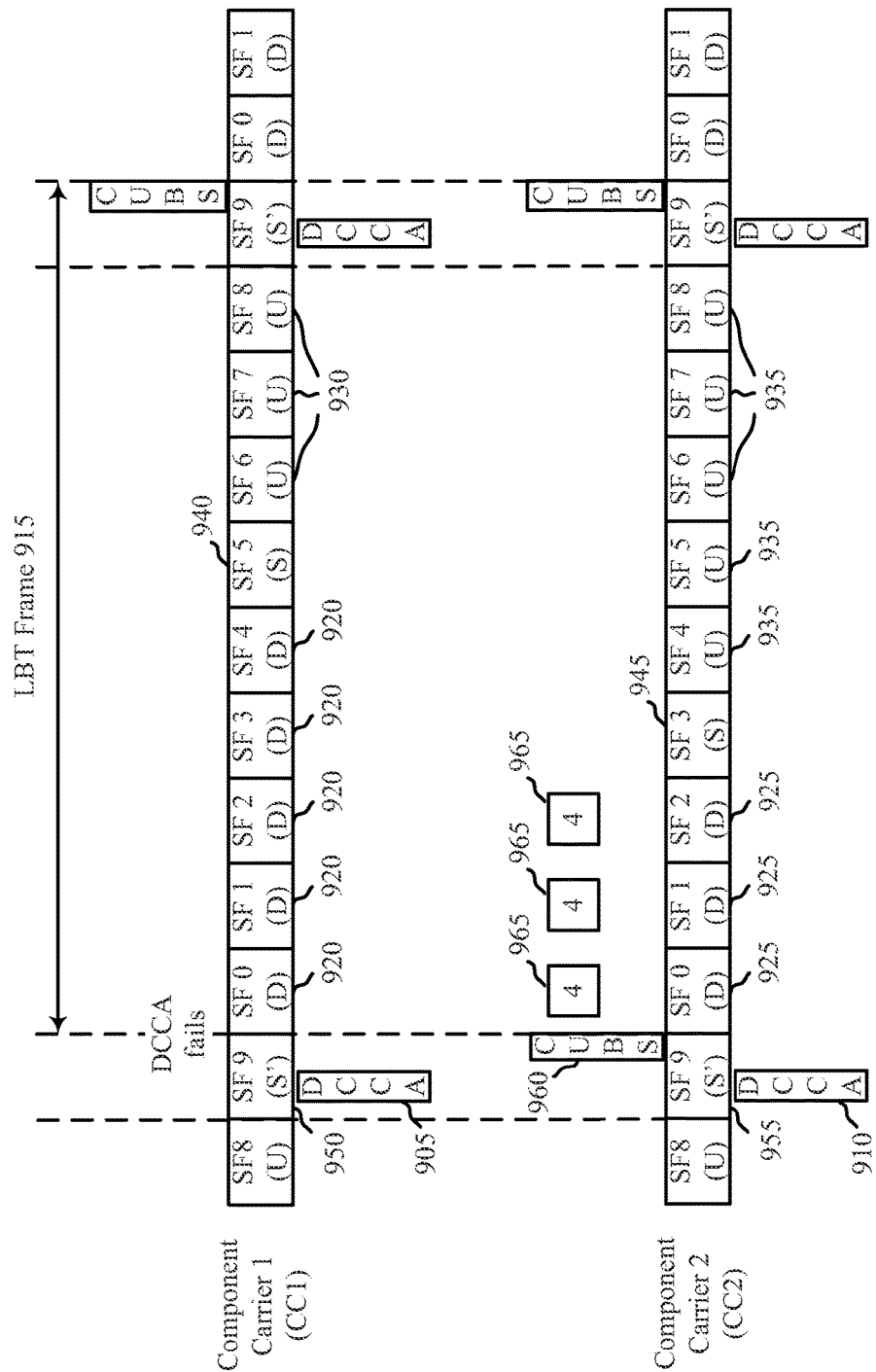
FIG. 9 shows an example of how information indicating a number of antennas to use for receiving a transmission carried on a component carrier may be determined and used, in accordance with various aspects of the present disclosure.

FIG. 9 shows an example 900 of how information indicating a number of antennas to use for receiving a transmission carried on a component carrier may be determined and used, in accordance with various aspects of the present disclosure. More particularly, FIG. 9 shows an LBT radio frame 915 (or gating interval) for transmission of a first component carrier (CC1) and a second component carrier (CC2) in an unlicensed radio frequency spectrum band. Upon a base station winning contention to access the first component carrier CC1 and/or the second component carrier CC2, the base station may transmit a signal indicating accessing the first component carrier CC1 and/or the second component carrier CC2 in the unlicensed radio frequency spectrum band to a UE. In some examples, the base station may be an example of one or more aspects of the base station 105, 205, and/or 205-a described with reference to FIGS. 1 and/or 2, and/or the UE may be an example of one or more aspects of the UE 115, 215, 215-a, 215-b, and/or 215-c described with reference to FIGS. 1 and/or 2.

By way of example, each of the first component carrier CC1 and the second component carrier CC2 may have a frame structure similar to the frame structure shown in FIG. 4. For example, the frame structure of each of the first component carrier CC1 and the second component carrier CC2 may include a number of downlink subframes 920 or 925, a number of uplink subframes 930 or 935, and two types of special subframes, an S subframe 940 or 945, and an S' subframe 950 or 955. The S subframe 940 or 945 may provide a transition between downlink subframes 920 or 925 and uplink subframes 930 or 935, while the S' subframe 950 or 955 may provide a transition between uplink subframes 930 or 935 and downlink subframes 920 or 925. In other examples, one or both of the first component carrier CC1 and the second component carrier CC2 may have a frame structure that differs more substantially from the frame structure shown in FIG. 4.

During the S' subframes 950 and 955, a base station may perform a first DCCA procedure 905 (e.g., a first contention procedure) to contend for access to the first component carrier CC1 in an unlicensed radio frequency spectrum band during the LBT radio frame 915. Similarly, the base station may perform a second DCCA procedure 910 (e.g., a second contention procedure) to contend for access to the second component carrier CC2 in an unlicensed radio frequency spectrum band during the LBT radio frame 915. After winning contention to transmit both the first component carrier CC1 and the second component carrier CC2 during the LBT radio frame 915 (not shown), the base station may transmit data on both the first component carrier CC1 and the second component carrier CC2 to a UE in the unlicensed radio frequency spectrum band. By way of example, the transmission of data on the first component carrier CC1 by the base station may employ two antennas of the base station, and the transmission of data on the second component carrier CC2 may employ additional two antennas of the base station. Similarly, the UE receiving the transmission carried on the first component carrier CC1 and the second component carrier CC2 in the unlicensed radio frequency spectrum band may employ two antennas to receive the transmission carried on the first component carrier CC1 and employ additional two antennas to receive the transmission carried on the second component carrier CC2. In some examples, the UE may reserve the two antennas for receiving the transmission carried on the first component carrier CC1 during the LBT radio frame 915, and reserve the additional two antennas for receiving the transmission carried on the second component carrier CC2 during the LBT radio frame 915, without knowing whether the first component carrier CC1 and/or the second component carrier CC2 will carry a transmission during the LBT radio frame 915.

By way of example, FIG. 9 illustrates a scenario in which the first DCCA procedure 905 results in failure to win contention to access to the first component carrier CC1, and the second DCCA procedure 910 results in winning contention to access the second component carrier CC2. Assuming that a UE to which a base station transmits data on the second component carrier CC2 in the unlicensed radio frequency spectrum band has reserved two antennas for receiving data on the first component carrier CC1 during the LBT radio frame 915, and has reserved an additional two antennas for receiving data on the second component carrier CC2 during the LBT radio frame 915, the two antennas reserved by the UE for receiving data on the first component carrier CC1 may go unused during the LBT radio frame 915. However, if the base station can transmit information indicating a number of antennas to use for receiving a transmission carried on the first component carrier CC1 and/or the second component carrier CC2, the UE may be able to employ the two antennas reserved to receive data on the first component carrier CC1 to receive data on the second component carrier CC2 during part or all of the LBT radio frame 915. Thus, for example, the base station may indicate to the UE to use four antennas 965 to receive a transmission of data carried on the second component carrier CC2 during the LBT radio frame 915.

The base station may, in some examples, transmit information to the UE with a CUBS 960. The transmitted information may include the indication to use four antennas 965 for receiving a transmission carried on the second component carrier CC2 during the LBT radio frame 915. In other examples, the UE may autonomously determine a number of antennas to use for receiving a transmission carried on the first component carrier CC1 and/or the second component carrier CC2. The autonomous determination may be based, for example, on a UE autonomous determination of whether the base station won contention to access the first component carrier CC1 and/or the second component carrier CC2 (e.g., based on the detection of a CUBS transmitted over each of the first component carrier CC1 and/or the second component carrier CC2).

In some examples, when the number of antennas to use for receiving a transmission carried on a component carrier is adjusted, a precoding matrix, a rank, and/or a modulation and coding scheme (MCS) for a data transmission carried on the component carrier may be adjusted based at least in part on the number of antennas to use for receiving the transmission carried on the component carrier in a radio frequency spectrum band. In some examples, an increase in the number of antennas to use for receiving a transmission carried on a component carrier may enable an increase in the MCS, and consequently, an increase in the data rate.

Figure 10:
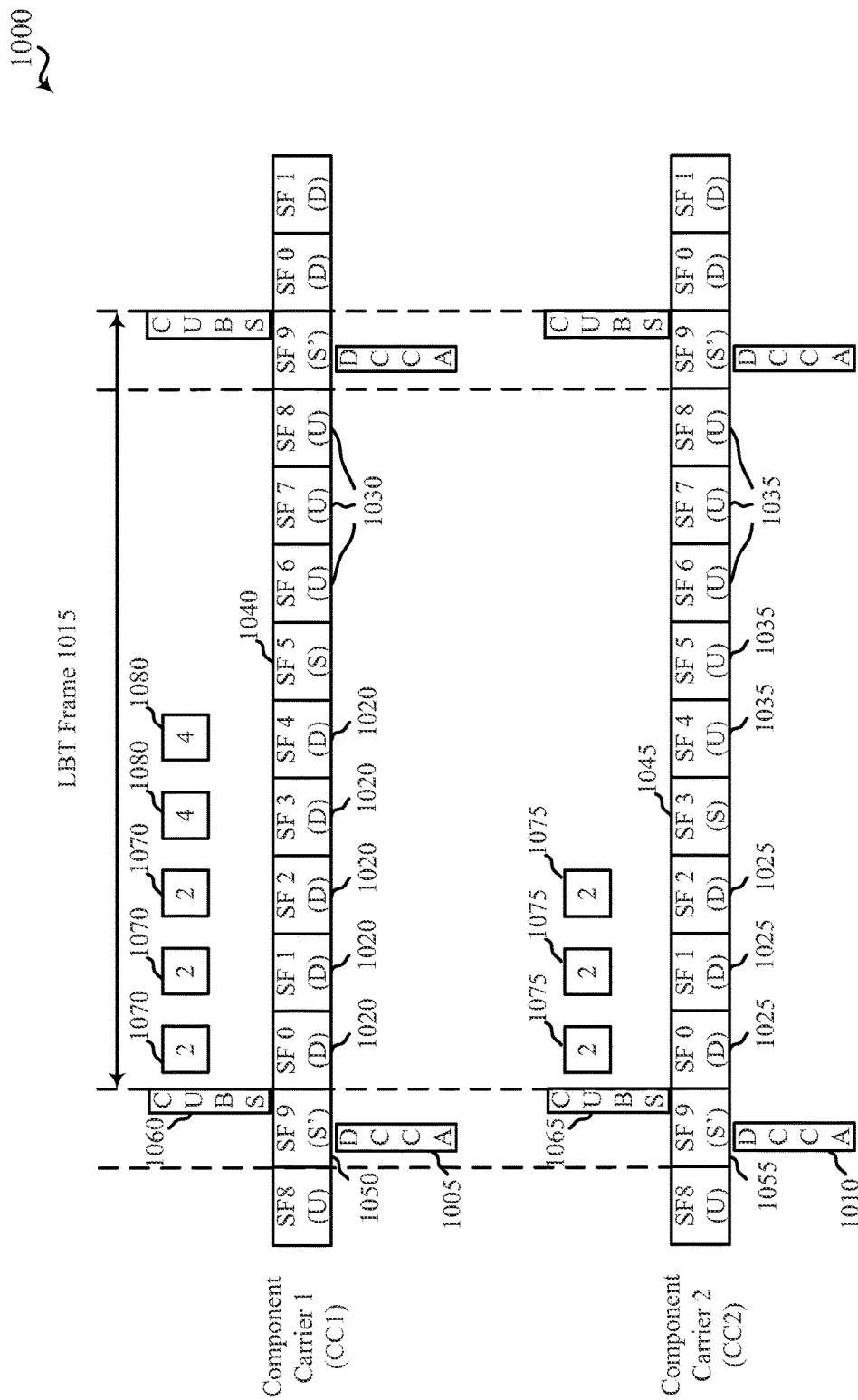
FIG. 10 shows an example of how information indicating a number of antennas to use for receiving a transmission carried on a component carrier may be determined and used, in accordance with various aspects of the present disclosure.

FIG. 10 shows an example 1000 of how information indicating a number of antennas to use for receiving a transmission carried on a component carrier may be determined and used, in accordance with various aspects of the present disclosure. More particularly, FIG. 10 shows an LBT radio frame 1015 (or gating interval) for transmission of a first component carrier (CC1) and a second component carrier (CC2) in an unlicensed radio frequency spectrum band. Upon a base station winning contention to access the first component carrier CC1 and/or the second component carrier CC2, the base station may transmit a signal indicating access to the first component carrier CC1 and/or the second component carrier CC2 in the unlicensed radio frequency spectrum band to a UE. In some examples, the base station may be an example of one or more aspects of the base station 105, 205, and/or 205-*a* described with reference to FIGS. 1 and/or 2, and/or the UE may be an example of one or more aspects of the UE 115, 215, 215-*a*, 215-*b*, and/or 215-*c* described with reference to FIGS. 1 and/or 2.

By way of example, each of the first component carrier CC1 and the second component carrier CC2 may have a frame structure similar to the frame structure shown in FIG. 4. For example, the frame structure of each of the first component carrier CC1 and the second component carrier CC2 may include a number of downlink subframes 1020 or 1025, a number of uplink subframes 1030 or 1035, and two types of special subframes, an S subframe 1040 or 1045, and an S' subframe 1050 or 1055. The S subframe 1040 or 1045 may provide a transition between downlink subframes 1020 or 1025 and uplink subframes 1030 or 1035, while the S' subframe 1050 or 1055 may provide a transition between uplink subframes 1030 or 1035 and downlink subframes 1020 or 1025. In other examples, one or both of the first component carrier CC1 and the second component carrier CC2 may have a frame structure that differs more substantially from the frame structure shown in FIG. 4.

During the S' subframes 1050 and 1055, a base station may perform a first DCCA procedure 1005 (e.g., a first contention procedure) to contend for access to the first component carrier CC1 in an unlicensed radio frequency spectrum band during the LBT radio frame 1015. Similarly, the base station may perform a second DCCA procedure 1010 (e.g., a second contention procedure) to contend for access to the second component carrier CC2 in an unlicensed radio frequency spectrum band during the LBT radio frame 1015. When winning contention to transmit both the first component carrier CC1 and the second component carrier CC2 during the LBT radio frame 1015, the base station may transmit data on both the first component carrier CC1 and the second component carrier CC2 to a UE in the unlicensed radio frequency spectrum band. By way of example, and because the base station transmits downlink subframes 1020 and 1025 in subframes SF0, SF1, and SF2 of both the first component carrier CC1 and the second component carrier CC2, the transmission of data on the first component carrier CC1 by the base station may employ two antennas of the base station during the transmission of subframes SF0, SF1, and SF2 of the LBT radio frame 1015, and the transmission of data on the second component carrier CC2 may employ additional two antennas of the base station during the transmission of subframes SF0, SF1, and SF2 of the LBT radio frame 1015. Similarly, the UE receiving the transmission carried on the first component carrier CC1 and the second component carrier CC2 in the unlicensed radio frequency spectrum band during the subframes SF0, SF1, and SF2 may employ two antennas 1070 to receive the transmission carried on the first component carrier CC1 and additional two antennas 1075 to receive the transmission carried on the second component carrier CC2. However, because the uplink and downlink configurations of the first component carrier CC1 and the second component carrier CC2 are such that subframes SF3 and SF4 of the second component carrier CC2 do not carry downlink transmissions, the transmission of data on the first component carrier CC1 by the base station may employ four antennas of the base station during the transmission of subframes SF3 and SF4 of the LBT radio frame 1015. Similarly, the UE receiving the transmission carried on the first component carrier CC1 and the second component carrier CC2 in the unlicensed radio frequency spectrum band during the subframes SF3 and SF4 may employ four antennas 1080 to receive the transmission of the first component carrier CC1. The four antennas 1080 may include the additional two antennas 1075 that were used to receive the second component carrier CC2 during the subframes SF0, SF1, and SF2 of the LBT radio frame 1015.

The base station may in some examples transmit information indicating a number of antennas to use for receiving a transmission carried on the first component carrier CC1 and/or the second component carrier CC2. The information may in some examples be based on an uplink configuration and/or a downlink configuration of the first component carrier CC1 and/or the second component carrier CC2. In the scenario shown in FIG. 10, the information may indicate to the UE to use four antennas 1080 for receiving a transmission of data on the first component carrier CC1 during subframes SF3 and SF4 of the LBT radio frame 1015.

The base station may, in some examples, transmit information to the UE with a first CUBS 1060 following the successful first DCCA procedure 1005 and/or a second CUBS 1065 following the successful second DCCA procedure 1010. The transmitted information may include the indication to use the four antennas 1080 for receiving a transmission of data on the first component carrier CC1 during subframes SF3 and SF4 of the LBT radio frame 1015. In other examples, the UE may autonomously determine a number of antennas to use for receiving a transmission carried on the first component carrier CC1 and/or the second component carrier CC2. The autonomous determination may be based, for example, on a UE autonomous determination of whether the base station won contention to access the first component carrier CC1 and/or the second component carrier CC2 (e.g., based on the detection of a CUBS transmitted over each of the first component carrier CC1 and/or the second component carrier CC2) and/or the uplink and downlink configurations of the first component carrier CC1 and/or the second component carrier CC2.

In some examples, when the number of antennas to use for receiving a transmission carried on a component carrier is adjusted, a precoding matrix, a rank, and/or an MCS for a data transmission over the component carrier may be adjusted based at least in part on the number of antennas to use to receive the component carrier in a radio frequency spectrum band. In some examples, an increase in the number of antennas to use for receiving a transmission carried on a component carrier may enable an increase in the MCS, and consequently, an increase in the data rate.

In some examples of the wireless communication system 100 and/or 200 described with reference to FIGS. 1 and/or 2, a successful contention procedure (e.g., a DCCA procedure, extended DCCA procedure, UCCA procedure, or extended UCCA procedure) may conclude before a boundary of a next OFDM symbol period. When an apparatus wins contention to a radio frequency spectrum band during the contention procedure, it may be desirable to transmit a signal over the radio frequency spectrum band. The signal may be used to reserve the radio frequency spectrum band during the time between conclusion of the contention procedure and the start of the next OFDM symbol period. In some examples, the commencement of such a signal may not coincide with a boundary of an OFDM symbol period, slot, subframe, or other reference boundary, and the length of such a signal may be variable due to variances between the timing of when a contention procedure successfully concludes and the timing of a reference boundary following the successful conclusion of the contention procedure. FIGS. 11A, 11B, and 11C, 12, 13, 14, and 15 illustrate examples of such a signal.

Figure 11A:
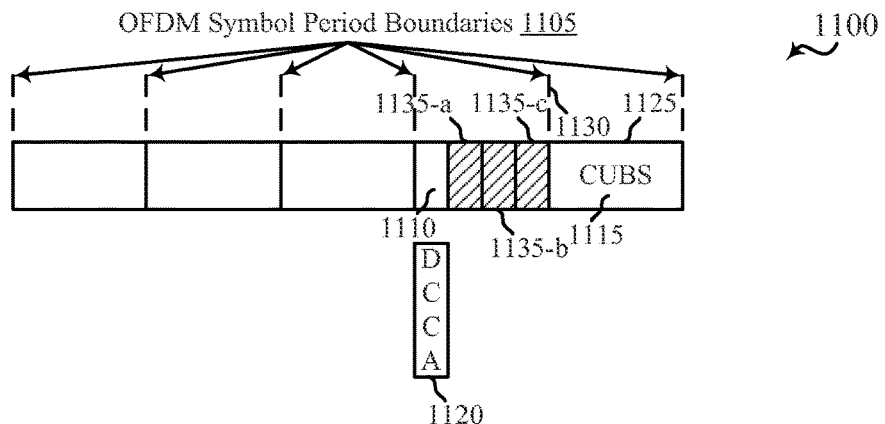
FIG. 11A shows an example of how a first signal may be transmitted to align a starting point of a second signal with a reference boundary associated with a radio frequency spectrum band, in accordance with various aspects of the present disclosure.

FIG. 11A shows an example 1100 of how a first signal may be transmitted to align a starting point of a second signal with a reference boundary associated with a radio frequency spectrum band, in accordance with various aspects of the present disclosure. More particularly, FIG. 11A shows a plurality of OFDM symbol periods bounded by a plurality of OFDM symbol period boundaries 1105. The OFDM symbol periods may include a first OFDM symbol period 1110 in which a DCCA procedure 1120 (e.g., a DCCA procedure similar to the DCCA procedure 440 described with reference to FIG. 4) may be performed. The OFDM symbol periods may also include a second OFDM symbol period 1115 in which a signal 1125 to indicate accessing the radio frequency spectrum band (e.g., a CUBS similar to the CUBS 445 described with reference to FIG. 4) may be transmitted.

In some examples, the DCCA procedure 1120 may be performed at a variable time within the first OFDM symbol period 1110. In some examples, a base station may perform the DCCA procedure 1120, and win contention to access the radio frequency spectrum band, prior to a reference boundary (e.g., the OFDM symbol period boundary 1130) associated with the radio frequency spectrum band. In these examples, the base station may transmit a first signal 1135 (e.g., a variable length training sequence including a first unit training signal 1135-a, a second unit training signal 1135-b, and a third unit training signal 1135-c) to align a starting point of a second signal (e.g., a starting point of the CUBS 1125) with the reference boundary.

In some examples, information as discussed above may be transmitted as part of the first signal 1135 (e.g., as part of the first unit training signal 1135-a, the second unit training signal 1135-b, and/or the third unit training signal 1135-c). In some examples, the first signal 1135 (e.g., the first unit training signal 1135-a, the second unit training signal 1135-b, and/or the third unit training signal 1135-c) may be usable for AGC by a UE.

In some examples, the first signal 1135 may be associated with a contention priority (e.g., a priority with which the DCCA procedure 1120 is performed), and the first signal 1135 may be transmitted during a portion of the first OFDM symbol period 1110 based at least in part on the contention priority. For example, a base station having a class of traffic or transmission with a higher priority may be configured to contend for access to a radio frequency spectrum band at an earlier portion of the first OFDM symbol period 1110 than a base station having a class of traffic or transmission with a lower priority. The first OFDM symbol period 1110 may provide relatively more or relatively fewer slots for performing DCCA procedures, and in some examples, slots for performing DCCA procedures may be provided over more than one OFDM symbol period. More slots for performing DCCA procedures translates to more control over the contention priorities of different base stations.

Figure 11B:
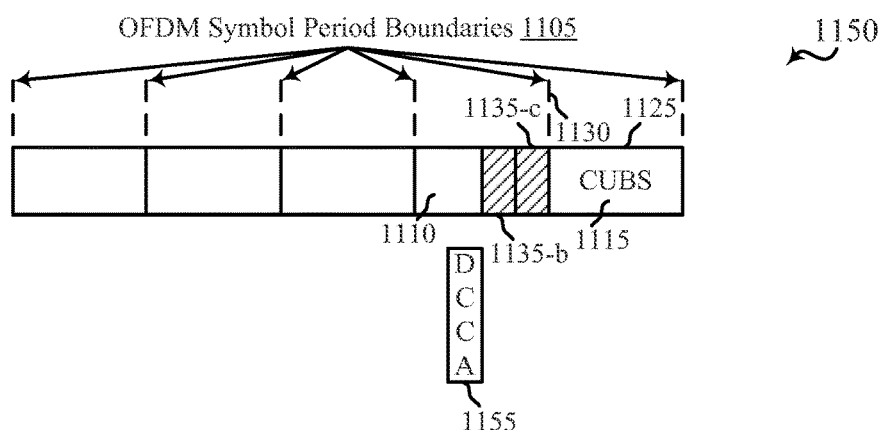
FIG. 11B shows an example of how a first signal may be transmitted to align a starting point of a second signal with a reference boundary associated with a radio frequency spectrum band, in accordance with various aspects of the present disclosure.

FIG. 11B shows an example 1150 of how a first signal may be transmitted to align a starting point of a second signal with a reference boundary associated with a radio frequency spectrum band, in accordance with various aspects of the present disclosure. More particularly, FIG. 11B shows a plurality of OFDM symbol periods bounded by a plurality of OFDM symbol period boundaries 1105. The OFDM symbol periods may include a first OFDM symbol period 1110 in which a DCCA procedure 1155 (e.g., a DCCA procedure similar to the DCCA procedure 440 described with reference to FIG. 4) may be performed. The OFDM symbol periods may also include a second OFDM symbol period 1115 in which a signal 1125 to indicate accessing the radio frequency spectrum band (e.g., a CUBS similar to the CUBS 445 described with reference to FIG. 4) may be transmitted.

In some examples, the DCCA procedure 1155 may be performed at a variable time within the first OFDM symbol period 1110. In some examples, a base station may perform the DCCA procedure 1155, and win contention to access the radio frequency spectrum band, prior to a reference boundary (e.g., the OFDM symbol period boundary 1130) associated with the radio frequency spectrum band. In these examples, the base station may transmit a first signal 1135 (e.g., a variable length training sequence including a first unit training signal 1135-b and a second unit training signal 1135-c) to align a starting point of a second signal (e.g., a starting point of the CUBS 1125) with the reference boundary. Because the timing of the DCCA procedure 1155 performed in the example 1150 is later within the first OFDM symbol period 1110 than the timing of the DCCA procedure 1120 performed in the example 1100, the length of the first signal described with reference to FIG. 11B may be shorter than the length of the first signal described with reference to FIG. 11A.

In some examples, information as discussed above may be transmitted as part of the first signal 1135 (e.g., as part of the first unit training signal 1135-b and/or the second unit training signal 1135-c). In some examples, the first signal 1135 (e.g., the first unit training signal 1135-b and/or the second unit training signal 1135-c) may be usable for AGC by a UE.

In some examples, the first signal 1135 may be associated with a contention priority (e.g., a priority with which the DCCA procedure 1155 is performed), and the first signal 1135 may be transmitted during a portion of the first OFDM symbol period 1110 based at least in part on the contention priority. For example, a base station having a class of traffic or transmission with a higher priority may be configured to contend for access to a radio frequency spectrum band at an earlier portion of the first OFDM symbol period 1110 than a base station having a class of traffic or transmission with a lower priority. The first OFDM symbol period 1110 may provide relatively more or relatively fewer slots for performing DCCA procedures, and in some examples, slots for performing DCCA procedures may be provided over more than one OFDM symbol period. More slots for performing DCCA procedures translates to more control over the contention priorities of different base stations.

Figure 11C:
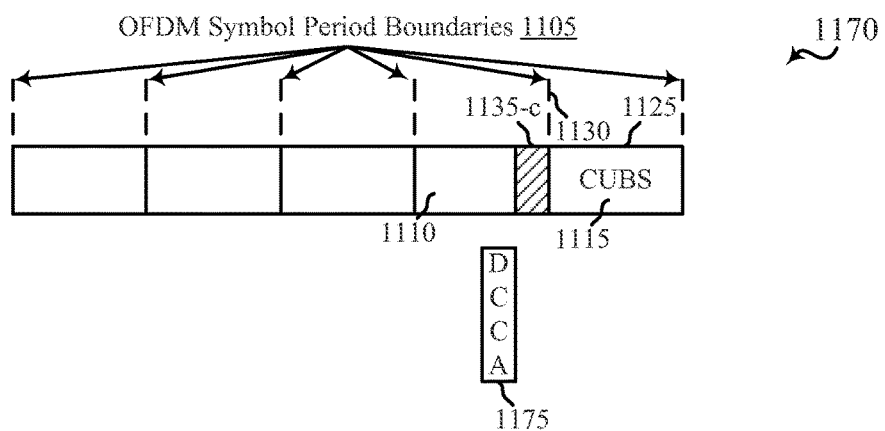
FIG. 11C shows an example of how a first signal may be transmitted to align a starting point of a second signal with a reference boundary associated with a radio frequency spectrum band, in accordance with various aspects of the present disclosure.

FIG. 11C shows an example 1170 of how a first signal may be transmitted to align a starting point of a second signal with a reference boundary associated with a radio frequency spectrum band, in accordance with various aspects of the present disclosure. More particularly, FIG. 11C shows a plurality of OFDM symbol periods bounded by a plurality of OFDM symbol period boundaries 1105. The OFDM symbol periods may include a first OFDM symbol period 1110 in which a DCCA procedure 1175 (e.g., a DCCA procedure similar to the DCCA procedure 440 described with reference to FIG. 4) may be performed. The OFDM symbol periods may also include a second OFDM symbol period 1115 in which a signal 1125 to indicate accessing the radio frequency spectrum band (e.g., a CUBS similar to the CUBS 445 described with reference to FIG. 4) may be transmitted.

In some examples, the DCCA procedure 1175 may be performed at a variable time within the first OFDM symbol period 1110. In some examples, a base station may perform the DCCA procedure 1175, and win contention to access the radio frequency spectrum band, prior to a reference boundary (e.g., the OFDM symbol period boundary 1130) associated with the radio frequency spectrum band. In these examples, the base station may transmit a first signal 1135 (e.g., a variable length training sequence including a unit training signal 1135-c) to align a starting point of a second signal (e.g., a starting point of the CUBS 1125) with the reference boundary. Because the timing of the DCCA procedure 1175 performed in the example 1170 is later within the first OFDM symbol period 1110 than the timing of the DCCA procedure 1120 or the DCCA procedure 1155 performed in the example 1100 or 1150, the length of the first signal described with reference to FIG. 11C may be shorter than the length of the first signal described with reference to FIGS. 11A and/or 11B.

In some examples, information as discussed above may be transmitted as part of the first signal 1135 (e.g., as part of the unit training signal 1135-c). In some examples, the first signal 1135 (e.g., the unit training signal 1135-c) may be usable for AGC by a UE.

In some examples, the first signal 1135 may be associated with a contention priority (e.g., a priority with which the DCCA procedure 1175 is performed), and the first signal 1135 may be transmitted during a portion of the first OFDM symbol period 1110 based at least in part on the contention priority. For example, a base station having a class of traffic or transmission with a higher priority may be configured to contend for access to a radio frequency spectrum band at an earlier portion of the first OFDM symbol period 1110 than a base station having a class of traffic or transmission with a lower priority. The first OFDM symbol period 1110 may provide relatively more or relatively fewer slots for performing DCCA procedures, and in some examples, slots for performing DCCA procedures may be provided over more than one OFDM symbol period. More slots for performing DCCA procedures translates to more control over the contention priorities of different base stations.

In some examples of the wireless communication system 100 and/or 200 described with reference to FIGS. 1 and/or 2, transmissions between a base station and a UE may be made in LBT radio frames of different size, such as, in LBT radio frames having durations of two milliseconds, five milliseconds, and/or ten milliseconds. In some examples, it may be useful to make one or more overhead channel transmissions at a time or times and/or at a frequency location and/or locations, regardless of the LBT radio frame duration. For example, it may be desirable to make one or more overhead channel transmissions during one or more subframes regardless of a change in an LBT radio frame in which an LBT procedure occurs. The overhead channels may include a CRS, eCRS, CSI-RS, synchronization signal, and/or a system information block (SIB) broadcast channel.

Figure 12:
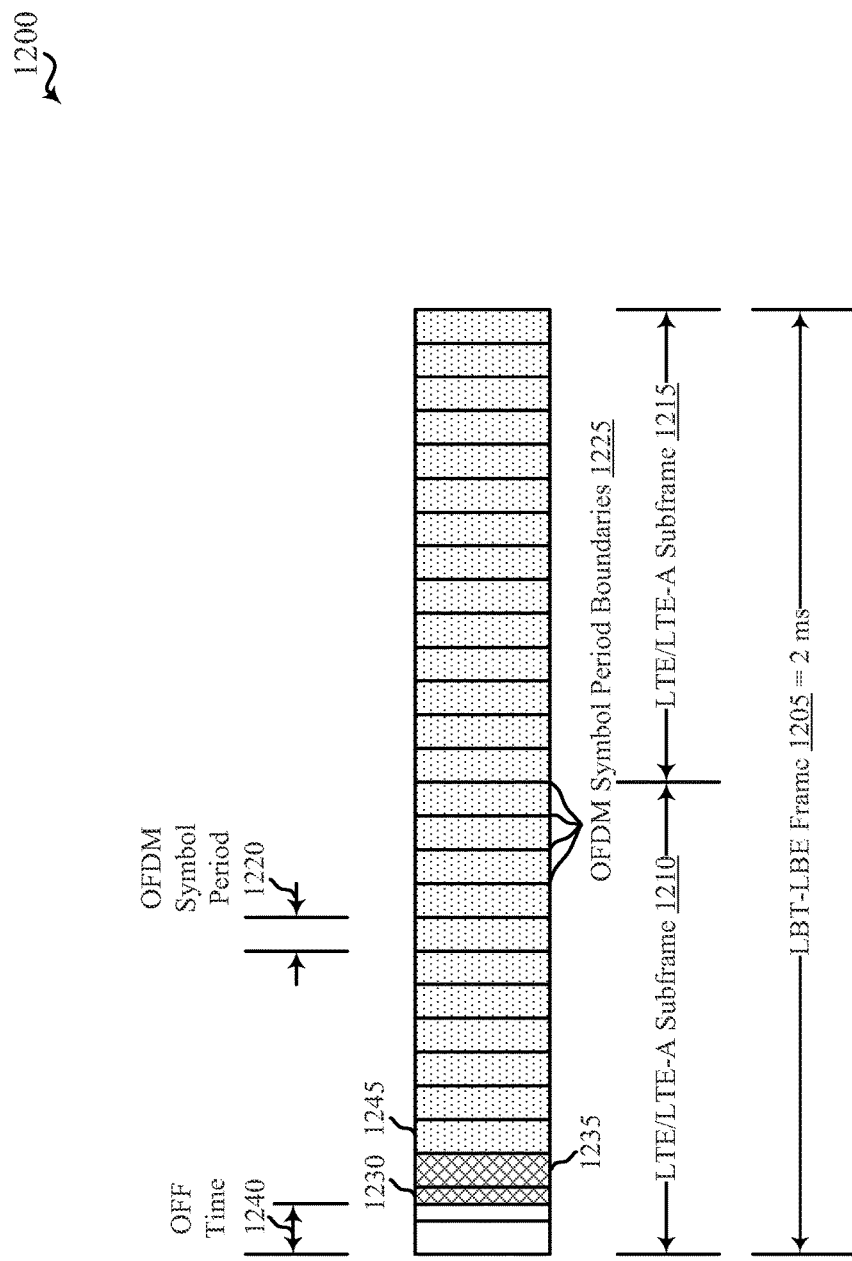
FIG. 12 shows an example of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure.

FIG. 12 shows an example 1200 of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure. More particularly, FIG. 12 shows an LBT-LBE radio frame 1205 having a duration of 2 ms. The LBT-LBE radio frame 1205 may include a first LTE/LTE-A subframe 1210 and a second LTE/LTE-A subframe 1215, each having a duration of 1 ms. Each of the first LTE/LTE-A subframe 1210 and the second LTE/LTE-A subframe 1215 may include a plurality of OFDM symbol periods 1220 (e.g., 14 OFDM symbol periods) bounded by a plurality of OFDM symbol period boundaries 1225.

In some examples, a base station may transmit a synchronization or alignment signal during a first part of the first LBT-LBE radio frame 1205 (e.g., at or near the beginning of the first LBT-LBE radio frame 1205). The synchronization or alignment signal may be transmitted, for example, because the timing of the start of the LBT-LBE radio frame 1205 can vary based on the timing of the conclusion of a successful extended CCA procedure (e.g., the timing of the conclusion of the successful extended CCA procedure can vary with reference to an OFDM symbol boundary, slot boundary, and/or subframe boundary of an LBT-FBE frame structure over the radio frequency spectrum band, with reference to the timing of a discovery signal (e.g., a CET) transmitted over the radio frequency spectrum band, and/or with reference to an OFDM symbol boundary, slot boundary, and/or subframe boundary of a transmission over a licensed radio frequency spectrum band (e.g., an OFDM symbol boundary, slot boundary, and/or subframe boundary of a transmission from a primary serving cell over the licensed radio frequency spectrum band)), and/or because OFDM symbol level synchronization may be desirable among the downlink transmissions of a base station or eNB.

In some examples, the synchronization or alignment signal may include a variable length training sequence 1230 (e.g., a fractional CUBS having a duration less than a duration of an OFDM symbol period 1220) but no fixed length training sequence 1235. In other examples, the synchronization or alignment signal may include a variable length training sequence 1230 and at least one fixed length training sequence 1235 (e.g., at least one CUBS, each spanning an OFDM symbol period). In other examples, the synchronization or alignment signal may include a fixed length training sequence 1235 but no variable length training sequence 1230. The variable length training sequence 1230 and/or fixed length training sequence 1235 (which may individually or collectively constitute a first signal) may in some examples be used to align a downlink transmission with a boundary 1230 of an OFDM symbol period 1220.

By way of example, FIG. 12 shows the first LTE/LTE-A subframe 1210 starting with an OFF time 1240, followed by a variable length training sequence 1230, a fixed length training sequence 1235, and a downlink transmission 1245. In some examples, the OFF time 1240 may have a duration of 100 microseconds (μsec), determined, for example, by a minimum OFF time of 100 μsec for LBT-FBE transmissions and a maximum OFF time of 100 μsec (5×20 μsec) for LBT-LBE transmissions.

Figure 13:
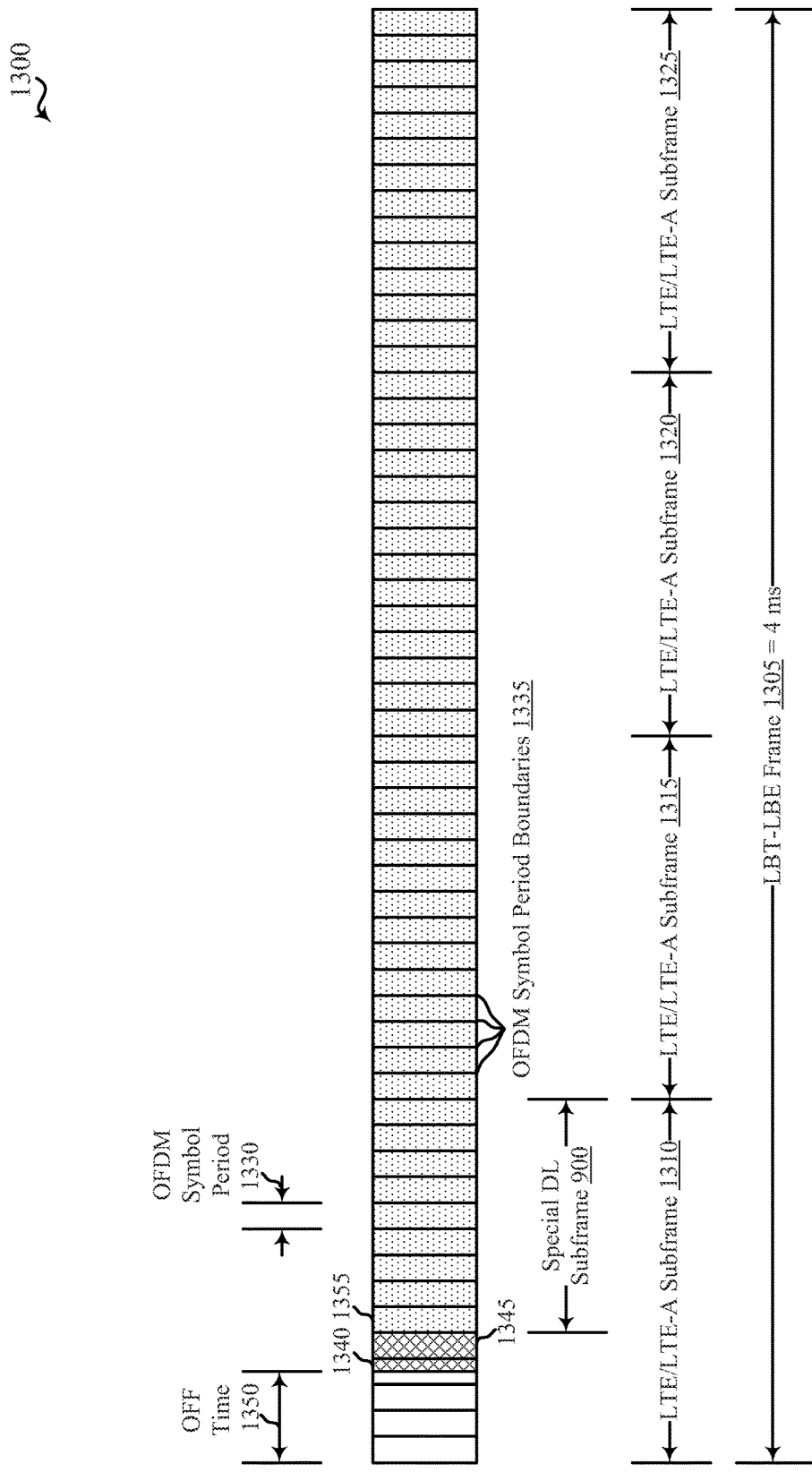
FIG. 13 shows an example of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure.

FIG. 13 shows an example 1300 of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure. More particularly, FIG. 13 shows an LBT-LBE radio frame 1305 having a duration of 4 ms. The LBT-LBE radio frame 1305 may include a first LTE/LTE-A subframe 1310, a second LTE/LTE-A subframe 1315, a third LTE/LTE-A subframe 1320, and a fourth LTE/LTE-A subframe 1325, each having a duration of 1 ms. Each of the first LTE/LTE-A subframe 1310, the second LTE/LTE-A subframe 1315, the third LTE/LTE-A subframe 1320, and the fourth LTE/LTE-A subframe 1325 may include a plurality of OFDM symbol periods 1330 (e.g., 14 OFDM symbol periods) bounded by a plurality of OFDM symbol period boundaries 1335.

In some examples, a base station may transmit a synchronization or alignment signal during a first part of the first LBT-LBE radio frame 1305 (e.g., at or near the beginning of the first LBT-LBE radio frame 1305). The synchronization or alignment signal may be transmitted, for example, because the timing of the start of the LBT-LBE radio frame 1305 can vary based on the timing of the conclusion of a successful extended CCA procedure (e.g., the timing of the conclusion of the successful extended CCA procedure can vary with reference to an OFDM symbol boundary, slot boundary, and/or subframe boundary of an LBT-FBE frame structure over the radio frequency spectrum band, with reference to the timing of a discovery signal (e.g., a CET) transmitted over the radio frequency spectrum band, and/or with reference to an OFDM symbol boundary, slot boundary, and/or subframe boundary of a transmission over a licensed radio frequency spectrum band (e.g., an OFDM symbol boundary, slot boundary, and/or subframe boundary of a transmission from a primary serving cell over the licensed radio frequency spectrum band)), and/or because OFDM symbol level synchronization may be desirable among the downlink transmissions of a base station or eNB.

In some examples, the synchronization or alignment signal may include a variable length training sequence 1340 (e.g., a fractional CUBS having a duration less than a duration of an OFDM symbol period 1330) but no fixed length training sequence 1345. In other examples, the synchronization or alignment signal may include a variable length training sequence 1340 and at least one fixed length training sequence 1345 (e.g., at least one CUBS, each spanning an OFDM symbol period). In other examples, the synchronization or alignment signal may include a fixed length training sequence 1345 but no variable length training sequence 1340. The variable length training sequence 1340 and/or fixed length training sequence 1345 (which may individually or collectively constitute a first signal) may in some examples be used to align a downlink transmission with a boundary 1335 of an OFDM symbol period 1330.

By way of example, FIG. 13 shows the first LTE/LTE-A subframe 1310 starting with an OFF time 1350, followed by a variable length training sequence 1340, a fixed length training sequence 1345, and a downlink transmission 1355. In some examples, the OFF time 1350 may have a duration of 200 microseconds (μsec), determined, for example, by a minimum OFF time of 200 μsec for LBT-FBE transmissions and a maximum OFF time of 200 μsec (10×20 μsec) for LBT-LBE transmissions.

Figure 14:
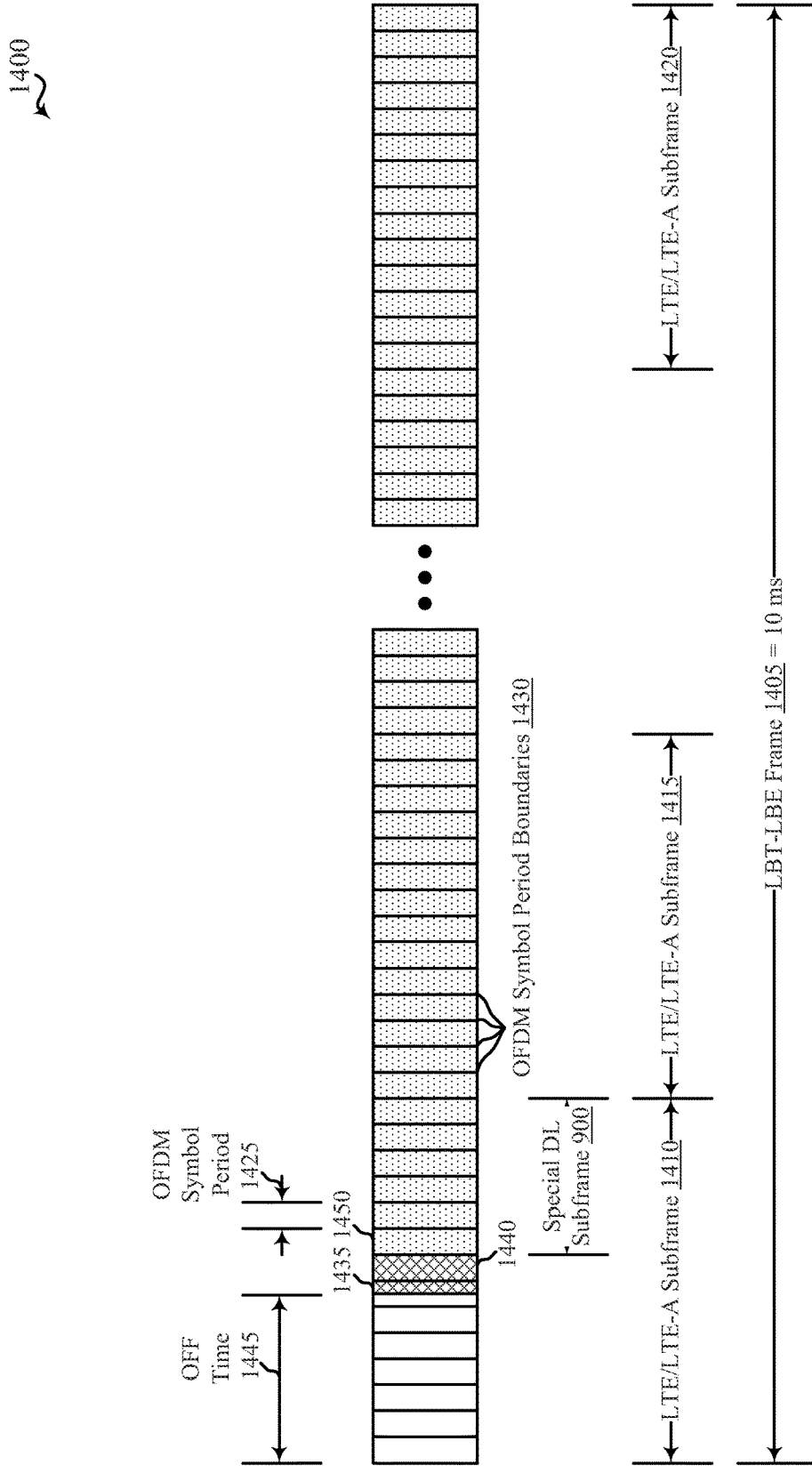
FIG. 14 shows an example of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure.

FIG. 14 shows an example 1400 of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure. More particularly, FIG. 14 shows an LBT-LBE radio frame 1405 having a duration of 10 ms. The LBT-LBE radio frame 1405 may include ten LTE/LTE-A subframes, including a first LTE/LTE-A subframe 1410, a second LTE/LTE-A subframe 1415, and a tenth LTE/LTE-A subframe 1420, each having a duration of 1 ms. Each of the LTE/LTE-A subframes (including the first LTE/LTE-A subframe 1410, the second LTE/LTE-A subframe 1415, and the tenth LTE/LTE-A subframe 1420 may include a plurality of OFDM symbol periods 1425 (e.g., 14 OFDM symbol periods) bounded by a plurality of OFDM symbol period boundaries 1430.

In some examples, a base station may transmit a synchronization or alignment signal during a first part of the first LBT-LBE radio frame 1405 (e.g., at or near the beginning of the first LBT-LBE radio frame 1405). The synchronization or alignment signal may be transmitted, for example, because the timing of the start of the LBT-LBE radio frame 1405 can vary based on the timing of the conclusion of a successful extended CCA procedure (e.g., the timing of the conclusion of the successful extended CCA procedure can vary with reference to an OFDM symbol boundary, slot boundary, and/or subframe boundary of an LBT-FBE frame structure over the radio frequency spectrum band, with reference to the timing of a discovery signal (e.g., a CET) transmitted over the radio frequency spectrum band, and/or with reference to an OFDM symbol boundary, slot boundary, and/or subframe boundary of a transmission over a licensed radio frequency spectrum band (e.g., an OFDM symbol boundary, slot boundary, and/or subframe boundary of a transmission from a primary serving cell over the licensed radio frequency spectrum band)), and/or because OFDM symbol level synchronization may be desirable among the downlink transmissions of a base station or eNB.

In some examples, the synchronization or alignment signal may include a variable length training sequence 1435 (e.g., a fractional CUBS having a duration less than a duration of an OFDM symbol period 1425) but no fixed length training sequence 1440. In other examples, the synchronization or alignment signal may include a variable length training sequence 1435 and at least one fixed length training sequence 1440 (e.g., at least one CUBS, each spanning an OFDM symbol period). In other examples, the synchronization or alignment signal may include a fixed length training sequence 1440 but no variable length training sequence 1435. The variable length training sequence 1435 and/or fixed length training sequence 1440 (which may individually or collectively constitute a first signal) may in some examples be used to align a downlink transmission with a boundary 1430 of an OFDM symbol period 1425.

By way of example, FIG. 14 shows the first LTE/LTE-A subframe 1410 starting with an OFF time 1445, followed by a variable length training sequence 1435, a fixed length training sequence 1440, and a downlink transmission 1450. In some examples, the OFF time 1445 may have a duration of 500 microseconds (μsec), determined, for example, by a minimum OFF time of 500 μsec for LBT-FBE transmissions and a maximum OFF time of 500 μsec (25×20 μsec) for LBT-LBE transmissions.

Figure 15:
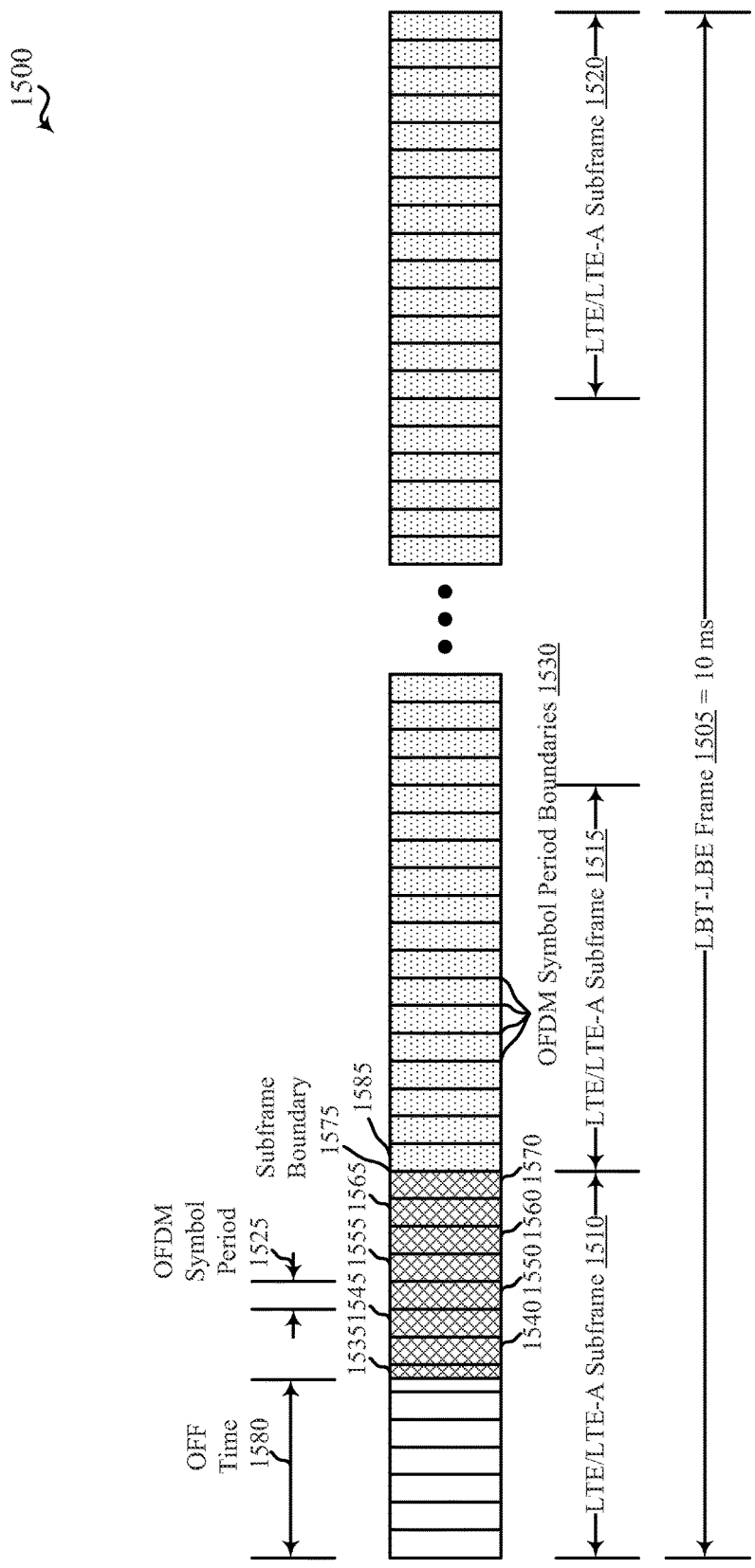
FIG. 15 shows an example of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure.

FIG. 15 shows an example 1500 of how a first signal may be transmitted while operating in an LBT-LBE mode of operation in a radio frequency spectrum band, to align a starting point of a second signal with a reference boundary associated with the radio frequency spectrum band, in accordance with various aspects of the present disclosure. More particularly, FIG. 15 shows an LBT-LBE radio frame 1505 having a duration of 10 ms. The LBT-LBE radio frame 1505 may include ten LTE/LTE-A subframes, including a first LTE/LTE-A subframe 1510, a second LTE/LTE-A subframe 1515, and a tenth LTE/LTE-A subframe 1520, each having a duration of 1 ms. Each of the LTE/LTE-A subframes (including the first LTE/LTE-A subframe 1510, the second LTE/LTE-A subframe 1515, and the tenth LTE/LTE-A subframe 1520 may include a plurality of OFDM symbol periods 1525 (e.g., 14 OFDM symbol periods) bounded by a plurality of OFDM symbol period boundaries 1530.

In some examples, a base station may transmit a synchronization or alignment signal during a first part of the first LBT-LBE radio frame 1505 (e.g., at or near the beginning of the first LBT-LBE radio frame 1505). The synchronization or alignment signal may be transmitted, for example, because the timing of the start of the LBT-LBE radio frame 1505 can vary based on the timing of the conclusion of a successful extended CCA procedure (e.g., the timing of the conclusion of the successful extended CCA procedure can vary with reference to an OFDM symbol boundary, slot boundary, and/or subframe boundary of an LBT-FBE frame structure over the radio frequency spectrum band, with reference to the timing of a discovery signal (e.g., a CET) transmitted over the radio frequency spectrum band, and/or with reference to an OFDM symbol boundary, slot boundary, and/or subframe boundary of a transmission over a licensed radio frequency spectrum band (e.g., an OFDM symbol boundary, slot boundary, and/or subframe boundary of a transmission from a primary serving cell over the licensed radio frequency spectrum band)), and/or because OFDM symbol level synchronization may be desirable among the downlink transmissions of a base station or eNB.

In some examples, the synchronization or alignment signal may include a variable length training sequence 1535 (e.g., a fractional CUBS having a duration less than a duration of an OFDM symbol period 1525) but no fixed length training sequence. In other examples, the synchronization or alignment signal may include a variable length training sequence 1535 and at least one fixed length training sequence 1540, 1545, 1550, 1555, 1560, 1565, and/or 1570 (e.g., at least one CUBS, each spanning an OFDM symbol period). In other examples, the synchronization or alignment signal may include a fixed length training sequence 1540, 1545, 1550, 1555, 1560, 1565, and/or 1570 but no variable length training sequence 1535. The variable length training sequence 1535 and/or fixed length training sequence 1540, 1545, 1550, 1555, 1560, 1565, and/or 1570 (which may individually or collectively constitute a first signal) may in some examples be used to align a downlink transmission with a boundary 1530 of an OFDM symbol period 1525, as well as a boundary 1575 of the second LTE/LTE-A subframe 1515.

By way of example, FIG. 15 shows the first LTE/LTE-A subframe 1510 starting with an OFF time 1580, followed by a variable length training sequence 1535, a plurality of fixed length training sequences 1540, 1545, 1550, 1555, 1560, 1565, and 1570, and a downlink transmission 1585. In some examples, the OFF time 1580 may have a duration of 500 microseconds (μsec), determined, for example, by a minimum OFF time of 500 μsec for LBT-FBE transmissions and a maximum OFF time of 500 μsec (25×20 μsec) for LBT-LBE transmissions.

FIG. 3 and FIGS. 12-15 illustrate LBT radio frames (e.g., LBT-FBE radio frames and/or LBT-LBE radio frames) having different durations (e.g., 2 ms, 4 ms, or 10 ms). The duration of an LBT radio frame may have an impact on uplink transmissions to a secondary serving cell over a radio frequency spectrum band. Uplink data transmissions are scheduled, and only UEs having scheduled uplink data transmissions may perform a UCCA procedure. In a time domain duplexing (TDD) frame configuration, a last downlink subframe before an uplink subframe may be truncated to provide for timing advance (TA) and performance of a UCCA procedure.

Scheduled uplink data transmissions (e.g., uplink subframes) may be advertised in a downlink subframe. The advertisement of uplink data transmissions helps to prevent neighboring base stations or eNBs from grabbing one or more channels of the radio frequency spectrum band needed for the scheduled uplink data transmissions and prevents blocking of reception on the uplink at the serving eNB.

In some examples, LBT radio frames may be transmitted to a UE from a secondary serving cell over a radio frequency spectrum band, and the LBT radio frames may have durations of 2 ms, with either all downlink subframe or all uplink subframe configurations. In these examples, uplink grants for the uplink subframes may be transmitted in downlink subframes of the secondary serving cell, with a UL grant delay of 2 ms or less. In some examples, LBT radio frames may be transmitted to a UE from a secondary serving cell over a radio frequency spectrum band, and the LBT radio frames may have durations of 4 ms or 5 ms, with either all downlink subframe or all uplink subframe configurations. In these examples, uplink grants for the uplink subframes may be transmitted in downlink subframes of the secondary serving cell, with a UL grant delay as specified in Release 8 of the LTE/LTE-A specification. Alternatively, uplink grants for the uplink subframes may be transmitted in downlink subframes of a primary serving cell, with a UL grant delay up to 1 ms longer or shorter than specified in Release 8 of the LTE/LTE-A specification. In some examples, LBT radio frames may be transmitted to a UE from a secondary serving cell over a radio frequency spectrum band, and the LBT radio frames may have durations of 10 ms, in accord with one or more TDD configurations including both downlink subframes and uplink subframes. In these examples, uplink grants for the uplink subframes may be transmitted in downlink subframes of the secondary serving cell, with a UL grant delay that is the same or similar as that specified in Release 8 of the LTE/LTE-A specification. Alternatively, uplink grants for the uplink subframes may be transmitted in downlink subframes of a primary serving cell, with a UL grant delay that is the same or similar as that specified in Release 11 of the LTE/LTE-A specification.

Figure 16:
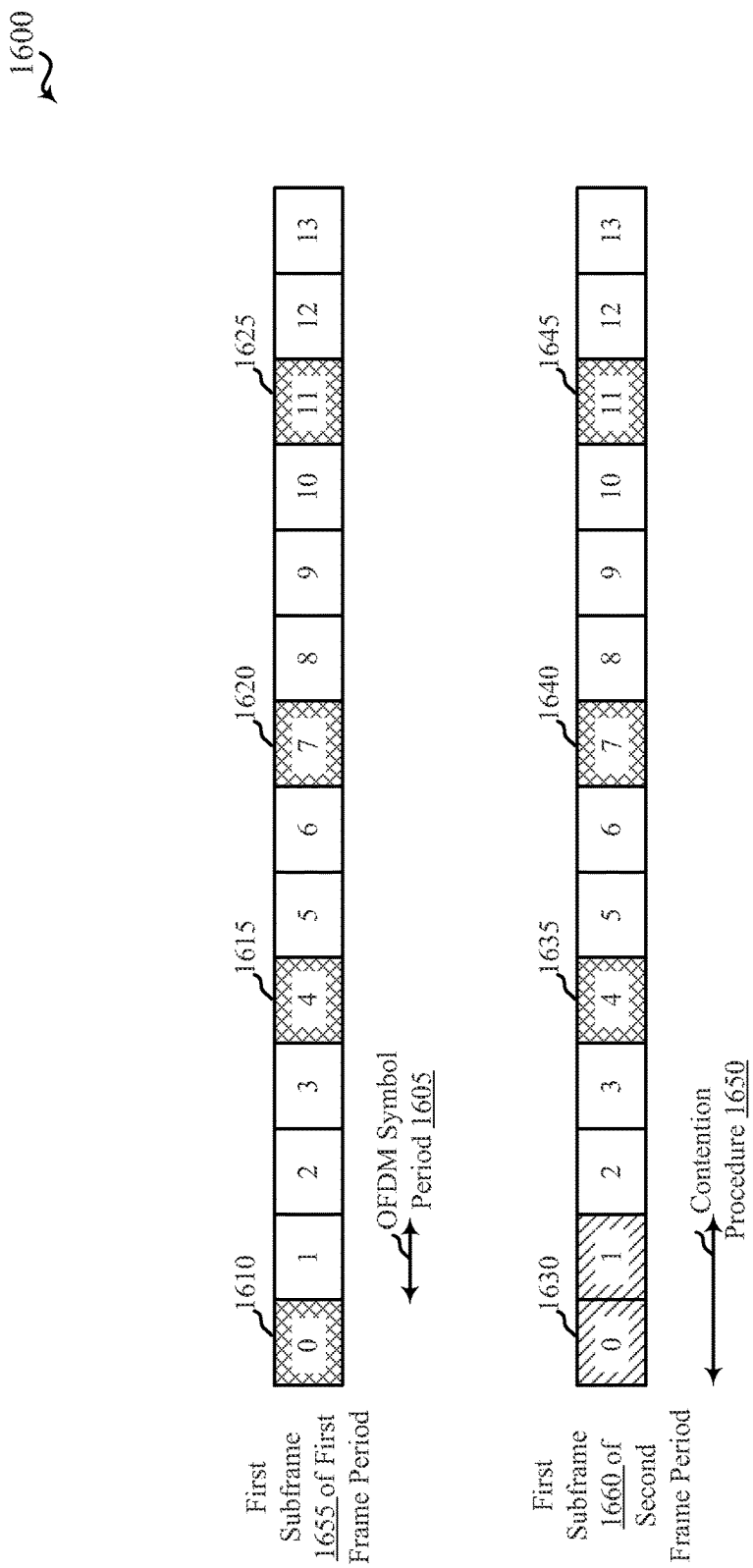
FIG. 16 shows an example of how one or more overhead transmission may be made in a radio frequency spectrum band, in accordance with various aspects of the present disclosure.

FIG. 16 shows an example 1600 of how one or more overhead transmission may be made in a radio frequency spectrum band, in accordance with various aspects of the present disclosure. More particularly, FIG. 16 shows a first subframe 1655 of a first frame period (e.g., a first LBT radio frame), and a first subframe 1660 of a second frame period (e.g., a second LBT radio frame). Each of the first subframe 1655 and the first subframe 1660 may include a plurality of OFDM symbol periods.

Upon winning contention to access a radio frequency spectrum band during the first frame period, a transmitting apparatus may transmit a signal at a periodicity (e.g., a fixed periodicity). The signal may be transmitted at the periodicity during one or more subframes (e.g., the first subframe 1655) of the first frame period. When the transmitting apparatus transmits a plurality of different frame periods (e.g., ten millisecond, five millisecond, and/or two millisecond frame periods), which the plurality of different frame periods include the second frame period, or when the transmitting apparatus selects the first frame period among a plurality of different frame periods including the second frame period, the transmitting apparatus may transmit the signal at the periodicity for each of the plurality of different frame periods. That is, the signal may be transmitted at the periodicity regardless of the frame in which the transmitting apparatus wins the contention, thereby making processing of the signal transparent to a receiving apparatus regardless of a change in the frame in which the transmitting apparatus wins the contention to access the radio frequency spectrum. In some examples, the signal may be transmitted in an overhead channel, and the overhead channels may include a CRS, eCRS, CSI-RS, synchronization signal, and/or an SIB broadcast channel.

As shown, the signal may be transmitted in OFDM symbol periods 1610, 1615, 1620, and/or 1625 of the first subframe 1655 of the first frame period. The signal may also or alternately be transmitted in OFDM symbol periods 1630, 1635, 1640, and/or 1645 of the first subframe 1660 of the second frame period. The OFDM symbol periods 1610, 1615, 1620, and 1625 may be aligned in time with respective ones of the OFDM symbol periods 1630, 1635, 1640, and 1645, to enable transmission of the signal at a fixed time or times. The signal may also be transmitted at a fixed frequency location or locations in each of the OFDM symbol periods.

When a transmission of the signal is determined to collide with a timing of a contention procedure 1650, transmission of the signal may be prevented. For example, transmission of the signal in the OFDM symbol period 1630 of the first subframe 1660 may be determined to collide with the timing of the contention procedure 1650, and thus, transmission of the signal during OFDM symbol period 1630 may be prevented.

Figure 17:
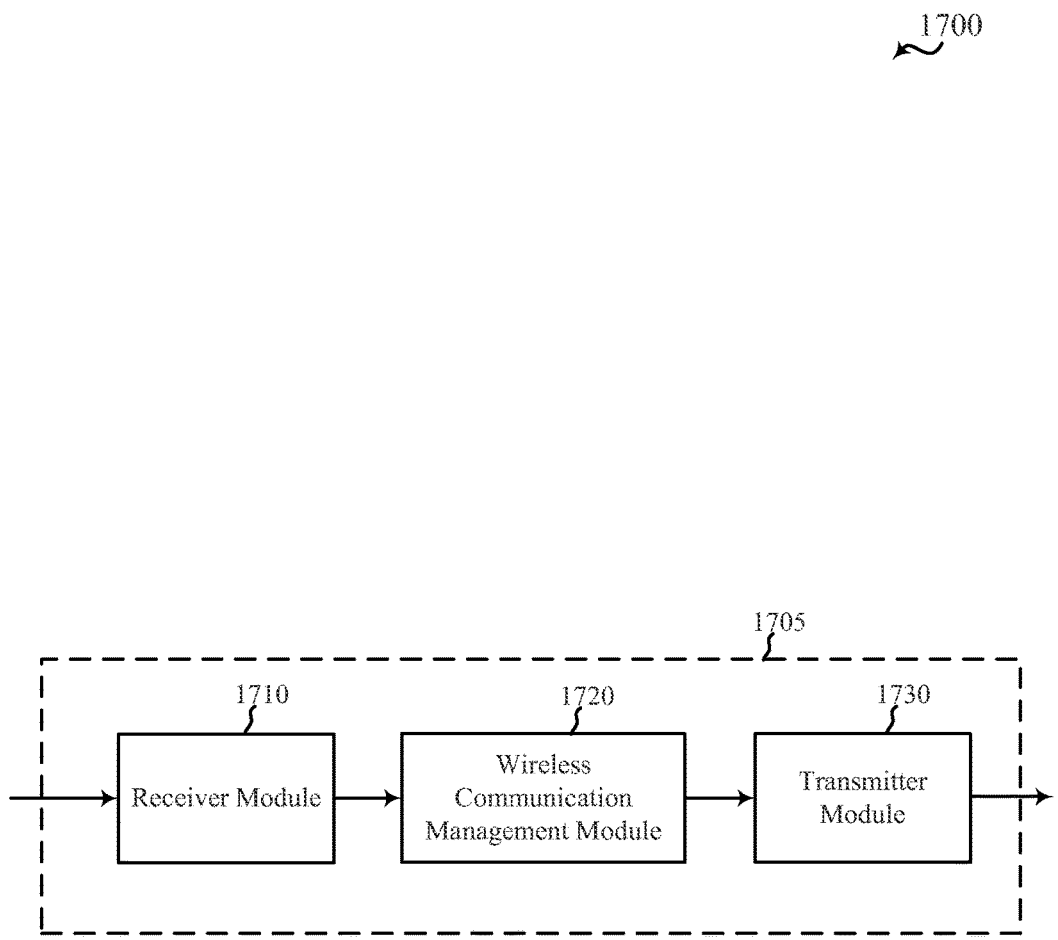
FIG. 17 shows a block diagram of an apparatus for use in wireless communication, in accordance with various aspects of the present disclosure.

FIG. 17 shows a block diagram 1700 of an apparatus 1705 for use in wireless communication, in accordance with various aspects of the present disclosure. In some examples, the apparatus 1705 may be an example of aspects of one or more of the base stations 105, 205, and/or 205-a described with reference to FIGS. 1 and/or 2, and/or an example of aspects of one or more of the UEs 115, 215, 215-a, 215-b, and/or 215-c described with reference to FIGS. 1 and/or 2. The apparatus 1705 may also be a processor. The apparatus 1705 may include a receiver module 1710, a wireless communication management module 1720, and/or a transmitter module 1730. Each of these components may be in communication with each other.

The components of the apparatus 1705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1710 may include at least one radio frequency (RF) receiver, such as at least one RF receiver operable to receive transmissions over a licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1710 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1730 may include at least one RF transmitter, such as at least one RF transmitter operable to transmit over the licensed radio frequency spectrum band and/or the unlicensed radio frequency spectrum band. The transmitter module 1730 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1720 may be used to manage one or more aspects of wireless communication for the apparatus 1705. In some examples, the wireless communication management module 1720 may be used to transmit information (e.g., N bits of information) over a channel in the radio frequency spectrum band. For example, the wireless communication management module 1720 may be used to transmit information with a signal that indicates accessing (e.g., the reserving of) a channel in the radio frequency spectrum band. In some examples, the signal that indicates accessing the channel in the radio frequency spectrum band may include a CUBS such as the CUBS 445 and/or 545 described with reference to FIGS. 4 and/or 5. In one example, the information may be transmitted as part of the signal that indicates accessing the channel in the radio frequency spectrum band. In another example, the information may be transmitted as a separate signal along with the signal that indicates accessing the channel in the radio frequency spectrum band. The transmitted information may aid a receiving apparatus in decoding a transmission that follows the information and/or enable the receiving apparatus to conserve power, etc.

In some examples, the wireless communication management module 1720 may be used to transmit a signal when a successful contention procedure (e.g., a DCCA procedure or UCCA procedure) concludes before a reference boundary associated with a radio frequency spectrum band (e.g., before a boundary of a next OFDM symbol period). The first signal may be used to align a starting point of a second signal with the reference boundary associated with the radio frequency spectrum band. In some examples, the commencement of the first signal may not coincide with a reference boundary of the radio frequency spectrum band, and the length of the first signal may be variable due to variances in the timing between when a contention procedure is performed and when a reference boundary (e.g., a boundary of a next OFDM symbol period) occurs.

In some examples, the wireless communication management module 1720 may be used to make one or more overhead channel transmissions (e.g., eCRS, CSI-RS, synchronization signal, and/or an SIB broadcast channel transmissions) at a time or times and/or at a frequency location and/or locations, regardless of the duration (e.g., two milliseconds, five milliseconds, and/or ten milliseconds) of an LBT radio frame period. For example, the wireless communication management module 1720 may make one or more overhead channel transmissions during one or more subframes regardless of the duration of an LBT radio frame in which the subframes occur.

Figure 18:
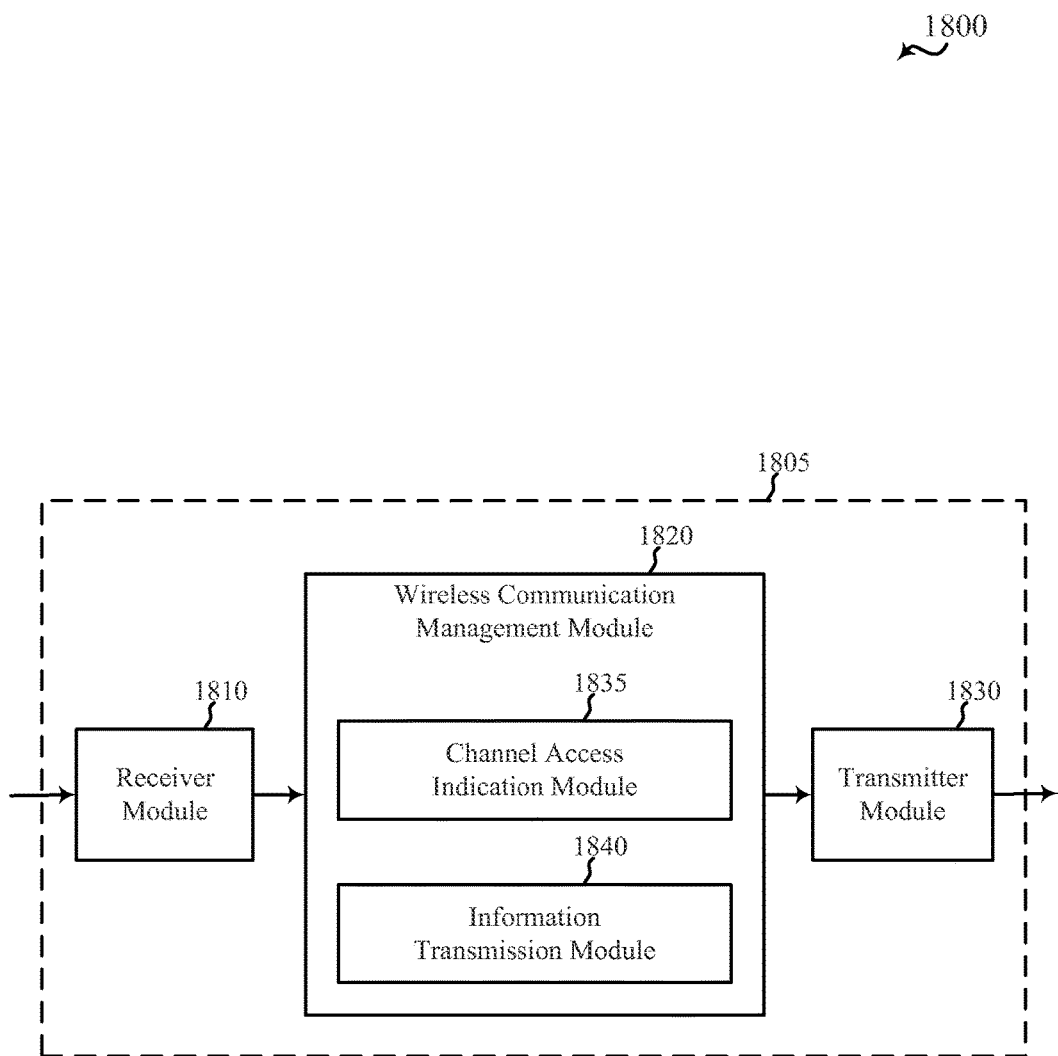
FIG. 18 shows a block diagram of an apparatus for use in wireless communication, in accordance with various aspects of the present disclosure.

FIG. 18 shows a block diagram 1800 of an apparatus 1805 for use in wireless communication, in accordance with various aspects of the present disclosure. In some examples, the apparatus 1805 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of the apparatus 1705 described with reference to FIG. 17. The apparatus 1805 may also be a processor. The apparatus 1805 may include a receiver module 1810, a wireless communication management module 1820, and/or a transmitter module 1830. Each of these components may be in communication with each other.

The components of the apparatus 1805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1810 may be an example of one or more aspects of the receiver module 1710 described with reference to FIG. 17. In some examples, the receiver module 1810 may include at least one radio frequency (RF) receiver, such as at least one RF receiver operable to receive transmissions over a licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module

1810 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1830 may be an example of one or more aspects of the transmitter module 1730 described with reference to FIG. 17. In some examples, the transmitter module 1830 may include at least one RF transmitter, such as at least one RF transmitter operable to transmit over the licensed radio frequency spectrum band and/or the unlicensed radio frequency spectrum band. The transmitter module 1830 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1820 may be an example of one or more aspects of the wireless communication management module 1720 described with reference to FIG. 17. The wireless communication management module 1820 may include a channel access indication module 1835 and/or an information transmission module 1840. Each of these components may be in communication with each other.

In some examples, the channel access indication module 1835 may be used to transmit a first signal to indicate accessing (e.g., a reserving of) a first channel in the radio frequency spectrum band.

In some examples, the channel access indication module 1835 may transmit the first signal using a plurality of interleaved resource blocks. Transmitting the first signal in this manner may enable the first signal to occupy at least a certain percentage of the available frequency bandwidth in the radio frequency spectrum band and/or satisfy one or more regulatory requirements (e.g., a requirement that the first signal occupy at least 80% of the available frequency bandwidth).

In some examples, the information transmission module 1840 may be used to transmit information with the first signal in the radio frequency spectrum band. The transmitted information may include various types of information. In some examples, the information may include a cell ID, a PLMN ID, or a combination thereof. In some examples, the information may indicate a frame structure for transmission in the radio frequency spectrum band (e.g., the LBT radio frame duration). In some examples, the information may indicate a number of subframes and/or symbols that will be used for transmission in a frame structure in the radio frequency spectrum band (e.g., five subframes are used for transmission in a ten millisecond frame duration that includes ten subframes). An indication of a number of subframes and/or symbols that will be used for transmission in a frame structure in the radio frequency spectrum band may enable a receiving apparatus, such as a UE, to enter a low power state at an earlier time (e.g., immediately after receiving the transmitted subframes), thereby conserving power. In some examples, the information may indicate an uplink configuration and/or a downlink configuration for transmission in the radio frequency spectrum band (e.g., an uplink configuration and/or a downlink configuration of a frame structure in the radio frequency spectrum band). An indication of an uplink configuration and/or a downlink configuration for transmission in the radio frequency spectrum band may improve the performance of eIMTA functionality. In some examples, the information may indicate whether a maximum number of subframes, of a frame, are used for transmission in the radio frequency spectrum band (e.g., a single bit may be used to indicate whether a maximum number of subframes are used for transmission in a frame structure of the radio frequency spectrum band, or whether fewer than the maximum number of subframes are used for transmission in the frame structure of the radio frequency spectrum band). In some examples, the information may indicate a number of antennas to use for receiving a transmission carried on a component carrier in the radio frequency spectrum band (e.g., a number of antennas to receive transmission of the component carrier during a frame structure of the radio frequency spectrum band, as described, for example, with reference to FIGS. 9 and/or 10). The information may also or alternatively include any combination of the above types of information and/or other types of information, including other types of system information.

Figure 19:
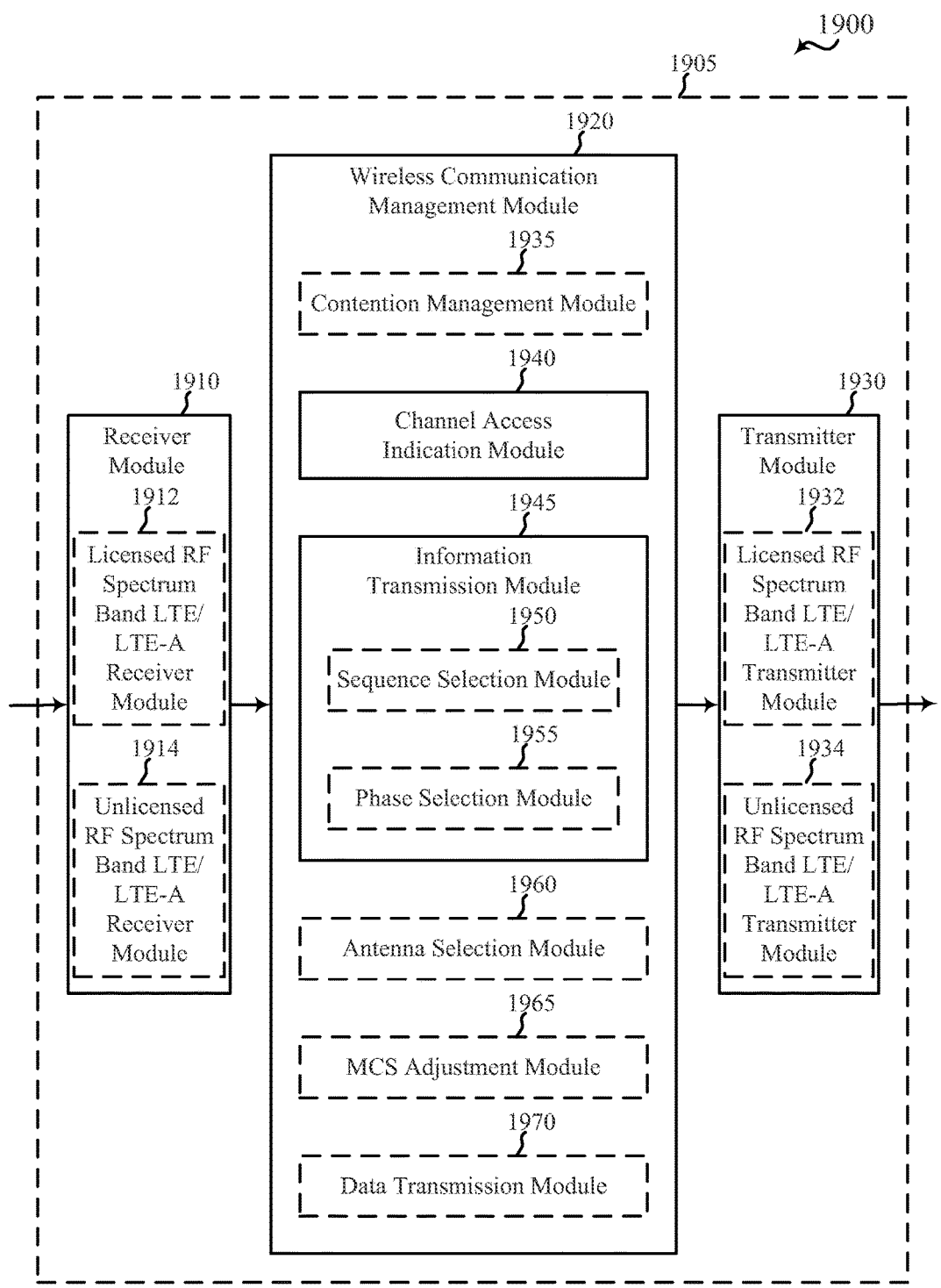
FIG. 19 shows a block diagram of an apparatus for use in wireless communication, in accordance with various aspects of the present disclosure.

FIG. 19 shows a block diagram 1900 of an apparatus 1905 for use in wireless communication, in accordance with various aspects of the present disclosure. In some examples, the apparatus 1905 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of the apparatus 1705 and/or 1805 described with reference to FIGS. 17 and/or 18. The apparatus 1905 may also be a processor. The apparatus 1905 may include a receiver module 1910, a wireless communication management module 1920, and/or a transmitter module 1930. Each of these components may be in communication with each other.

The components of the apparatus 1905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1910 may be an example of one or more aspects of the receiver module 1710 and/or 1810 described with reference to FIGS. 17 and/or 18. In some examples, the receiver module 1910 may include at least one RF receiver, such as at least one RF receiver operable to receive transmissions over licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 1910 may in some cases include separate receivers for the licensed radio frequency spectrum band and the unlicensed radio frequency spectrum band. The separate receivers may, in some examples, take the form of a licensed RF spectrum band LTE/LTE-A receiver module 1912 for communicating over the licensed radio frequency spectrum band, and an unlicensed RF spectrum band LTE/LTE-A receiver module 1914 for communicating over the unlicensed radio frequency spectrum band. The receiver module 1910, including the licensed RF spectrum band LTE/LTE-A receiver module 1912 and/or the unlicensed RF spectrum band LTE/LTE-A receiver module 1914, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 1930 may be an example of one or more aspects of the transmitter module 1730 and/or 1830 described with reference to FIGS. 17 and/or 18. In some examples, the transmitter module 1930 may include at least one RF transmitter, such as at least one RF transmitter operable to transmit over the licensed radio frequency spectrum band and/or the unlicensed radio frequency spectrum band. The transmitter module 1930 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 1932 for communicating over the licensed radio frequency spectrum band, and an unlicensed RF spectrum band LTE/LTE-A transmitter module 1934 for communicating over the unlicensed radio frequency spectrum band. The transmitter module 1930, including the licensed RF spectrum band LTE/LTE-A transmitter module 1932 and/or the unlicensed RF spectrum band LTE/LTE-A transmitter module 1934, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 1920 may be an example of one or more aspects of the wireless communication management module 1720 and/or 1820 described with reference to FIGS. 17 and/or 18. The wireless communication management module 1920 may include a contention management module 1935, a channel access indication module 1940, an information transmission module 1945, an antenna selection module 1960, an MCS adjustment module 1965, and/or a data transmission module 1970. Each of these components may be in communication with each other.

In some examples, the contention management module 1935 may be used to perform a contention procedure to contend for access to one or more channels of the radio frequency spectrum band for a period of time (e.g., for a frame period of the radio frequency spectrum band).

In some examples, the channel access indication module 1940 may be an example of one or more aspects of the channel access indication module 1835 described with reference to FIG. 18. In some examples, the channel access indication module 1940 may be used to transmit a first signal to indicate accessing (e.g., a reserving of) a first channel in the radio frequency spectrum band. In some examples, the first signal may be transmitted following a successful contention for access to the first channel in the radio frequency spectrum band.

In some examples, the channel access indication module 1940 may transmit the first signal using a plurality of interleaved resource blocks. Transmitting the first signal in this manner may enable the first signal to occupy at least a certain percentage of the available frequency bandwidth in the radio frequency spectrum band and satisfy one or more regulatory requirements (e.g., a requirement that the first signal occupy at least 80% of the available frequency bandwidth).

In some examples, the information transmission module 1945 may be an example of one or more aspects of the information transmission module 1840 described with reference to FIG. 18. In some examples, the information transmission module 1945 may be used to transmit information with the first signal in the radio frequency spectrum band. The transmitted information may include various types of information. In some examples, the information may include a cell ID, a PLMN ID, or a combination thereof. In some examples, the information may indicate a frame structure for transmission in the radio frequency spectrum band (e.g., the LBT radio frame duration). In some examples, the information may indicate a number of subframes and/or symbols that will be used for transmission in a frame structure in the radio frequency spectrum band (e.g., five subframes are used for transmission in a ten millisecond frame duration that includes ten subframes). An indication of a number of subframes and/or symbols that will be used for transmission in a frame structure in the radio frequency spectrum band may enable a receiving apparatus, such as a UE, to enter a low power state at an earlier time (e.g., immediately after receiving the transmitted subframes), thereby conserving power. In some examples, the information may indicate an uplink configuration and/or a downlink configuration for transmission in the radio frequency spectrum band (e.g., an uplink configuration and/or a downlink configuration of a frame structure in the radio frequency spectrum band). An indication of an uplink configuration and/or a downlink configuration for transmission in an unlicensed radio frequency spectrum band may improve the performance of eIMTA functionality. In some examples, the information may indicate whether a maximum number of subframes, of a frame, are used for transmission in a radio frequency spectrum band (e.g., a single bit may be used to indicate whether a maximum number of subframes are used for transmission in a frame structure of the radio frequency spectrum band, or whether fewer than the maximum number of subframes are used for transmission in the frame structure of the radio frequency spectrum band). In some examples, the information may indicate a number of antennas to use for receiving a transmission carried on a component carrier in the radio frequency spectrum band (e.g., a number of antennas to receive transmission of the component carrier during a frame structure of the radio frequency spectrum band, as described, for example, with reference to FIGS. 9 and/or 11). The information may also or alternatively include any combination of the above types of information and/or other types of information, including other types of system information.

In some examples, the information transmission module 1945 may transmit information with the first signal by causing the channel access indication module 1940 to transmit the information as part of the first signal. For example, the information transmission module 1945 may include a sequence selection module 1950 that may be used to select or generate a sequence that is a function of the information to be transmitted. For example, the sequence may be a function of a cell ID, a PLMN ID, or a combination thereof. The sequence may also or alternatively be a function of any one or combination of the types of information referenced herein. In these examples, the information transmission module 1945 may cause the channel access indication module 1940 to generate the first signal based at least in part on the selected or generated sequence.

In other examples in which the information transmission module 1945 may transmit information with the first signal by transmitting the information as part of the first signal, the information transmission module 1945 may include a phase selection module 1955. The phase selection module 1955 may be used to select a first phase from among a plurality of phases for transmission of the first signal. Different phases of the plurality of phases may correspond to different information, and the first phase may correspond to information to be transmitted. In these examples, the information transmission module 1945 may cause the channel access indication module 1940 to transmit the first signal at the first phase.

In some examples, the information transmission module 1945 may transmit information with the first signal by transmitting the information in a second signal along with the first signal. The second signal may be separate from the first signal.

In some examples, the channel access indication module 1940 may transmit the first signal and the information during a single OFDM symbol period of the radio frequency spectrum band. In some examples, the channel access indication module 1940 may transmit the first signal during a first OFDM symbol period of the radio frequency spectrum band and a second OFDM symbol period of the radio frequency spectrum band, and the information transmission module 1945 may transmit information with the first signal by transmitting the information during the second OFDM symbol period of the radio frequency spectrum band. In some examples, the first OFDM symbol period of the radio frequency spectrum band and the second OFDM symbol period of the radio frequency spectrum band may be adjacent OFDM symbol periods.

In some examples, the information transmission module 1945 may transmit information with the first signal in the radio frequency spectrum band by transmitting a second signal carrying the information in the radio frequency spectrum band. When the first signal is transmitted during a first OFDM symbol period of the radio frequency spectrum band and a second OFDM symbol period of the radio frequency spectrum band, the information transmission module 1945 may in some examples transmit the second signal during the second OFDM symbol period of the radio frequency spectrum band. In these examples, the first signal may provide AGC information and/or a phase reference for the second signal.

When the information transmission module 1945 transmits information with the first signal in the radio frequency spectrum band by transmitting a second signal carrying the information in the radio frequency spectrum band, the first signal may be transmitted using a first plurality of interleaved resource blocks and/or the second signal may be transmitted using a second plurality of interleaved resource blocks. Transmitting the first signal and/or the second signal in this manner may enable the first signal and/or the second signal to occupy at least a certain percentage of the available frequency bandwidth in the radio frequency spectrum band and/or satisfy one or more regulatory requirements (e.g., a requirement that the first signal and/or second signal occupy at least 80% of the available frequency bandwidth).

In some examples, the antenna selection module 1960 may be used to determine a number of antennas to use for receiving a transmission carried on a component carrier in the radio frequency spectrum band. In some examples, the antenna selection module 1960 may be used to determine a number of antennas to use for receiving a transmission carried on the component carrier in the radio frequency spectrum band based at least in part on an uplink configuration or a downlink configuration associated with the component carrier (e.g., an uplink configuration or a downlink configuration associated with a frame and/or a subframe of the component carrier). In the same or other examples, the antenna selection module 1960 may determine the number of antennas to use for receiving a transmission carried on the component carrier in the radio frequency spectrum band based at least in part on a contention procedure associated with each of a plurality of component carriers used to serve a UE (e.g., based at least in part on a success or failure of the contention procedure performed for each of the plurality of component carriers).

In some examples, the antenna selection module 1960 may select the number of antennas to use for receiving a transmission carried on the component carrier in the radio frequency spectrum band for each subframe of a frame of the component carrier. In some examples, the antenna selection module 1960 may select the number of antennas to use for receiving a transmission carried on the component carrier in the radio frequency spectrum band for each frame of the component carrier.

In some examples, the MCS adjustment module 1965 may be used to adjust an MCS for a data transmission over the component carrier in the radio frequency spectrum band. The MCS may be adjusted based at least in part on the number of antennas to use to receive the component carrier in the radio frequency spectrum band. The wireless communication management module 1920 may also include a module for adjusting a precoding matrix and/or a rank for a data transmission.

In some examples, the data transmission module 1970 may be used to transmit a data transmission over a component carrier in the radio frequency spectrum band. In some examples, the data transmission may be transmitted in accordance with an adjusted precoding matrix, rank, and/or MCS.

Figure 20:
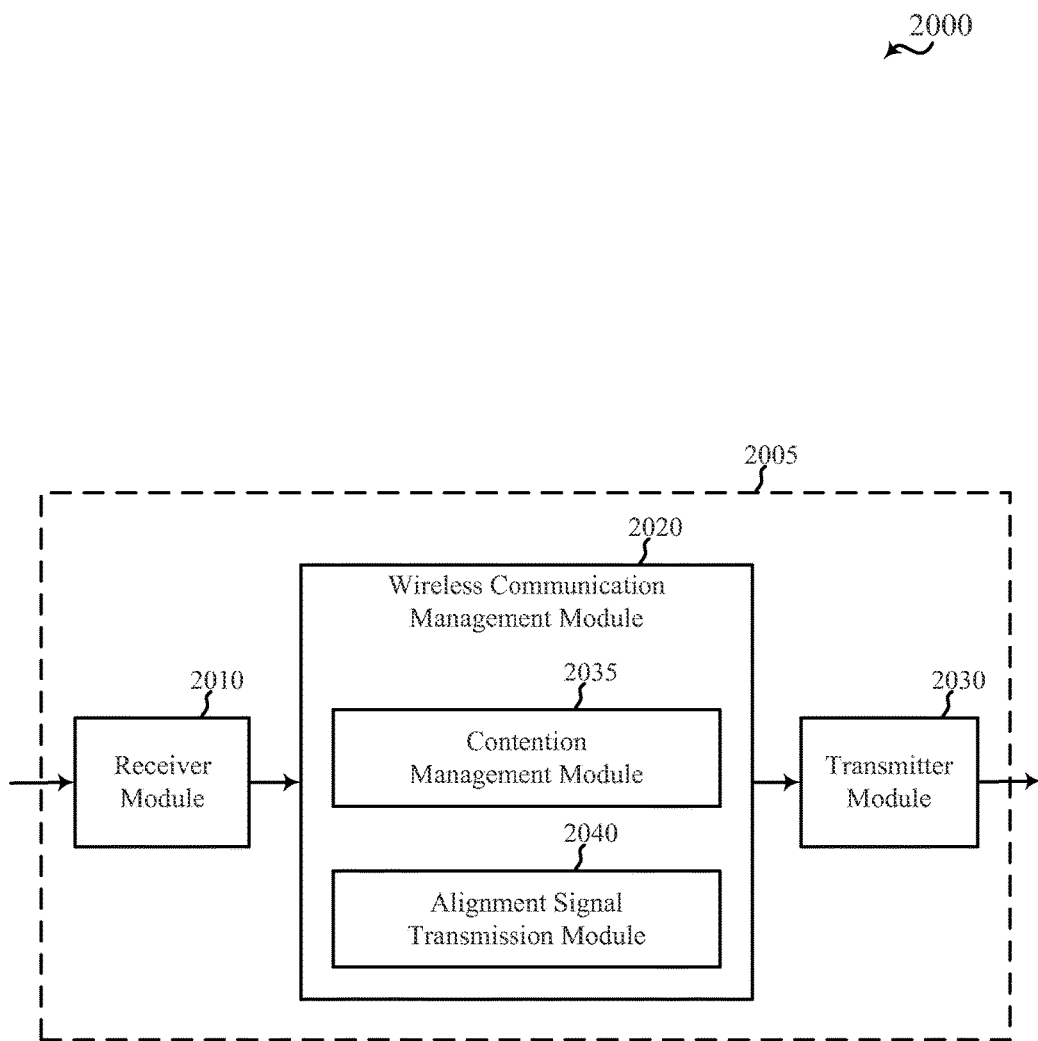
FIG. 20 shows a block diagram of an apparatus for use in wireless communication, in accordance with various aspects of the present disclosure.

FIG. 20 shows a block diagram 2000 of an apparatus 2005 for use in wireless communication, in accordance with various aspects of the present disclosure. In some examples, the apparatus 2005 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of the apparatus 1705 described with reference to FIG. 17. The apparatus 2005 may also be a processor. The apparatus 2005 may include a receiver module 2010, a wireless communication management module 2020, and/or a transmitter module 2030. Each of these components may be in communication with each other.

The components of the apparatus 2005 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2010 may be an example of one or more aspects of the receiver module 1710 described with reference to FIG. 17. In some examples, the receiver module 2010 may include at least one radio frequency (RF) receiver, such as at least one RF receiver operable to receive transmissions over a licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 2010 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2030 may be an example of one or more aspects of the transmitter module 1730 described with reference to FIG. 17. In some examples, the transmitter module 2030 may include at least one RF transmitter, such as at least one RF transmitter operable to transmit over the licensed radio frequency spectrum band and/or the unlicensed radio frequency spectrum band. The transmitter module 2030 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 2020 may be an example of one or more aspects of the wireless communication management module 1720 described with reference to FIG. 17. The wireless communication management module 2020 may include a contention management module 2035 and/or an alignment signal transmission module 2040. Each of these components may be in communication with each other.

In some examples, the contention management module 2035 may be used to perform a contention procedure to contend for access to one or more channels of the radio frequency spectrum band for a period of time (e.g., for a frame period of the radio frequency spectrum band).

In some examples, and after winning contention to access the radio frequency spectrum band, the alignment signal transmission module 2040 may be used to transmit a first signal to align a starting point of a second signal with a reference boundary associated with the radio frequency spectrum band. In some examples, the first signal may be transmitted before the second signal.

In some examples of the apparatus 2005, the first signal may include a variable length training sequence. The variable length training sequence may, in some examples, include one or more transmission units of fixed duration. In other examples of the apparatus 2005, the first signal may include a variable length training sequence and at least one fixed length training sequence.

In some examples of the apparatus 2005, the second signal may include a signal indicating the winning contention to access the radio frequency spectrum band (e.g., a CUBS). In other examples of the apparatus 2005 (e.g., examples in which the apparatus 2005 is operating in an LBT-LBE mode of operation in radio frequency spectrum band), the second signal may include a data transmission.

In examples of the apparatus 2005, the reference boundary may include a boundary of an OFDM symbol period. In these examples, the contention procedure performed by the contention management module 2035 may be performed in accordance with a contention priority during the OFDM symbol period. The contention priority may determine when the apparatus 2005 performs a contention procedure within the OFDM symbol period associated with the radio frequency spectrum band. Thus, the contention priority may provide to the apparatus 2005, when the apparatus 2005 performs a contention procedure earlier in time than another apparatus, a preference for winning the contention procedure over the other apparatus. In some examples of the apparatus 2005, the first signal may be associated with the contention priority of the apparatus 2005, such that the first signal is transmitted during a portion of the OFDM symbol period based at least in part on the contention priority. Thus, for example, the first signal may be transmitted over a greater portion of the OFDM symbol period when the first signal is associated with a contention priority that allows the apparatus 2005 to perform a contention procedure earlier within the OFDM symbol period. Similarly, and by way of further example, the first signal may be transmitted over a smaller portion of the OFDM symbol period when the first signal is associated with a contention priority that allows the apparatus 2005 to perform a contention procedure later within the OFDM symbol period.

In some examples, the alignment signal transmission module 2040 may transmit information as part of the first signal. The information may include, for example, AGC information and/or a phase reference for the second signal.

In some examples, the alignment signal transmission module 2040 may transmit the first signal using a plurality of interleaved resource blocks. Transmitting the first signal in this manner may enable the first signal to occupy at least a certain percentage of the available frequency bandwidth in the radio frequency spectrum band and/or satisfy one or more regulatory requirements (e.g., a requirement that the first signal occupy at least 80% of the available frequency bandwidth).

Figure 21:
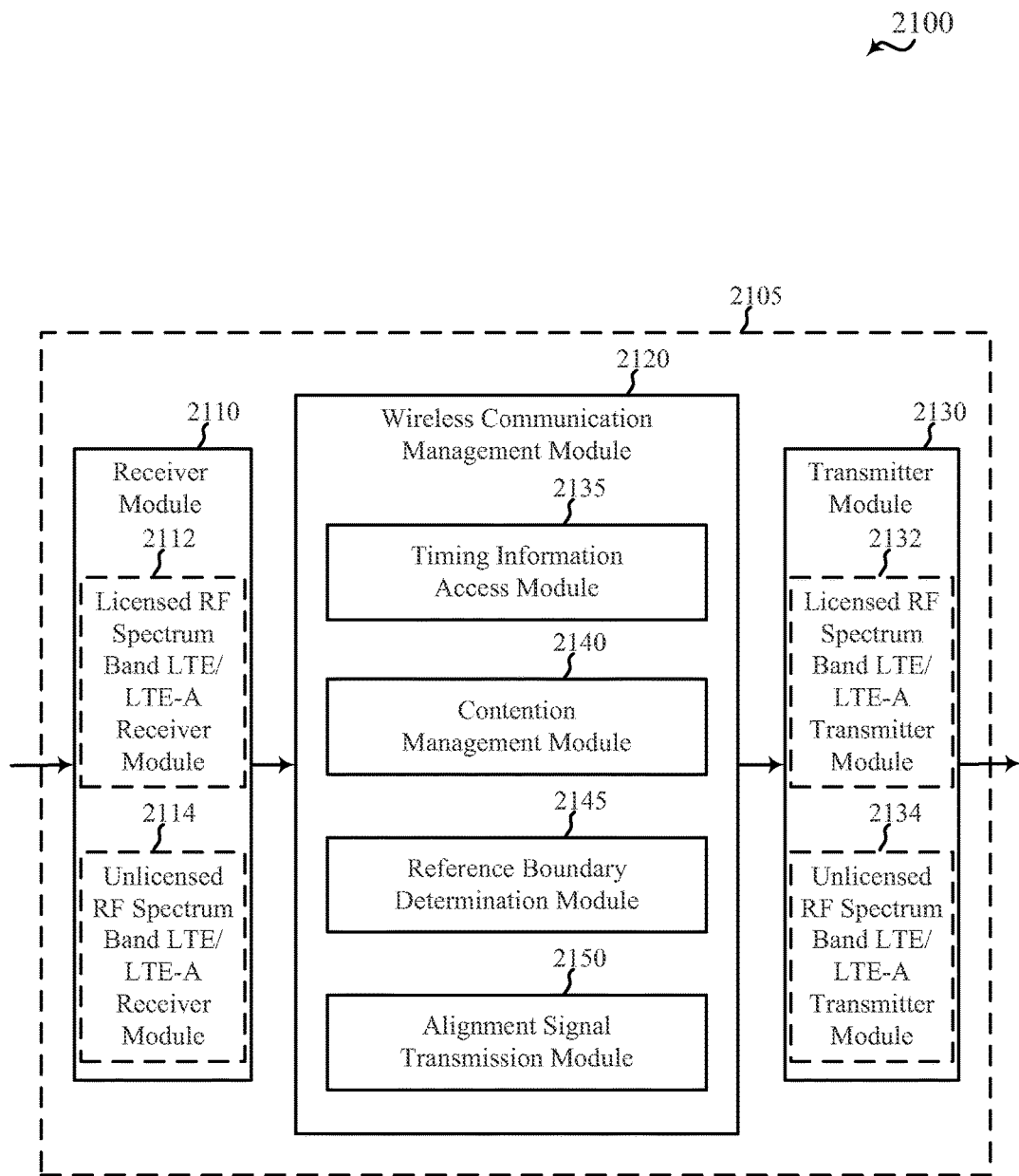
FIG. 21 shows a block diagram of an apparatus for use in wireless communication, in accordance with various aspects of the present disclosure.

FIG. 21 shows a block diagram 2100 of an apparatus 2105 for use in wireless communication, in accordance with various aspects of the present disclosure. In some examples, the apparatus 2105 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of the apparatus 1705 and/or 2005 described with reference to FIGS. 17 and/or 20. The apparatus 2105 may also be a processor. The apparatus 2105 may include a receiver module 2110, a wireless communication management module 2120, and/or a transmitter module 2130. Each of these components may be in communication with each other.

The components of the apparatus 2105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2110 may be an example of one or more aspects of the receiver module 1710 and/or 2010 described with reference to FIGS. 17 and/or 20. In some examples, the receiver module 2110 may include at least one RF receiver, such as at least one RF receiver operable to receive transmissions over licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 2110 may in some cases include separate receivers for the licensed radio frequency spectrum band and the unlicensed radio frequency spectrum band. The separate receivers may, in some examples, take the form of a licensed RF spectrum band LTE/LTE-A receiver module 2112 for communicating over the licensed radio frequency spectrum band, and an unlicensed RF spectrum band LTE/LTE-A receiver module 2114 for communicating over the unlicensed radio frequency spectrum band. The receiver module 2110, including the licensed RF spectrum band LTE/LTE-A receiver module 2112 and/or the unlicensed RF spectrum band LTE/LTE-A receiver module 2114, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2130 may be an example of one or more aspects of the transmitter module 1730 and/or 2030 described with reference to FIGS. 17 and/or 20. In some examples, the transmitter module 2130 may include at least one RF transmitter, such as at least one RF transmitter operable to transmit over the licensed radio frequency spectrum band and/or the unlicensed radio frequency spectrum band. The transmitter module 2130 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2132 for communicating over the licensed radio frequency spectrum band, and an unlicensed RF spectrum band LTE/LTE-A transmitter module 2134 for communicating over the unlicensed radio frequency spectrum band. The transmitter module 2130, including the licensed RF spectrum band LTE/LTE-A transmitter module 2132 and/or the unlicensed RF spectrum band LTE/LTE-A transmitter module 2134, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 2120 may be an example of one or more aspects of the wireless communication management module 1720 and/or 2020 described with reference to FIGS. 17 and/or 20. The wireless communication management module 2120 may include a timing information access module 2135, a contention management module 2140, a reference boundary determination module 2145, and/or an alignment signal transmission module 2150. Each of these components may be in communication with each other.

In some examples, the timing information access module 2135 may be used to access timing information. The timing information may include, for example, a timing of one or more reference boundaries associated with the radio frequency spectrum band.

In some examples, the contention management module 2140 may be an example of one or more aspects of the contention management module 2035 described with reference to FIG. 20. In some examples, the contention management module 2140 may be used to perform a contention procedure to contend for access to one or more channels of the radio frequency spectrum band for a period of time (e.g., for a frame period of the radio frequency spectrum band).

In some examples, the reference boundary determination module 2145 may be used to determine a reference boundary (e.g., a reference boundary occurring after the winning contention to access the radio frequency spectrum band) associated with the radio frequency spectrum band, based at least in part on the timing information and the winning contention to access the radio frequency spectrum band.

In some examples, the alignment signal transmission module 2150 may be an example of one or more aspects of the alignment signal transmission module 2040 described with reference to FIG. 20. In some examples, the alignment signal transmission module 2150 may be used to transmit a first signal to align a starting point of a second signal with the determined reference boundary associated with the radio frequency spectrum band. In some examples, the first signal may be transmitted before the second signal.

In some examples of the apparatus 2105, the first signal may include a variable length training sequence. The variable length training sequence may, in some examples, include one or more transmission units of fixed duration. In other examples of the apparatus 2105, the first signal may include a variable length training sequence and at least one fixed length training sequence.

In some examples of the apparatus 2105, the second signal may include a signal indicating the winning contention to access the radio frequency spectrum band (e.g., a CUBS). In other examples of the apparatus 2105 (e.g., examples in which the apparatus 2105 is operating in an LBT-LBE mode of operation in radio frequency spectrum band), the second signal may include a data transmission.

In examples of the apparatus 2105, the reference boundary may include a boundary of an OFDM symbol period. In these examples, the contention procedure performed by the contention management module 2140 may be performed in accordance with a contention priority during the OFDM symbol period. The contention priority may determine when the apparatus 2105 performs a contention procedure within the OFDM symbol period associated with the radio frequency spectrum band. Thus, the contention priority may provide to the apparatus 2105, when the apparatus 2105 performs a contention procedure earlier in time than another apparatus, a preference for winning the contention procedure over the other apparatus. In some examples of the apparatus 2105, the first signal may be associated with the contention priority of the apparatus 2105, such that the first signal is transmitted during a portion of the OFDM symbol period based at least in part on the contention priority. Thus, for example, the first signal may be transmitted over a greater portion of the OFDM symbol period when the first signal is associated with a contention priority that allows the apparatus 2105 to perform a contention procedure earlier within the OFDM symbol period. Similarly, and by way of further example, the first signal may be transmitted over a smaller portion of the OFDM symbol period when the first signal is associated with a contention priority that allows the apparatus 2105 to perform a contention procedure later within the OFDM symbol period.

In some examples, the reference boundary may include a boundary of a slot of a frame associated with the radio frequency spectrum band and/or a boundary of a subframe of a frame associated with the radio frequency spectrum band.

In some examples, the alignment signal transmission module 2150 may transmit information as part of the first signal. The information may include, for example, AGC information and/or a phase reference for the second signal.

In some examples, the alignment signal transmission module 2150 may transmit the first signal using a plurality of interleaved resource blocks. Transmitting the first signal in this manner may enable the first signal to occupy at least a certain percentage of the available frequency bandwidth in the radio frequency spectrum band and/or satisfy one or more regulatory requirements (e.g., a requirement that the first signal occupy at least 80% of the available frequency bandwidth).

Figure 22:
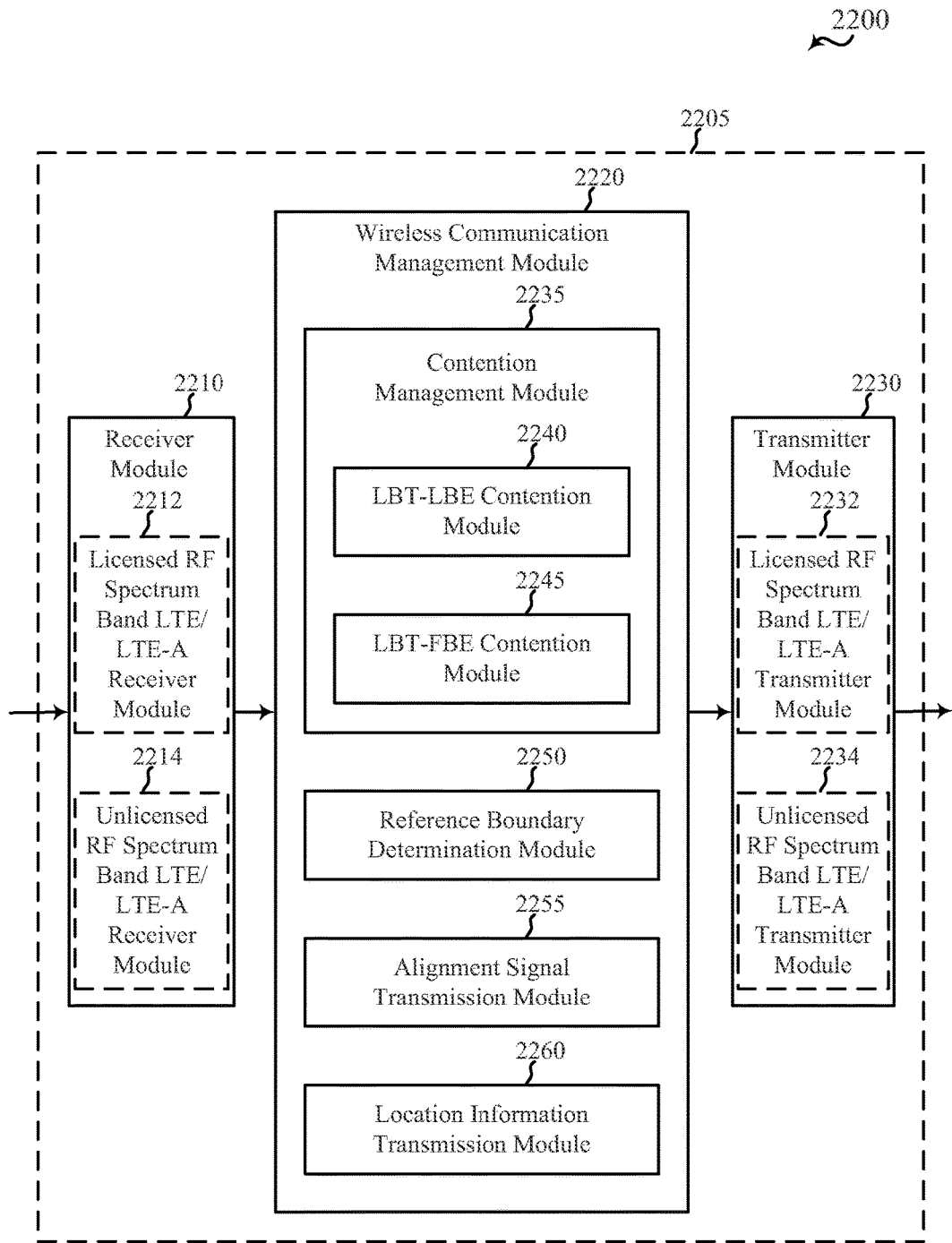
FIG. 22 shows a block diagram of an apparatus for use in wireless communication, in accordance with various aspects of the present disclosure.

FIG. 22 shows a block diagram 2200 of an apparatus 2205 for use in wireless communication, in accordance with various aspects of the present disclosure. In some examples, the apparatus 2205 may be an example of aspects of one or more of the base stations 105, 205, and/or 205-a described with reference to FIGS. 1 and/or 2, an example of aspects of one or more of the UEs 115, 215, 215-a, 215-b, and/or 215-c described with reference to FIGS. 1 and/or 2, and/or an example of aspects of the apparatus 1705 and/or 2005 described with reference to FIGS. 17 and/or 20. The apparatus 2205 may also be a processor. The apparatus 2205 may include a receiver module 2210, a wireless communication management module 2220, and/or a transmitter module 2230. Each of these components may be in communication with each other.

The components of the apparatus 2205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2210 may be an example of one or more aspects of the receiver module 1710 and/or 2010 described with reference to FIGS. 17 and/or 20. In some examples, the receiver module 2210 may include at least one RF receiver, such as at least one RF receiver operable to receive transmissions over licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 2210 may in some cases include separate receivers for the licensed radio frequency spectrum band and the unlicensed radio frequency spectrum band. The separate receivers may, in some examples, take the form of a licensed RF spectrum band LTE/LTE-A receiver module 2212 for communicating over the licensed radio frequency spectrum band, and an unlicensed RF spectrum band LTE/LTE-A receiver module 2214 for communicating over the unlicensed radio frequency spectrum band. The receiver module 2210, including the licensed RF spectrum band LTE/LTE-A receiver module 2212 and/or the unlicensed RF spectrum band LTE/LTE-A receiver module 2214, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2230 may be an example of one or more aspects of the transmitter module 1730 and/or 2030 described with reference to FIGS. 17 and/or 20. In some examples, the transmitter module 2230 may include at least one RF transmitter, such as at least one RF transmitter operable to transmit over the licensed radio frequency spectrum band and/or the unlicensed radio frequency spectrum band. The transmitter module 2230 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2232 for communicating over the licensed radio frequency spectrum band, and an unlicensed RF spectrum band LTE/LTE-A transmitter module 2234 for communicating over the unlicensed radio frequency spectrum band. The transmitter module 2230, including the licensed RF spectrum band LTE/LTE-A transmitter module 2232 and/or the unlicensed RF spectrum band LTE/LTE-A transmitter module 2234, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 2220 may be an example of one or more aspects of the wireless communication management module 1720 and/or 2020 described with reference to FIGS. 17 and/or 20. The wireless communication management module 2220 may include a contention management module 2235, a reference boundary determination module 2250, an alignment signal transmission module 2255, and/or a location information transmission module 2260. Each of these components may be in communication with each other.

In some examples, the contention management module 2235 may be an example of one or more aspects of the contention management module 2035 described with reference to FIG. 20. In some examples, the contention management module 2235 may be used to perform a contention procedure to contend for access to one or more channels of the radio frequency spectrum band for a period of time (e.g., for a frame period of the radio frequency spectrum band). In some examples, the contention management module 2235 may include an LBT-LBE contention module 2240 and/or an LBT-FBE contention module 2245. The LBT-LBE contention module 2240 may be used to perform a contention procedure (e.g., an extended CCA procedure) when the apparatus 2205 is operated in an LBT-LBE mode of operation over the radio frequency spectrum band. The LBT-FBE contention module 2245 may be used to perform a contention procedure (e.g., a CCA procedure) when the apparatus 2205 is operated in an LBT-FBE mode of operation over the radio frequency spectrum band. In some examples, the contention management module 2235 may determine which of the LBT-LBE contention module 2240 and the LBT-FBE contention module 2245 to use based, for example, on a historical success of winning contention to access the radio frequency spectrum band using the LBT-FBE contention module 2245.

In some examples, the reference boundary determination module 2250 may be used to determine a reference boundary (e.g., a reference boundary occurring after the winning contention to access the radio frequency spectrum band) associated with the radio frequency spectrum band, based at least in part on the winning contention to access the radio frequency spectrum band.

In some examples, the alignment signal transmission module 2255 may be an example of one or more aspects of the alignment signal transmission module 2040 described with reference to FIG. 20. In some examples, the alignment signal transmission module 2255 may be used to transmit a first signal, after the apparatus 2205 wins contention to access the radio frequency spectrum band, to indicate a timing of a radio frame boundary associated with the radio frequency spectrum band. In some examples, the alignment signal transmission module 2255 may transmit the first signal while the apparatus 2205 is operating in an LBT-LBE mode of operation over the radio frequency spectrum band.

In some examples, the location information transmission module 2260 may be used to transmit a second signal to convey location information of overhead signals in relation to the timing of the radio frame boundary. In some examples, the second signal may include RRC signaling. In some examples, the second signal may convey location information for a downlink control channel in relation to the radio frame boundary. In some examples, the second signal may convey location information for resources used for CSI feedback.

In some examples of the apparatus 2205, the first signal transmitted by the alignment signal transmission module 2255 may include the second signal transmitted by the location information transmission module 2260 (e.g., the first signal may be a CUBS that conveys the location information for overhead signals in relation to the timing of the radio frame boundary).

Figure 23:
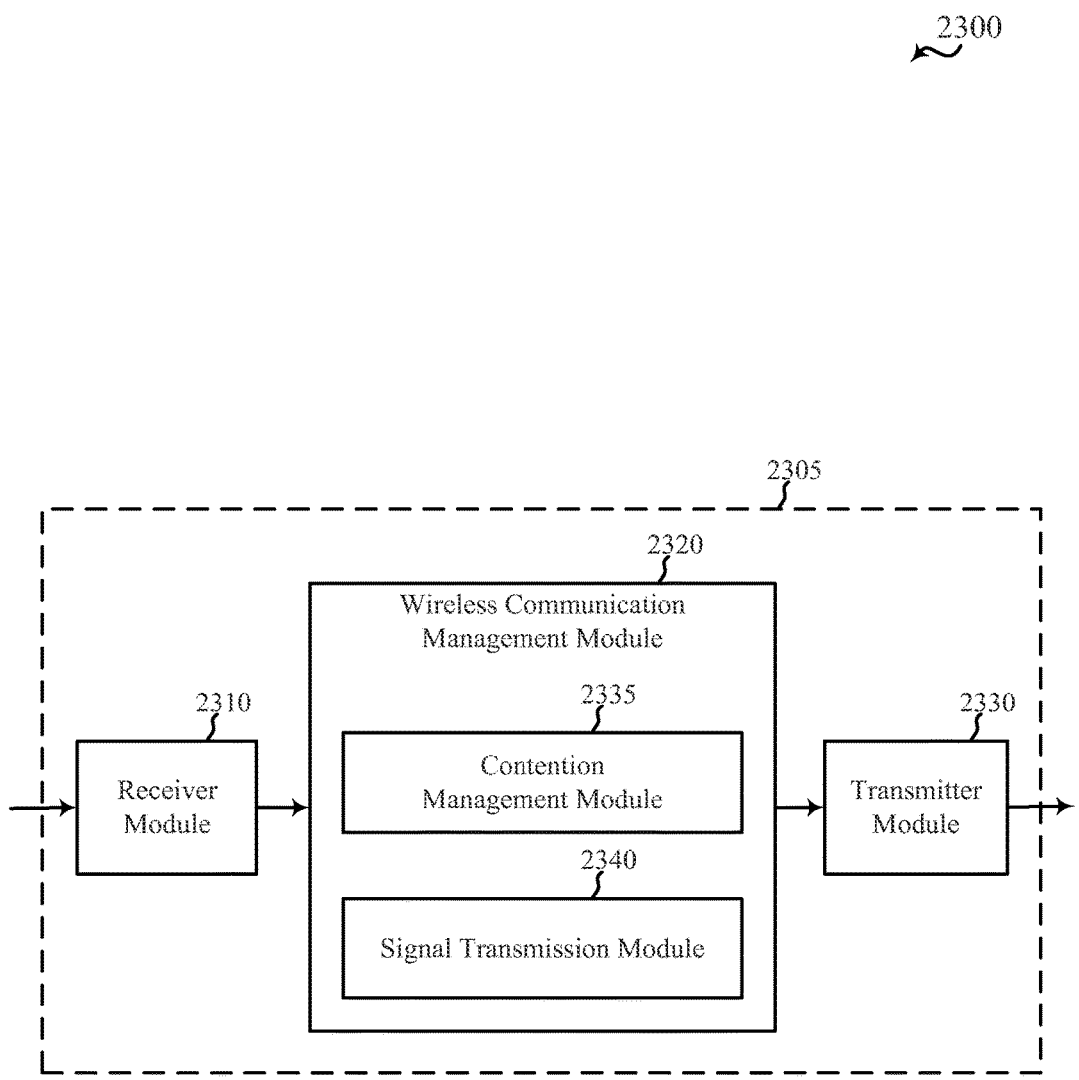
FIG. 23 shows a block diagram of an apparatus for use in wireless communication, in accordance with various aspects of the present disclosure.

FIG. 23 shows a block diagram 2300 of an apparatus 2305 for use in wireless communication, in accordance with various aspects of the present disclosure. In some examples, the apparatus 2305 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of the apparatus 1705 described with reference to FIG. 17. The apparatus 2305 may also be a processor. The apparatus 2305 may include a receiver module 2310, a wireless communication management module 2320, and/or a transmitter module 2330. Each of these components may be in communication with each other.

The components of the apparatus 2305 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2310 may be an example of one or more aspects of the receiver module 1710 described with reference to FIG. 17. In some examples, the receiver module 2310 may include at least one radio frequency (RF) receiver, such as at least one RF receiver operable to receive transmissions over a licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 2310 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2330 may be an example of one or more aspects of the transmitter module 1730 described with reference to FIG. 17. In some examples, the transmitter module 2330 may include at least one RF transmitter, such as at least one RF transmitter operable to transmit over the licensed radio frequency spectrum band and/or the unlicensed radio frequency spectrum band. The transmitter module 2330 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 2320 may be an example of one or more aspects of the wireless communication management module 1720 described with reference to FIG. 17. The wireless communication management module 2320 may include a contention management module 2335 and/or a signal transmission module 2340. Each of these components may be in communication with each other.

In some examples, the contention management module 2335 may be used to perform a contention procedure to contend for access to one or more channels of the radio frequency spectrum band for a period of time (e.g., for a frame period of the radio frequency spectrum band). In some examples, the contention management module 2335 may win contention to access the radio frequency spectrum band for a first frame period, which first frame period may be selected from a plurality of different frame periods (e.g., from a plurality of different frame periods having durations of two milliseconds, five milliseconds, and/or ten milliseconds). In some examples, the first frame period may be an LBT radio frame period. In some examples, each of the plurality of different frame periods may be an LBT radio frame period.

In some examples, the signal transmission module 2340 may be used to transmit a signal at a periodicity during one or more subframes of the first frame period for each of the plurality of different frame periods. In some examples, the periodicity may be a fixed periodicity and/or the signal transmission module 2340 may transmit the signal at a fixed time and/or a fixed frequency location, as described, for example, with reference to FIG. 16. In some examples, the signal transmission module 2340 may transmit the signal in an overhead channel). The overhead channels may include a CRS, eCRS, CSI-RS, synchronization signal, and/or an SIB broadcast channel.

Figure 24:
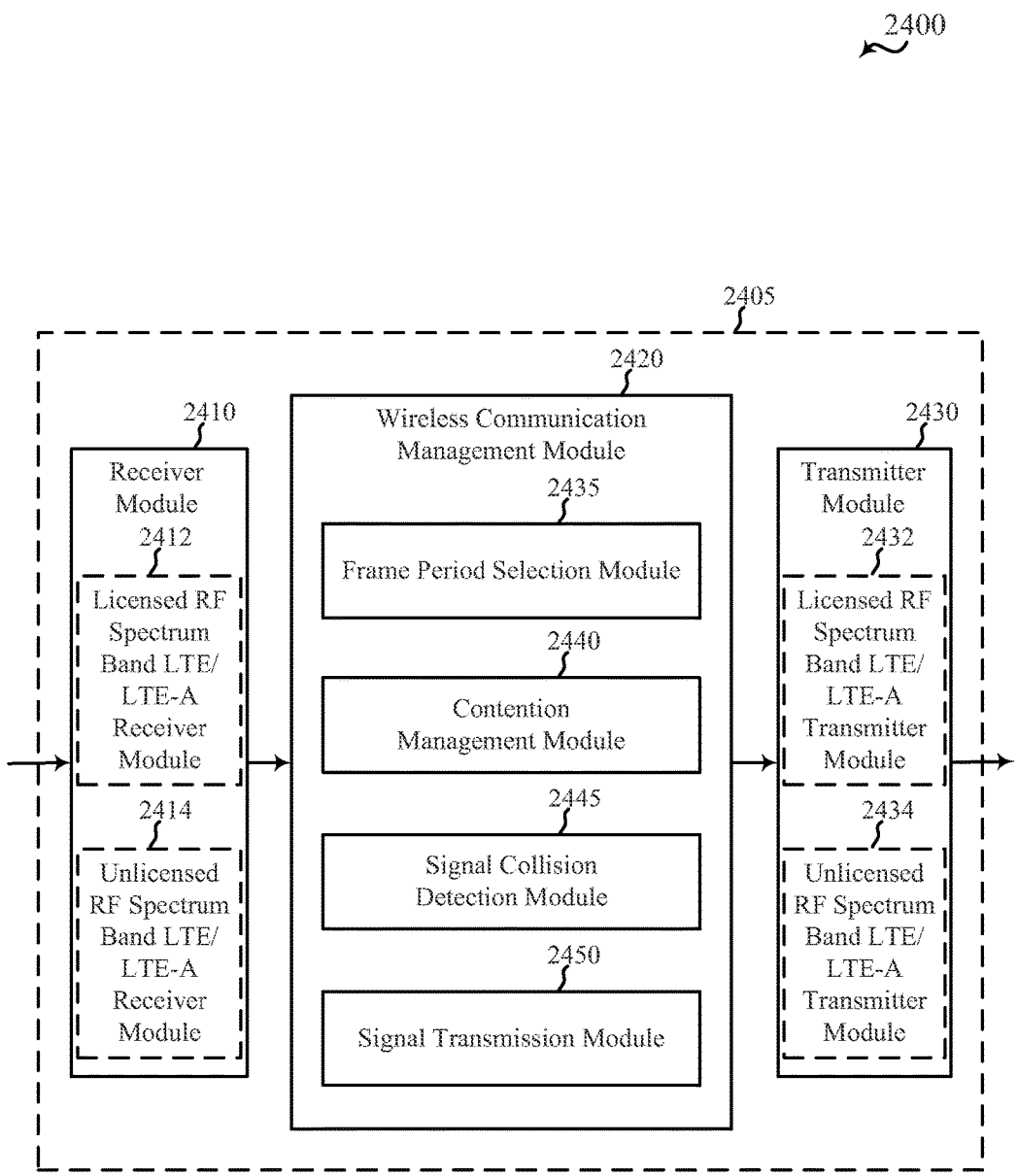
FIG. 24 shows a block diagram of an apparatus for use in wireless communication, in accordance with various aspects of the present disclosure.

FIG. 24 shows a block diagram 2400 of an apparatus 2405 for use in wireless communication, in accordance with various aspects of the present disclosure. In some examples, the apparatus 2405 may be an example of aspects of one or more of the base stations 105, 205, and/or 205-*a* described with reference to FIGS. 1 and/or 2, an example of aspects of one or more of the UEs 115, 215, 215-*a*, 215-*b*, and/or 215-*c* described with reference to FIGS. 1 and/or 2, and/or an example of aspects of the apparatus 1705 and/or 2305 described with reference to FIGS. 17 and/or 23. The apparatus 2405 may also be a processor. The apparatus 2405 may include a receiver module 2410, a wireless communication management module 2420, and/or a transmitter module 2430. Each of these components may be in communication with each other.

The components of the apparatus 2405 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2410 may be an example of one or more aspects of the receiver module 1710 and/or 2310 described with reference to FIGS. 17 and/or 23. In some examples, the receiver module 2410 may include at least one RF receiver, such as at least one RF receiver operable to receive transmissions over licensed radio frequency spectrum band (e.g., a radio frequency spectrum band for which apparatuses may contend for access because the radio frequency spectrum band is licensed to multiple users to share access to) and/or an unlicensed radio frequency spectrum band (e.g., a radio frequency spectrum band for which apparatuses may need to contend for access because the radio frequency spectrum band is available for unlicensed use, such as Wi-Fi use). In some examples, the licensed radio frequency spectrum band and/or the unlicensed radio frequency spectrum band may be used for LTE/LTE-A communications, as described, for example, with reference to FIGS. 1 and/or 2. The receiver module 2410 may in some cases include separate receivers for the licensed radio frequency spectrum band and the unlicensed radio frequency spectrum band. The separate receivers may, in some examples, take the form of a licensed RF spectrum band LTE/LTE-A receiver module 2412 for communicating over the licensed radio frequency spectrum band, and an unlicensed RF spectrum band LTE/LTE-A receiver module 2414 for communicating over the unlicensed radio frequency spectrum band. The receiver module 2410, including the licensed RF spectrum band LTE/LTE-A receiver module 2412 and/or the unlicensed RF spectrum band LTE/LTE-A receiver module 2414, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 2430 may be an example of one or more aspects of the transmitter module 1730 and/or 2330 described with reference to FIGS. 17 and/or 23. In some examples, the transmitter module 2430 may include at least one RF transmitter, such as at least one RF transmitter operable to transmit over the licensed radio frequency spectrum band and/or the unlicensed radio frequency spectrum band. The transmitter module 2430 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 2432 for communicating over the licensed radio frequency spectrum band, and an unlicensed RF spectrum band LTE/LTE-A transmitter module 2434 for communicating over the unlicensed radio frequency spectrum band. The transmitter module 2430, including the licensed RF spectrum band LTE/LTE-A transmitter module 2432 and/or the unlicensed RF spectrum band LTE/LTE-A transmitter module 2434, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 2420 may be an example of one or more aspects of the wireless communication management module 1720 and/or 2320 described with reference to FIGS. 17 and/or 23. The wireless communication management module 2420 may include a frame period selection module 2435, a contention management module 2440, a signal collision detection module 2445, and/or a signal transmission module 2450. Each of these components may be in communication with each other.

In some examples, the frame period selection module 2435 may be used to select a first frame period from a plurality of different frame periods (e.g., from a plurality of different frame periods having durations of two milliseconds, five milliseconds, and/or ten milliseconds). In some examples, the first frame period may be an LBT radio frame period. In some examples, each of the plurality of different frame periods may be an LBT radio frame period.

In some examples, the contention management module 2440 may be an example of one or more aspects of the contention management module 2335 described with reference to FIG. 23. In some examples, the contention management module 2440 may be used to perform a contention procedure to contend for access to one or more channels of the radio frequency spectrum band for a period of time (e.g., for the first frame period selected by the frame period selection module 2435).

In some examples, the signal collision detection module 2445 may be used to determine whether a signal to be transmitted at a periodicity during one or more subframes of the first frame period, and for each of the plurality of different frame periods, collides with a timing of a contention procedure performed by the contention management module 2440.

In some examples, the signal transmission module 2450 may be an example of one or more aspects of the signal transmission module 2340 described with reference to FIG. 23. In some examples, the signal transmission module 2450 may be used to transmit a signal at a periodicity, during one or more subframes of the first frame period, and for each of the plurality of different frame periods, when the signal collision detection module 2445 determines that the signal will not collide with a timing of a contention procedure performed by the contention management module 2440. In some examples, the periodicity at which the signal is transmitted may be a fixed periodicity and/or the signal may be transmitted at a fixed time and/or a fixed frequency location, as described, for example, with reference to FIG. 16. In some examples, the signal may be transmitted in an overhead channel, and the overhead channels may include a CRS, eCRS, CSI-RS, synchronization signal, and/or an SIB broadcast channel.

In some examples, the signal transmission module 2450 may be used to prevent transmission of a signal when the signal collision detection module 2445 determines that the signal collides with a timing of a contention procedure performed by the contention management module 2440, as described, for example, with reference to FIG. 16.

Figure 25:
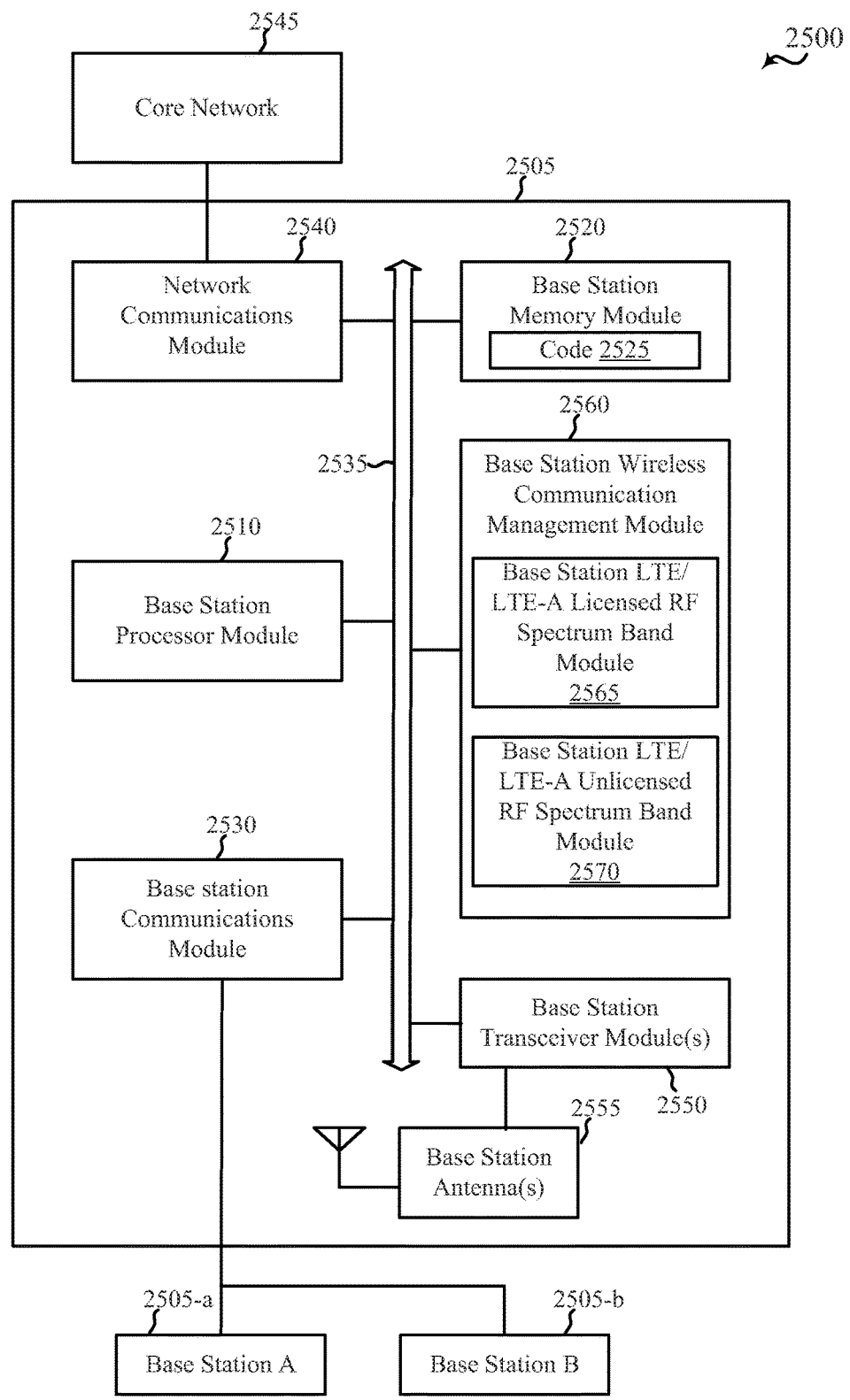
FIG. 25 shows a block diagram of a base station (e.g., a base station forming part or all of an eNB) for use in wireless communication, in accordance with various aspects of the present disclosure.

FIG. 25 shows a block diagram 2500 of a base station 2505 (e.g., a base station forming part or all of an eNB) for use in wireless communication, in accordance with various aspects of the present disclosure. In some examples, the base station 2505 may be an example of one or more aspects of the base station 105, 205, and/or 205-a described with reference to FIGS. 1 and/or 2, and/or one or more aspects of the apparatus 1705, 1805, 1905, 2005, 2105, 2205, 2305, and/or 2405 described with reference to FIGS. 17, 18, 19, 20, 21, 22, 23, and/or 24 (e.g., when the apparatus 1705, 1805, 1905, 2005, 2105, 2205, 2305, and/or 2405 is configured as a base station). The base station 2505 may be configured to implement or facilitate at least some of the base station and/or apparatus features and functions described with reference to FIGS. 1, 2, 3, 4, 5, 6, 7, 8A, 8B, 9, 10, 11A, 11B, 11C, 12, 13, 14, 15, and/or 16.

The base station 2505 may include a base station processor module 2510, a base station memory module 2520, at least one base station transceiver module (represented by base station transceiver module(s) 2550), at least one base station antenna (represented by base station antenna(s) 2555), and/or a base station wireless communication management module 2560. The base station 2505 may also include one or more of a base station communications module 2530 and/or a network communications module 2540. Each of these components may be in communication with each other, directly or indirectly, over one or more buses 2535.

The base station memory module 2520 may include random access memory (RAM) and/or read-only memory (ROM). The base station memory module 2520 may store computer-readable, computer-executable code 2525 containing instructions that are configured to, when executed, cause the base station processor module 2510 to perform various functions described herein related to wireless communication. Alternatively, the code 2525 may not be directly executable by the base station processor module 2510 but be configured to cause the base station 2505 (e.g., when compiled and executed) to perform various of the functions described herein.

The base station processor module 2510 may include an intelligent hardware device, e.g., a central processing unit (CPU), a microcontroller, an ASIC, etc. The base station processor module 2510 may process information received through the base station transceiver module(s) 2550, the base station communications module 2530, and/or the network communications module 2540. The base station processor module 2510 may also process information to be sent to the transceiver module(s) 2550 for transmission through the antenna(s) 2555, to the base station communications module 2530, for transmission to one or more other base stations 2505-a and 2505-b, and/or to the network communications module 2540 for transmission to a core network 2545, which may be an example of one or more aspects of the core network 130 described with reference to FIG. 1. The base station processor module 2510 may handle, alone or in connection with the base station wireless communication management module 2560, various aspects of communicating over (or managing communications over) a first radio frequency spectrum band (e.g., a radio frequency spectrum band for which apparatuses may contend for access because the radio frequency spectrum band is licensed to multiple users to share access to, such as a licensed radio frequency spectrum band usable for LTE/LTE-A communications) and/or a second radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications).

The base station transceiver module(s) 2550 may include a modem configured to modulate packets and provide the modulated packets to the base station antenna(s) 2555 for transmission, and to demodulate packets received from the base station antenna(s) 2555. The base station transceiver module(s) 2550 may, in some examples, be implemented as one or more base station transmitter modules and one or more separate base station receiver modules. The base station transceiver module(s) 2550 may support communications in the first radio frequency spectrum band and/or the second radio frequency spectrum band. The base station transceiver module(s) 2550 may be configured to communicate bi-directionally, via the antenna(s) 2555, with one or more mobile stations or apparatuses, such as one or more of the UEs 115, 215, 215-a, 215-b, and/or 215-c described with reference to FIGS. 1 and/or 2. The base station 2505 may, for example, include multiple base station antennas 2555 (e.g., an antenna array). The base station 2505 may communicate with the core network 2545 through the network communications module 2540. The base station 2505 may also communicate with other base stations, such as the base stations 2505-a and 2505-b, using the base station communications module 2530.

The base station wireless communication management module 2560 may be configured to perform and/or control some or all of the features and/or functions described with reference to FIGS. 1, 2, 3, 4, 5, 6, 7, 8A, 8B, 9, 10, 11A, 11B, 11C, 12, 13, 14, 15, and/or 16 related to wireless communication over the first radio frequency spectrum band and/or the second radio frequency spectrum band. For example, the base station wireless communication management module 2560 may be configured to support a supplemental downlink mode, carrier aggregation mode, and/or standalone mode using the first radio frequency spectrum band and/or the second radio frequency spectrum band. The base station wireless communication management module 2560 may include a base station LTE/LTE-A licensed RF spectrum band module 2565 configured to handle LTE/LTE-A communications in the first radio frequency spectrum band, and a base station LTE/LTE-A unlicensed RF spectrum band module 2570 configured to handle LTE/LTE-A communications in the second radio frequency spectrum band. The base station wireless communication management module 2560, or portions of it, may include a processor, and/or some or all of the functions of the base station wireless communication management module 2560 may be performed by the base station processor module 2510 and/or in connection with the base station processor module 2510. In some examples, the base station wireless communication management module 2560 may be an example of the wireless communication management module 1720, 1820, 1920, 2020, 2120, 2220, 2320, and/or 2420 described with reference to FIGS. 17, 18, 19, 20, 21, 22, 23, and/or 24.

Figure 26:
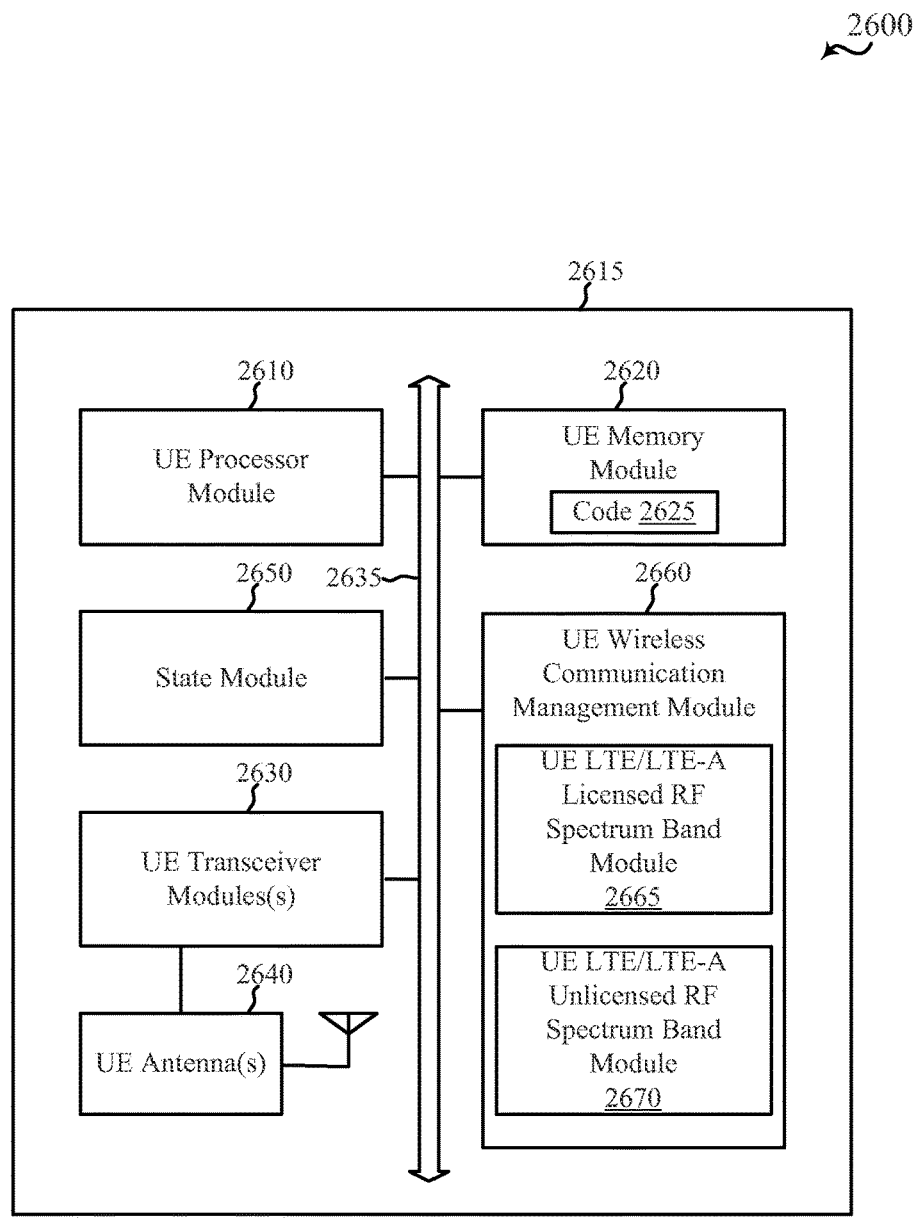
FIG. 26 shows a block diagram of a UE for use in wireless communication, in accordance with various aspects of the present disclosure.

FIG. 26 shows a block diagram 2600 of a UE 2615 for use in wireless communication, in accordance with various aspects of the present disclosure. The UE 2615 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 2615 may, in some examples, have an internal power supply (not shown), such as a small battery, to facilitate mobile operation. In some examples, the UE 2615 may be an example of one or more aspects of the UE 115, 215, 215-a, 215-b, and/or 215-c described with reference to FIGS. 1 and/or 2, and/or one or more aspects of the apparatus 1705, 1805, 1905, 2005, 2105, 2205, 2305, and/or 2405 described with reference to FIGS. 17, 18, 19, 20, 21, 22, 23, 24, and/or 25 (e.g., when the apparatus 1705, 1805, 1905, 2005, 2105, 2205, 2305, and/or 2405 is configured as a UE). The UE 2615 may be configured to implement at least some of the UE and/or apparatus features and functions described with reference to FIGS. 1, 2, 3, 4, 5, 6, 7, 8A, 8B, 9, 10, 11A, 11B, 11C, 12, 13, 14, 15, and/or 16.

The UE 2615 may include a UE processor module 2610, a UE memory module 2620, at least one UE transceiver module (represented by UE transceiver module(s) 2630), at least one UE antenna (represented by UE antenna(s) 2640), and/or a UE wireless communication management module 2660. Each of these components may be in communication with each other, directly or indirectly, over one or more buses 2635.

The UE memory module 2620 may include RAM and/or ROM. The UE memory module 2620 may store computer-readable, computer-executable code 2625 containing instructions that are configured to, when executed, cause the UE processor module 2610 to perform various functions described herein related to wireless communication. Alternatively, the code 2625 may not be directly executable by the UE processor module 2610 but be configured to cause the UE 2615 (e.g., when compiled and executed) to perform various of the functions described herein.

The UE processor module 2610 may include an intelligent hardware device, e.g., a CPU, a microcontroller, an ASIC, etc. The UE processor module 2610 may process information received through the UE transceiver module(s) 2630 and/or information to be sent to the UE transceiver module(s) 2630 for transmission through the UE antenna(s) 2640. The UE processor module 2610 may handle, alone or in connection with the UE wireless communication management module 2660, various aspects of communicating over (or managing communications over) a first radio frequency spectrum band (e.g., a radio frequency spectrum band for which apparatuses may contend for access because the radio frequency spectrum band is licensed to multiple users to share access to, such as a licensed radio frequency spectrum band usable for LTE/LTE-A communications) and/or a second radio frequency spectrum band (e.g., a radio frequency spectrum band, such as Wi-Fi radio frequency spectrum band, for which apparatuses may need to contend for access because the radio frequency spectrum band is available for unlicensed use, such as an unlicensed radio frequency spectrum band usable for LTE/LTE-A communications).

The UE transceiver module(s) 2630 may include a modem configured to modulate packets and provide the modulated packets to the UE antenna(s) 2640 for transmission, and to demodulate packets received from the UE antenna(s) 2640. The UE transceiver module(s) 2630 may, in some examples, be implemented as one or more UE transmitter modules and one or more separate UE receiver modules. The UE transceiver module(s) 2630 may support communications in the first radio frequency spectrum band and/or the second radio frequency spectrum band. The UE transceiver module(s) 2630 may be configured to communicate bi-directionally, via the UE antenna(s) 2640, with one or more of the base stations 105, 205, 205-*a*, and/or 2505 described with reference to FIGS. 1, 2, and/or 25, and/or the apparatus 1705, 1805, 1905, 2005, 2105, 2205, 2305, and/or 2405 described with reference to FIGS. 17, 18, 19, 20, 21, 22, 23, and/or 24. While the UE 2615 may include a single UE antenna, there may be examples in which the UE 2615 may include multiple UE antennas 2640.

The UE state module 2650 may be used, for example, to manage transitions of the UE 2615 between an RRC idle state and an RRC connected state, and may be in communication with other components of the UE 2615, directly or indirectly, over the one or more buses 2635. The UE state module 2650, or portions of it, may include a processor, and/or some or all of the functions of the UE state module 2650 may be performed by the UE processor module 2610 and/or in connection with the UE processor module 2610.

The UE wireless communication management module 2660 may be configured to perform and/or control some or all of the features and/or functions described with reference to FIGS. 1, 2, 3, 4, 5, 6, 7, 8A, 8B, 9, 10, 11A, 11B, 11C, 12, 13, 14, 15, and/or 16 related to wireless communication over the first radio frequency spectrum band and/or the second radio frequency spectrum band. For example, the UE wireless communication management module 2660 may be configured to support a supplemental downlink mode, carrier aggregation mode, and/or standalone mode using the first radio frequency spectrum band and/or the second radio frequency spectrum band. The UE wireless communication management module 2660 may include a UE LTE/LTE-A licensed RF spectrum band module 2665 configured to handle LTE/LTE-A communications in the first radio frequency spectrum band, and a UE LTE/LTE-A unlicensed RF spectrum band module 2670 configured to handle LTE/LTE-A communications in the second radio frequency spectrum. The UE wireless communication management module 2660, or portions of it, may include a processor, and/or some or all of the functions of the UE wireless communication management module 2660 may be performed by the UE processor module 2610 and/or in connection with the UE processor module 2610. In some examples, the UE wireless communication management module 2660 may be an example of the wireless communication management module 1720, 1820, 1920, 2020, 2120, 2220, 2320, and/or 2420 described with reference to FIGS. 17, 18, 19, 20, 21, 22, 23, and/or 24.

Figure 27:
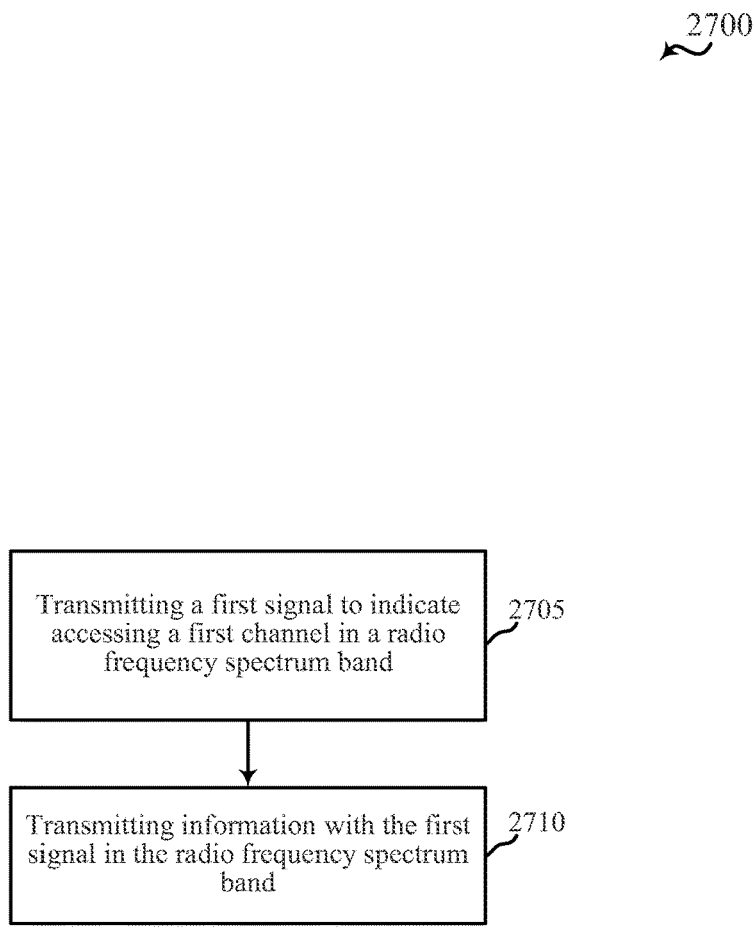
FIG. 27 is a flow chart illustrating an example of a method for wireless communication, in accordance with various aspects of the present disclosure.

FIG. 27 is a flow chart illustrating an example of a method 2700 for wireless communication, in accordance with various aspects of the present disclosure. For clarity, the method 2700 is described below with reference to aspects of one or more of the base stations 105, 205, 205-*a*, and/or 2505 described with reference to FIGS. 1, 2, and/or 25, aspects of one or more of the UEs 115, 215, 215-*a*, 215-*b*, 215-*c*, and/or 2615 described with reference to FIGS. 1, 2, and/or 26, and/or aspects of one or more of the apparatuses 1705, 1805, and/or 1905 described with reference to FIGS. 17, 18, and/or 19. In some examples, a base station, UE, and/or apparatus may execute one or more sets of codes to control the functional elements of the base station, UE, and/or apparatus to perform the functions described below.

At block 2705, the method 2700 may include transmitting a first signal to indicate accessing (e.g., a reserving of) a first channel in a radio frequency spectrum band. The radio frequency spectrum band may be a radio frequency spectrum band for which apparatuses may need to contend for access because the radio frequency spectrum band is available for unlicensed use, such as Wi-Fi use. The radio frequency spectrum band may also be a shared licensed radio frequency spectrum band which a plurality of mobile network operators are authorized to access. The operation(s) at block 2705 may be performed using the wireless communication management module 1720, 1820, 1920, 2560, and/or 2660 described with reference to FIGS. 17, 18, 19, 25, and/or 26, and/or the channel access indication module 1835 and/or 1940 described with reference to FIGS. 18 and/or 19.

In some examples, the first signal may be transmitted using a plurality of interleaved resource blocks. Transmitting the first signal in this manner may enable the first signal to occupy at least a certain percentage of the available frequency bandwidth in the radio frequency spectrum band and/or satisfy one or more regulatory requirements (e.g., a requirement that the first signal occupy at least 80% of the available frequency bandwidth).

At block 2710, the method 2700 may include transmitting information with the first signal in the radio frequency spectrum band. The operation(s) at block 2710 may be performed using the wireless communication management module 1720, 1820, 1920, 2560, and/or 2660 described with reference to FIGS. 17, 18, 19, 25, and/or 26, and/or the information transmission module 1840 and/or 1945 described with reference to FIGS. 18 and/or 19.

The transmitted information may include various types of information. In some examples, the information may include a cell ID, a PLMN ID, or a combination thereof. In some examples, the information may indicate a frame structure for transmission in the radio frequency spectrum band (e.g., the LBT radio frame duration). In some examples, the information may indicate a number of subframes and/or symbols that will be used for transmission in a frame structure in the radio frequency spectrum band (e.g., five subframes are used for transmission in a ten millisecond frame duration that includes ten subframes). An indication of a number of subframes and/or symbols that will be used for transmission in a frame structure in the radio frequency spectrum band may enable a receiving apparatus, such as a UE, to enter a low power state at an earlier time (e.g., immediately after receiving the transmitted subframes), thereby conserving power. In some examples, the information may indicate an uplink configuration and/or a downlink configuration for transmission in the radio frequency spectrum band (e.g., an uplink configuration and/or a downlink configuration of a frame structure in the radio frequency spectrum band). An indication of an uplink configuration and/or a downlink configuration for transmission in the radio frequency spectrum band may improve the performance of eIMTA functionality. In some examples, the information may indicate whether a maximum number of subframes, of a frame, are used for transmission in the radio frequency spectrum band (e.g., a single bit may be used to indicate whether a maximum number of subframes are used for transmission in a frame structure of the radio frequency spectrum band, or whether fewer than the maximum number of subframes are used for transmission in the frame structure of the radio frequency spectrum band). In some examples, the information may indicate a number of antennas to use for receiving a transmission carried on a component carrier in the radio frequency spectrum band (e.g., a number of antennas to receive transmission of the component carrier during a frame structure of the radio frequency spectrum band, as described, for example, with reference to FIGS. 9 and/or 10). The information may also or alternatively include any combination of the above types of information and/or other types of information, including other types of system information.

In some examples of the method 2700, the transmitting information with the first signal may include transmitting information as part of the first signal. In these examples, the first signal may be generated based at least in part on a sequence. The sequence may be a function of the information. For example, the sequence may be a function of a cell ID, a PLMN ID, or a combination thereof. The sequence may also or alternatively be a function of any one or combination of the types of information referenced herein.

In other examples in which the transmitting information with the first signal may include transmitting information as part of the first signal, the method 2700 may include selecting a first phase from among a plurality of phases for transmission of the first signal. Different phases of the plurality of phases may correspond to different information. In these examples, the transmitting information with the first signal may include transmitting the first signal at the first phase.

In some examples of the method 2700, the transmitting information with the first signal may include transmitting information in a second signal along with the first signal. The second signal may be separate from the first signal.

In some examples of the method 2700, the first signal and the information may be transmitted during a single OFDM symbol period of the radio frequency spectrum band. In some examples of the method 2700, the first signal may be transmitted during a first OFDM symbol period of the radio frequency spectrum band and a second OFDM symbol period of the radio frequency spectrum band, and the information may be transmitted during the second OFDM symbol period of the radio frequency spectrum band. In some examples, the first OFDM symbol period of the radio frequency spectrum band and the second OFDM symbol period of the radio frequency spectrum band may be adjacent OFDM symbol periods.

Thus, the method 2700 may provide for wireless communication. It should be noted that the method 2700 is just one implementation and that the operations of the method 2700 may be rearranged or otherwise modified such that other implementations are possible.

Figure 28:
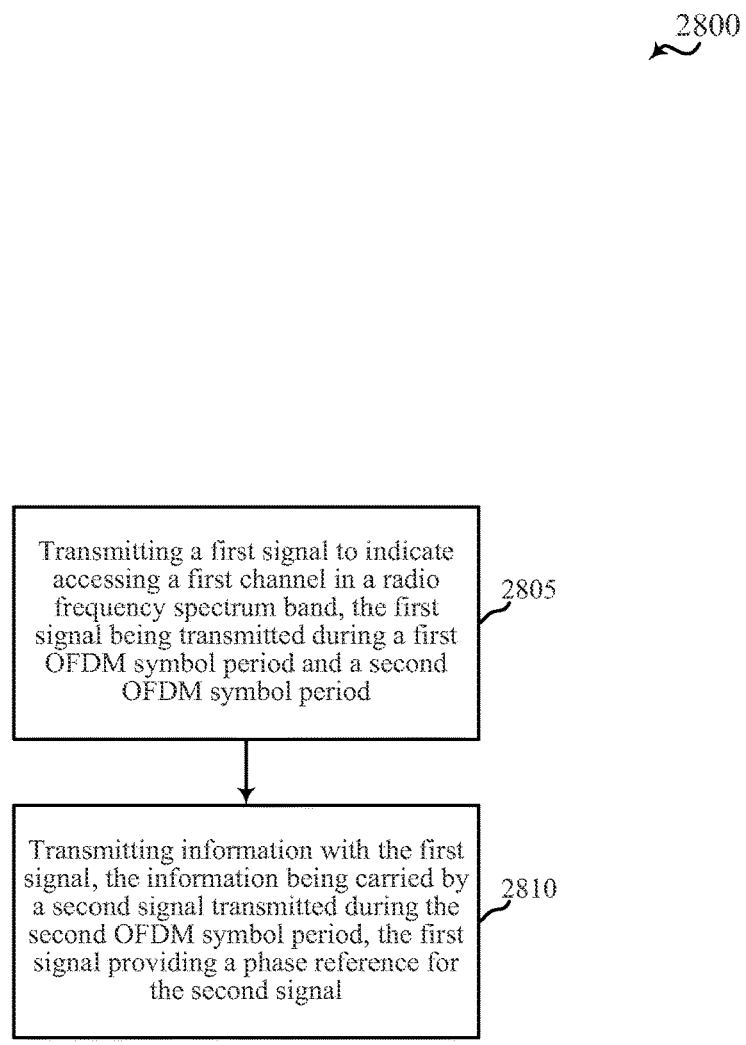
FIG. 28 is a flow chart illustrating an example of a method for wireless communication, in accordance with various aspects of the present disclosure.

FIG. 28 is a flow chart illustrating an example of a method 2800 for wireless communication, in accordance with various aspects of the present disclosure. For clarity, the method 2800 is described below with reference to aspects of one or more of the base stations 105, 205, 205-*a*, and/or 2505 described with reference to FIGS. 1, 2, and/or 25, aspects of one or more of the UEs 115, 215, 215-*a*, 215-*b*, 215-*c*, and/or 2615 described with reference to FIGS. 1, 2, and/or 26, and/or aspects of one or more of the apparatuses 1705, 1805, and/or 1905 described with reference to FIGS. 17, 18, and/or 19. In some examples, a base station, UE, and/or apparatus may execute one or more sets of codes to control the functional elements of the base station, UE, and/or apparatus to perform the functions described below.

At block 2805, the method 2800 may include transmitting a first signal to indicate accessing (e.g., a reserving of) a first channel in a radio frequency spectrum band. The first signal may be transmitted during a first OFDM symbol period of the radio frequency spectrum band and a second OFDM symbol period of the radio frequency spectrum band. In some examples, the first OFDM symbol period of the radio frequency spectrum band and the second OFDM symbol period of the radio frequency spectrum band may be adjacent OFDM symbol periods. The radio frequency spectrum band may be a radio frequency spectrum band for which apparatuses may need to contend for access because the radio frequency spectrum band is available for unlicensed use, such as Wi-Fi use. The radio frequency spectrum band may also be a shared licensed radio frequency spectrum band which a plurality of mobile network operators are authorized to access. The operation(s) at block 2805 may be performed using the wireless communication management module 1720, 1820, 1920, 2560, and/or 2660 described with reference to FIGS. 17, 18, 19, 25, and/or 26, and/or the channel access indication module 1835 and/or 1940 described with reference to FIGS. 18 and/or 19.

At block 2810, the method 2800 may include transmitting information with the first signal in the radio frequency spectrum band. The transmitting information with the first signal may include transmitting a second signal carrying the information. The second signal may be transmitted during the second OFDM symbol period of the radio frequency spectrum band. The first signal may provide AGC information and/or a phase reference for the second signal. The operation(s) at block 2810 may be performed using the wireless communication management module 1720, 1820, 1920, 2560, and/or 2660 described with reference to FIGS. 17, 18, 19, 25, and/or 26, and/or the information transmission module 1840 and/or 1945 described with reference to FIGS. 18 and/or 19.

The transmitted information may include various types of information. In some examples, the information may include a cell ID, a PLMN ID, or a combination thereof. In some examples, the information may indicate a frame structure for transmission in the radio frequency spectrum band (e.g., the LBT radio frame duration). In some examples, the information may indicate a number of subframes and/or symbols that will be used for transmission in a frame structure in the radio frequency spectrum band (e.g., five subframes are used for transmission in a ten millisecond frame duration that includes ten subframes). An indication of a number of subframes and/or symbols that will be used for transmission in a frame structure in the radio frequency spectrum band may enable a receiving apparatus, such as a UE, to enter a low power state at an earlier time (e.g., immediately after receiving the transmitted subframes), thereby conserving power. In some examples, the information may indicate an uplink configuration and/or a downlink configuration for transmission in the radio frequency spectrum band (e.g., an uplink configuration and/or a downlink configuration of a frame structure in the radio frequency spectrum band). An indication of an uplink configuration and/or a downlink configuration for transmission in the radio frequency spectrum band may improve the performance of eIMTA functionality. In some examples, the information may indicate whether a maximum number of subframes, of a frame, are used for transmission in the radio frequency spectrum band (e.g., a single bit may be used to indicate whether a maximum number of subframes are used for transmission in a frame structure of the radio frequency spectrum band, or whether fewer than the maximum number of subframes are used for transmission in the frame structure of the radio frequency spectrum band). In some examples, the information may indicate a number of antennas to use for receiving a transmission carried on a component carrier in the radio frequency spectrum band (e.g., a number of antennas to receive transmission of the component carrier during a frame structure of the radio frequency spectrum band, as described, for example, with reference to FIGS. 9 and/or 10). The information may also or alternatively include any combination of the above types of information and/or other types of information, including other types of system information.

In some examples of the method 2800, the first signal may be transmitted using a first plurality of interleaved resource blocks and/or the second signal may be transmitted using a second plurality of interleaved resource blocks. Transmitting the first signal and/or the second signal in this manner may enable the first signal and/or the second signal to occupy at least a certain percentage of the available frequency bandwidth in the radio frequency spectrum band and satisfy one or more regulatory requirements (e.g., a requirement that the first signal occupy at least 80% of the available frequency bandwidth).

Thus, the method 2800 may provide for wireless communication. It should be noted that the method 2800 is just one implementation and that the operations of the method 2800 may be rearranged or otherwise modified such that other implementations are possible.

Figure 29:
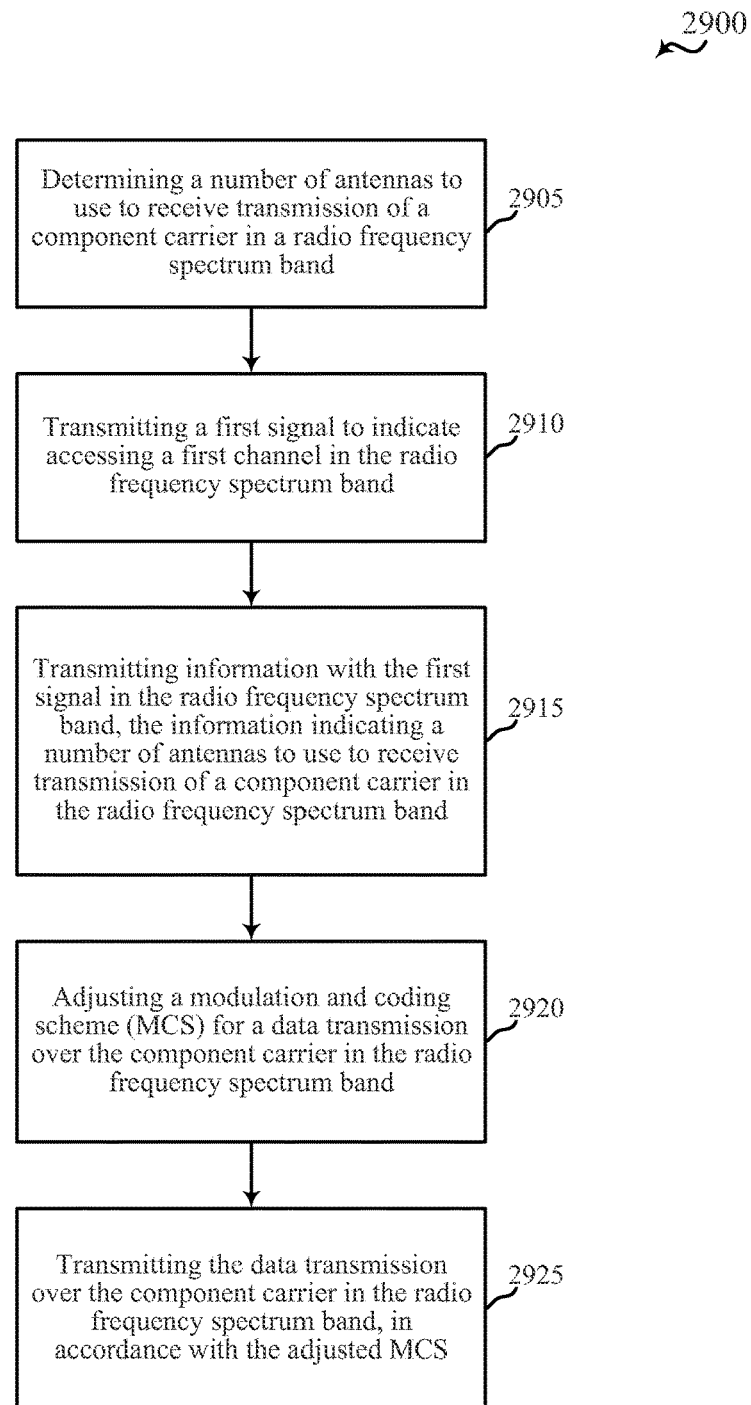
FIG. 29 is a flow chart illustrating an example of a method for wireless communication, in accordance with various aspects of the present disclosure.

FIG. 29 is a flow chart illustrating an example of a method 2900 for wireless communication, in accordance with various aspects of the present disclosure. For clarity, the method 2900 is described below with reference to aspects of one or more of the base stations 105, 205, 205-*a*, and/or 2505 described with reference to FIGS. 1, 2, and/or 25, aspects of one or more of the UEs 115, 215, 215-*a*, 215-*b*, 215-*c*, and/or 2615 described with reference to FIGS. 1, 2, and/or 26, and/or aspects of one or more of the apparatuses 1705, 1805, and/or 1905 described with reference to FIGS. 17, 18, and/or 19. In some examples, a base station, UE, and/or apparatus may execute one or more sets of codes to control the functional elements of the base station, UE, and/or apparatus to perform the functions described below.

At block 2905, the method 2900 may include determining a number of antennas to use for receiving a transmission carried on a component carrier in a radio frequency spectrum band. The radio frequency spectrum band may be a radio frequency spectrum band for which apparatuses may need to contend for access because the radio frequency spectrum band is available for unlicensed use, such as Wi-Fi use. The radio frequency spectrum band may also be a licensed radio frequency spectrum band which a plurality of mobile network operators are authorized to access. The operation(s) at block 2905 may be performed using the wireless communication management module 1720, 1820, 1920, 2560, and/or 2660 described with reference to FIGS. 17, 18, 19, 25, and/or 26, and/or the antenna selection module 1960 described with reference to FIG. 19.

In some examples of the method 2900, the determining the number of antennas to use for receiving a transmission carried on the component carrier in the radio frequency spectrum band may include determining the number of antennas to use based at least in part on an uplink configuration or a downlink configuration associated with the component carrier (e.g., an uplink configuration or a downlink configuration associated with a frame and/or a subframe of the component carrier). In the same or other examples of the method 2900, the determining the number of antennas to use for receiving a transmission carried on the component carrier in the radio frequency spectrum band may include determining the number of antennas to use based at least in part on a contention procedure associated with each of a plurality of component carriers used to serve a UE (e.g., based at least in part on a success or failure of the contention procedure performed for each of the plurality of component carriers).

In some examples of the method 2900, the number of antennas to use for receiving a transmission carried on the component carrier in the radio frequency spectrum band may be selected for each subframe of a frame of the component carrier. In some examples of the method 2900, the number of antennas to use for receiving a transmission carried on the component carrier in the radio frequency spectrum band may be selected for each frame of the component carrier.

At block 2910, the method 2900 may include transmitting a first signal to indicate accessing (e.g., a reserving of) a first channel in the radio frequency spectrum band. The operation(s) at block 2910 may be performed using the wireless communication management module 1720, 1820, 1920, 2560, and/or 2660 described with reference to FIGS. 17, 18, 19, 25, and/or 26, and/or the channel access indication module 1835 and/or 1940 described with reference to FIGS. 18 and/or 19.

At block 2915, the method 2900 may include transmitting information with the first signal in the radio frequency spectrum band. The information may indicate a number of antennas to use for receiving a transmission carried on a component carrier in the radio frequency spectrum band (e.g., a number of antennas to receive transmission of the component carrier during a frame structure of the radio frequency spectrum band, as described, for example, with reference to FIGS. 9 and/or 10). The operation(s) at block 2915 may be performed using the wireless communication management module 1720, 1820, 1920, 2560, and/or 2660 described with reference to FIGS. 17, 18, 19, 25, and/or 26, and/or the information transmission module 1840 and/or 1945 described with reference to FIGS. 18 and/or 19.

In some examples of the method 2900, the transmitted information may also include various other types of information. In some examples, the information may include a cell ID, a PLMN ID, or a combination thereof. In some examples, the information may indicate a frame structure for transmission in the radio frequency spectrum band (e.g., the LBT radio frame duration). In some examples, the information may indicate a number of subframes and/or symbols that will be used for transmission in a frame structure in the radio frequency spectrum band (e.g., five subframes are used for transmission in a ten millisecond frame duration that includes ten subframes). An indication of a number of subframes and/or symbols that will be used for transmission in a frame structure in the radio frequency spectrum band may enable a receiving apparatus, such as a UE, to enter a low power state at an earlier time (e.g., immediately after receiving the transmitted subframes), thereby conserving power. In some examples, the information may indicate an uplink configuration and/or a downlink configuration for transmission in the radio frequency spectrum band (e.g., an uplink configuration and/or a downlink configuration of a frame structure in the radio frequency spectrum band). An indication of an uplink configuration and/or a downlink configuration for transmission in an unlicensed radio frequency spectrum band may improve the performance of eIMTA functionality. In some examples, the information may indicate whether a maximum number of subframes, of a frame, are used for transmission in the radio frequency spectrum band (e.g., a single bit may be used to indicate whether a maximum number of subframes are used for transmission in a frame structure of the radio frequency spectrum band, or whether fewer than the maximum number of subframes are used for transmission in the frame structure of the radio frequency spectrum band). The information may also or alternatively include any combination of the above types of information and/or other types of information, including other types of system information.

In some examples of the method 2900, the transmitting information with the first signal may include transmitting information as part of the first signal. In these examples, the first signal may be generated based at least in part on a sequence. The sequence may be a function of the information. For example, the sequence may be a function of a cell ID, a PLMN ID, or a combination thereof. The sequence may also or alternatively be a function of any one or combination of the types of information referenced herein.

In some examples of the method 2900, the transmitting information with the first signal may include transmitting information in a second signal along with the first signal. The second signal may be separate from the first signal.

In some examples, the method 2900 may include selecting a first phase from among a plurality of phases for transmission of the first signal. Different phases of the plurality of phases may correspond to different information. In these examples, the transmitting information with the first signal may include transmitting the first signal at the first phase.

In some examples of the method 2900, the first signal and the information may be transmitted during a single OFDM symbol period. In some examples of the method 2900, the first signal may be transmitted during a first OFDM symbol period and a second OFDM symbol period, and the information may be transmitted during the second OFDM symbol period. In some examples, the first OFDM symbol period and the second OFDM symbol period may be adjacent OFDM symbol periods.

In some examples of the method 2900, the first signal may be transmitted using a plurality of interleaved resource blocks. Transmitting the first signal in this manner may enable the first signal to occupy at least a certain percentage of the available frequency bandwidth in the radio frequency spectrum band and/or satisfy one or more regulatory requirements (e.g., a requirement that the first signal occupy at least 80% of the available frequency bandwidth).

At block 2920, the method 2900 may include adjusting a precoding matrix, rank, and/or MCS for a data transmission over the component carrier in the radio frequency spectrum band. The precoding matrix, rank, and/or MCS may be adjusted based at least in part on the number of antennas to use to receive the component carrier in the radio frequency spectrum band, as determined at block 2905. The operation(s) at block 2920 may be performed using the wireless communication management module 1720, 1820, 1920, 2560, and/or 2660 described with reference to FIGS. 17, 18, 19, 25, and/or 26, and/or the MCS adjustment module 1965 described with reference to FIG. 19.

At block 2925, the method 2900 may include transmitting the data transmission over the component carrier in the radio frequency spectrum band, in accordance with the adjusted precoding matrix, rank, and/or MCS. The operation(s) at block 2925 may be performed using the wireless communication management module 1720, 1820, 1920, 2560, and/or 2660 described with reference to FIGS. 17, 18, 19, 25, and/or 26, and/or the data transmission module 1970 described with reference to FIG. 19.

Thus, the method 2900 may provide for wireless communication. It should be noted that the method 2900 is just one implementation and that the operations of the method 2900 may be rearranged or otherwise modified such that other implementations are possible.

Figure 30:
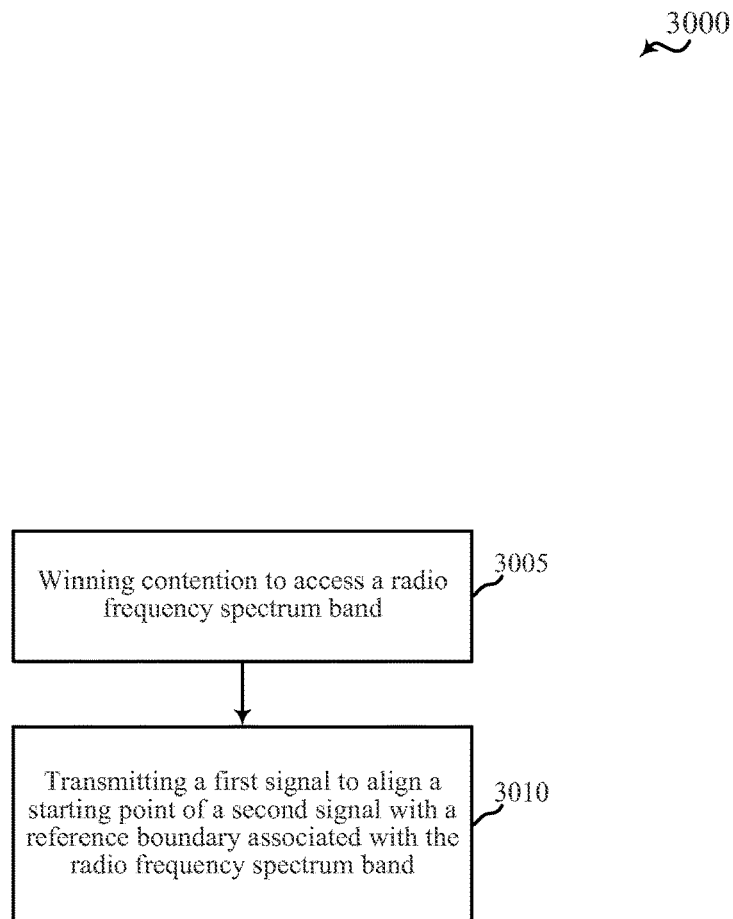
FIG. 30 is a flow chart illustrating an example of a method for wireless communication, in accordance with various aspects of the present disclosure.

FIG. 30 is a flow chart illustrating an example of a method 3000 for wireless communication, in accordance with various aspects of the present disclosure. For clarity, the method 3000 is described below with reference to aspects of one or more of the base stations 105, 205, 205-*a*, and/or 2505 described with reference to FIGS. 1, 2, and/or 25, aspects of one or more of the UEs 115, 215, 215-*a*, 215-*b*, 215-*c*, and/or 2615 described with reference to FIGS. 1, 2, and/or 26, and/or aspects of one or more of the apparatuses 1705, 2005, 2105, and/or 2205 described with reference to FIGS. 17, 20, 21, and/or 22. In some examples, a base station, UE, and/or apparatus may execute one or more sets of codes to control the functional elements of the base station, UE, and/or apparatus to perform the functions described below.

At block 3005, the method 3000 may include winning contention to access a radio frequency spectrum band. The radio frequency spectrum band may be a radio frequency spectrum band for which apparatuses may need to contend for access because the radio frequency spectrum band is available for unlicensed use, such as Wi-Fi use. The radio frequency spectrum band may also be a licensed radio frequency spectrum band which a plurality of mobile network operators are authorized to access. The operation(s) at block 3005 may be performed using the wireless communication management module 1720, 2020, 2120, 2220, 2560, and/or 2660 described with reference to FIGS. 17, 20, 21, 22, 25, and/or 26, and/or the contention management module 2035, 2140, and/or 2235 described with reference to FIGS. 20, 21, and/or 22.

After the winning contention to access the radio frequency spectrum band, and at block 3010, the method 3000 may include transmitting a first signal to align a starting point of a second signal with a reference boundary associated with the radio frequency spectrum band. In some examples, the first signal may be transmitted before the second signal. The operation(s) at block 3010 may be performed using the wireless communication management module 1720, 2020, 2120, 2220, 2560, and/or 2660 described with reference to FIGS. 17, 20, 21, 22, 25, and/or 26, and/or the alignment signal transmission module 2040, 2150, and/or 2255 described with reference to FIGS. 20, 21, and/or 22.

In some examples of the method 3000, the first signal may include a variable length training sequence. The variable length training sequence may, in some examples, include one or more transmission units of fixed duration. In other examples of the method 3000, the first signal may include a variable length training sequence and at least one fixed length training sequence.

In some examples of the method 3000, the second signal may include a signal indicating the winning contention to access the radio frequency spectrum band (e.g., a CUBS). In other examples of the method 3000 (e.g., examples in which a transmitting apparatus is operating in an LBT-LBE mode of operation in the radio frequency spectrum band), the second signal may include a data transmission.

In examples of the method 3000, the reference boundary may include a boundary of an OFDM symbol period. In these examples, a contention procedure may be performed in accordance with a contention priority during the OFDM symbol period. The contention priority may determine when an apparatus (e.g., a base station or UE performing the method 3000) performs a contention procedure within the OFDM symbol period associated with the radio frequency spectrum band. Thus, the contention priority may provide, to an apparatus that performs a contention procedure earlier in time, a preference for winning the contention procedure over an apparatus that performs a contention procedure later in time. In some examples of the method 3000, the first signal may be associated with the contention priority of its transmitting apparatus (e.g., a base station or UE performing the method 3000), such that the first signal is transmitted during a portion of the OFDM symbol period based at least in part on the contention priority. Thus, for example, the first signal may be transmitted over a greater portion of the OFDM symbol period when the first signal is associated with a contention priority that allows an apparatus to perform a contention procedure earlier within the OFDM symbol period. Similarly, and by way of further example, the first signal may be transmitted over a smaller portion of the OFDM symbol period when the first signal is associated with a contention priority that allows an apparatus to perform a contention procedure later within the OFDM symbol period.

In some examples, the reference boundary may include a boundary of a slot of a frame associated with the radio frequency spectrum band and/or a boundary of a subframe of a frame associated with the radio frequency spectrum band.

In some examples, the method 3000 may include transmitting information as part of the first signal. The information may include, for example, AGC information and/or a phase reference for the second signal.

In some examples of the method 3000, the first signal and/or the second signal may be transmitted using a plurality of interleaved resource blocks. Transmitting the first signal and/or the second signal in this manner may enable the first signal and/or the second signal to occupy at least a certain percentage of the available frequency bandwidth in the radio frequency spectrum band and/or satisfy one or more regulatory requirements (e.g., a requirement that the first signal and/or second signal occupy at least 80% of the available frequency bandwidth).

Thus, the method 3000 may provide for wireless communication. It should be noted that the method 3000 is just one implementation and that the operations of the method 3000 may be rearranged or otherwise modified such that other implementations are possible.

Figure 31:
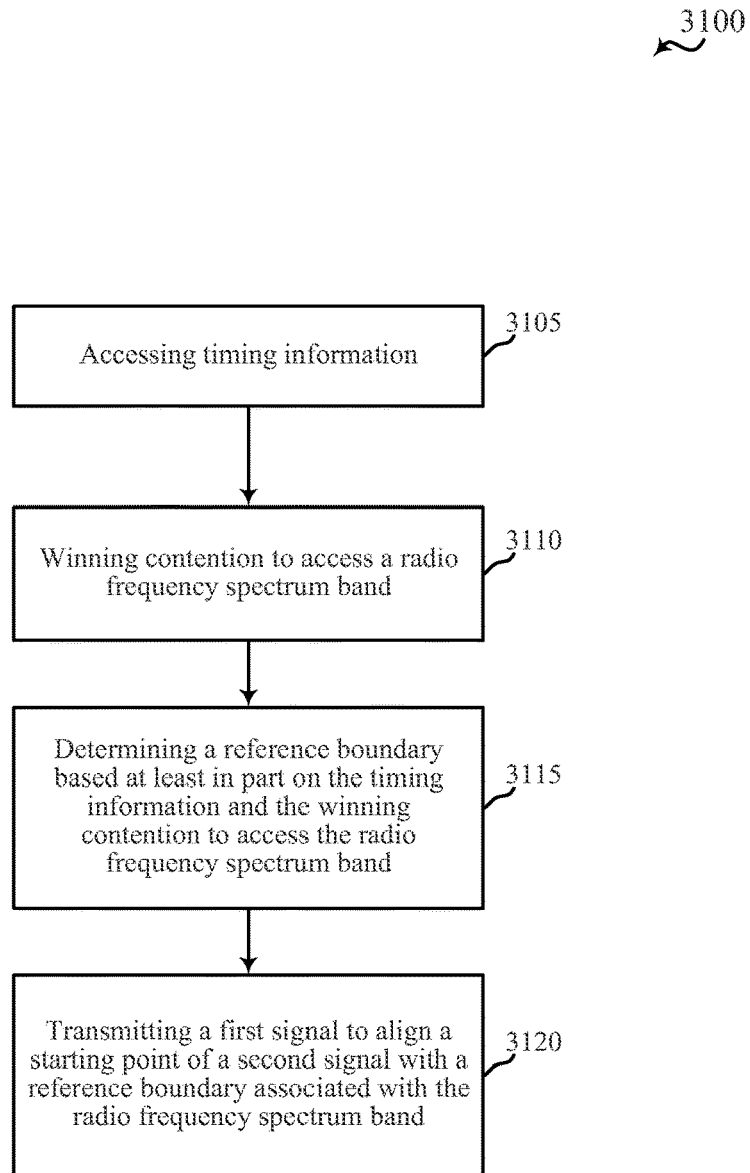
FIG. 31 is a flow chart illustrating an example of a method for wireless communication, in accordance with various aspects of the present disclosure.

FIG. 31 is a flow chart illustrating an example of a method 3100 for wireless communication, in accordance with various aspects of the present disclosure. For clarity, the method 3100 is described below with reference to aspects of one or more of the base stations **105, 205, 205-*a*, and/or 2505 described with reference to FIGS. 1, 2, and/or 25, aspects of one or more of the UEs 115, 215, 215-*a*, 215-*b*, 215-*c*, and/or 2615 described with reference to FIGS. 1, 2, and/or 26, and/or aspects of one or more of the apparatuses 1705, 2005, and/or 2105 described with reference to FIGS. 17, 20, and/or 21**. In some examples, a base station, UE, and/or apparatus may execute one or more sets of codes to control the functional elements of the base station, UE, and/or apparatus to perform the functions described below.

At block 3105, the method 3100 may include accessing timing information. The timing information may include, for example, a timing of one or more reference boundaries associated with a radio frequency spectrum band. The radio frequency spectrum band may be a radio frequency spectrum band for which apparatuses may need to contend for access because the radio frequency spectrum band is available for unlicensed use, such as Wi-Fi use. The radio frequency spectrum band may also be a licensed radio frequency spectrum band which a plurality of mobile network operators are authorized to access. The operation(s) at block 3105 may be performed using the wireless communication management module 1720, 2020, 2120, 2560, and/or 2660 described with reference to FIGS. 17, 20, 21, 25, and/or 26, and/or the timing information access module 2135 described with reference to FIG. 21.

At block 3110, the method 3100 may include winning contention to access a radio frequency spectrum band. The radio frequency spectrum band may be a radio frequency spectrum band for which apparatuses may need to contend for access because the radio frequency spectrum band is available for unlicensed use, such as Wi-Fi use. The radio frequency spectrum band may also be a licensed radio frequency spectrum band which a plurality of mobile network operators are authorized to access. The operation(s) at block 3110 may be performed using the wireless communication management module 1720, 2020, 2120, 2560, and/or 2660 described with reference to FIGS. 17, 20, 21, 25, and/or 26, and/or the contention management module 2035 and/or 2140 described with reference to FIGS. 20 and/or 21.

At block 3115, the method 3100 may include determining a reference boundary (e.g., a reference boundary occurring after the winning contention to access the radio frequency spectrum band) associated with the radio frequency spectrum band, based at least in part on the timing information and the winning contention to access the radio frequency spectrum band. The operation(s) at block 3115 may be performed using the wireless communication management module 1720, 2020, 2120, 2560, and/or 2660 described with reference to FIGS. 17, 20, 21, 25, and/or 26, and/or the reference boundary determination module 2145 described with reference to FIG. 21.

After the winning contention to access the radio frequency spectrum band, and at block 3120, the method 3100 may include transmitting a first signal to align a starting point of a second signal with the determined reference boundary associated with the radio frequency spectrum band. In some examples, the first signal may be transmitted before the second signal. The operation(s) at block 3120 may be performed using the wireless communication management module 1720, 2020, 2120, 2560, and/or 2660 described with reference to FIGS. 17, 20, 21, 25, and/or 26, and/or the alignment signal transmission module 2040 and/or 2150 described with reference to FIGS. 20 and/or 21.

In some examples of the method 3100, the first signal may include a variable length training sequence. The variable length training sequence may, in some examples, include one or more transmission units of fixed duration. In other examples of the method 3000, the first signal may include a variable length training sequence and at least one fixed length training sequence.

In some examples of the method 3100, the second signal may include a signal indicating the winning contention to access the radio frequency spectrum band (e.g., a CUBS). In other examples of the method 3000 (e.g., examples in which a transmitting apparatus is operating in an LBT-LBE mode of operation in the radio frequency spectrum band), the second signal may include a data transmission.

In examples of the method 3100, the reference boundary may include a boundary of an OFDM symbol period. In these examples, a contention procedure may be performed in accordance with a contention priority during the OFDM symbol period. The contention priority may determine when an apparatus (e.g., a base station or UE performing the method 3100) performs a contention procedure within the OFDM symbol period associated with the radio frequency spectrum band. Thus, the contention priority may provide, to an apparatus that performs the contention procedure earlier in time, a preference for winning the contention procedure over an apparatus that performs the contention procedure later in time. In some examples of the method 3100, the first signal may be associated with the contention priority of its transmitting apparatus (e.g., a base station or UE performing the method 3100), such that the first signal is transmitted during a portion of the OFDM symbol period based at least in part on the contention priority. Thus, for example, the first signal may be transmitted over a greater portion of the OFDM symbol period when the first signal is associated with a contention priority that allows an apparatus to perform a contention procedure earlier within the OFDM symbol period. Similarly, and by way of further example, the first signal may be transmitted over a smaller portion of the OFDM symbol period when the first signal is associated with a contention priority that allows an apparatus to perform a contention procedure later within the OFDM symbol period.

In some examples, the reference boundary may include a boundary of a slot of a frame associated with the radio frequency spectrum band and/or a boundary of a subframe of a frame associated with the radio frequency spectrum band.

In some examples, the method 3100 may include transmitting information as part of the first signal. The information may include, for example, AGC information and/or a phase reference for the second signal.

In some examples of the method 3100, the first signal and/or the second signal may be transmitted using a plurality of interleaved resource blocks. Transmitting the first signal and/or the second signal in this manner may enable the first signal and/or the second signal to occupy at least a certain percentage of the available frequency bandwidth in the radio frequency spectrum band and/or satisfy one or more regulatory requirements (e.g., a requirement that the first signal and/or second signal occupy at least 80% of the available frequency bandwidth).

Thus, the method 3100 may provide for wireless communication. It should be noted that the method 3100 is just one implementation and that the operations of the method 3100 may be rearranged or otherwise modified such that other implementations are possible.

Figure 32:
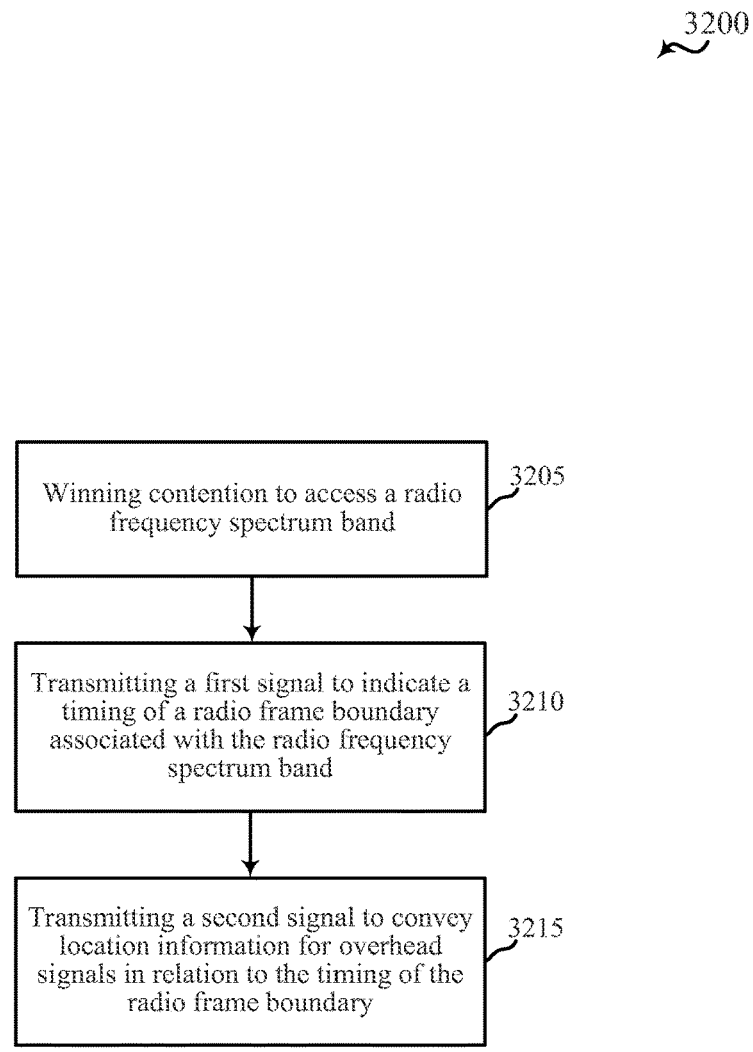
FIG. 32 is a flow chart illustrating an example of a method for wireless communication, in accordance with various aspects of the present disclosure.

FIG. 32 is a flow chart illustrating an example of a method 3200 for wireless communication, in accordance with various aspects of the present disclosure. For clarity, the method 3200 is described below with reference to aspects of one or more of the base stations 105, 205, 205-*a*, and/or 2505 described with reference to FIGS. 1, 2, and/or 25, aspects of one or more of the UEs 115, 215, 215-*a*, 215-*b*, 215-*c*, and/or 2615 described with reference to FIGS. 1, 2, and/or 26, and/or aspects of one or more of the apparatuses 1705, 2005, and/or 2205 described with reference to FIGS. 17, 20, and/or 22. In some examples, a base station, UE, and/or apparatus may execute one or more sets of codes to control the functional elements of the base station, UE, and/or apparatus to perform the functions described below.

At block 3205, the method 3200 may include winning contention to access a radio frequency spectrum band. The radio frequency spectrum band may be a radio frequency spectrum band for which apparatuses may need to contend for access because the radio frequency spectrum band is available for unlicensed use, such as Wi-Fi use. The radio frequency spectrum band may also be a shared licensed radio frequency spectrum band which a plurality of mobile network operators are authorized to access. The operation(s) at block 3205 may be performed using the wireless communication management module 1720, 2020, 2220, 2560, and/or 2660 described with reference to FIGS. 17, 20, 22, 25, and/or 26, and/or the contention management module 2035 and/or 2235 described with reference to FIGS. 20 and/or 22. In some examples, the winning contention to access the radio frequency spectrum band may be achieved while operating in an LBT-LBE mode of operation over the radio frequency spectrum band.

After the winning contention to access the radio frequency spectrum band, and at block 3210, the method 3200 may include transmitting a first signal to indicate a timing of a radio frame boundary associated with the radio frequency spectrum band. The operation(s) at block 3210 may be performed using the wireless communication management module 1720, 2020, 2220, 2560, and/or 2660 described with reference to FIGS. 17, 20, 22, 25, and/or 26, the alignment signal transmission module 2040 and/or 2255 described with reference to FIGS. 20 and/or 22, and/or the reference boundary determination module 2250 described with reference to FIG. 22.

At block 3215, the method 3200 may include transmitting a second signal to convey location information for overhead signals in relation to the timing of the radio frame boundary. In some examples, the second signal may include RRC signaling. In some examples, the second signal may convey location information for a downlink control channel in relation to the radio frame boundary. In some examples, the second signal may convey location information for resources used for CSI feedback. The operation(s) at block 3215 may be performed using the wireless communication management module 1720, 2020, 2220, 2560, and/or 2660 described with reference to FIGS. 17, 20, 22, 25, and/or 26, and/or the location information transmission module 2260 described with reference to FIG. 22.

In some examples of the method 3200, the first signal may include the second signal (e.g., the first signal may be a CUBS that conveys the location information for overhead signals in relation to the timing of the radio frame boundary).

Figure 33:
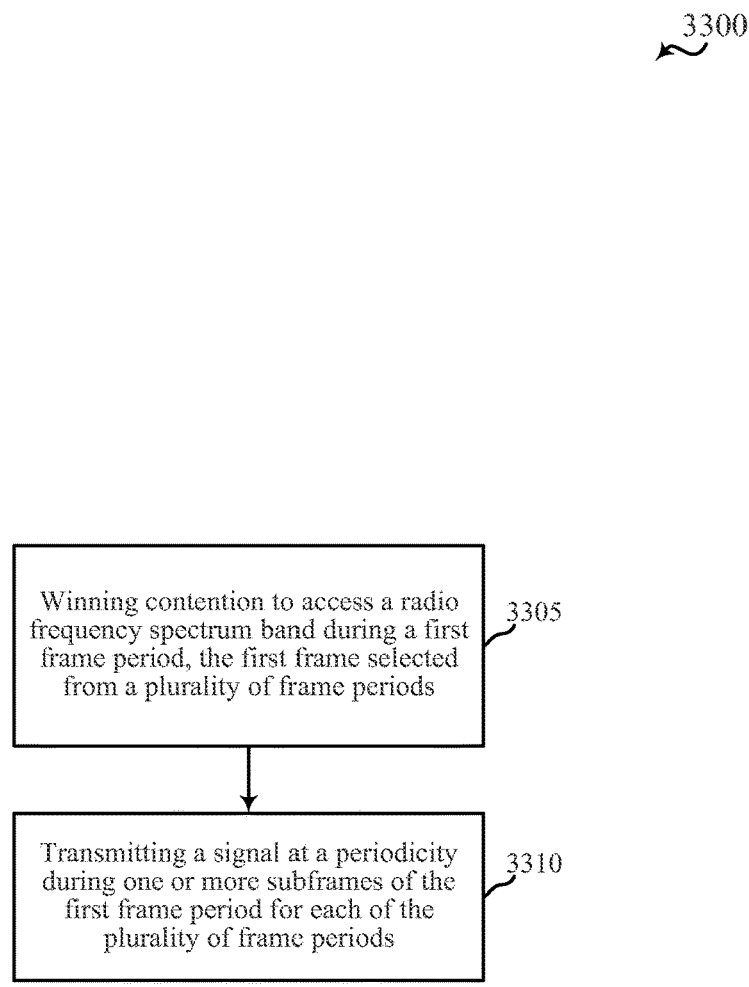
FIG. 33 is a flow chart illustrating an example of a method for wireless communication, in accordance with various aspects of the present disclosure.

FIG. 33 is a flow chart illustrating an example of a method 3300 for wireless communication, in accordance with various aspects of the present disclosure. For clarity, the method 3300 is described below with reference to aspects of one or more of the base stations 105, 205, 205-*a*, and/or 2505 described with reference to FIGS. 1, 2, and/or 25, aspects of one or more of the UEs 115, 215, 215-*a*, 215-*b*, 215-*c*, and/or 2615 described with reference to FIGS. 1, 2, and/or 26, and/or aspects of one or more of the apparatuses 1705, 2305, and/or 2405 described with reference to FIGS. 17, 23, and/or 24. In some examples, a base station, UE, and/or apparatus may execute one or more sets of codes to control the functional elements of the base station, UE, and/or apparatus to perform the functions described below.

At block 3305, the method 3300 may include winning contention to access a radio frequency spectrum band during a first frame period. The first frame period may be selected from a plurality of different frame periods (e.g., from a plurality of different frame periods having durations of two milliseconds, five milliseconds, and/or ten milliseconds). In some examples, the first frame period may be an LBT radio frame period. In some examples, each of the plurality of different frame periods may be an LBT radio frame period. The radio frequency spectrum band may be a radio frequency spectrum band for which apparatuses may need to contend for access because the radio frequency spectrum band is available for unlicensed use, such as Wi-Fi use. The radio frequency spectrum band may also be a shared licensed radio frequency spectrum band which a plurality of mobile network operators are authorized to access. The operation(s) at block 3305 may be performed using the wireless communication management module 1720, 2320, 2420, 2560, and/or 2660 described with reference to FIGS. 17, 23, 24, 25, and/or 26, and/or the contention management module 2335 and/or 2440 described with reference to FIGS. 23 and/or 24.

At block 3310, the method 3300 may include transmitting a signal at a periodicity during one or more subframes of the first frame period for each of the plurality of different frame periods. In some examples, the periodicity may be a fixed periodicity and/or the signal may be transmitted at a fixed time and/or a fixed frequency location, as described, for example, with reference to FIG. 16. The operation(s) at block 3310 may be performed using the wireless communication management module 1720, 2320, 2420, 2560, and/or 2660 described with reference to FIGS. 17, 23, 24, 25, and/or 26, and/or the signal transmission module 2340 and/or 2450 described with reference to FIGS. 23 and/or 24.

In some examples, the signal may be transmitted in an overhead channel, and the overhead channels may include a CRS, eCRS, CSI-RS, synchronization signal, and/or an SIB broadcast channel.

Thus, the method 3300 may provide for wireless communication. It should be noted that the method 3300 is just one implementation and that the operations of the method 3300 may be rearranged or otherwise modified such that other implementations are possible.

Figure 34:
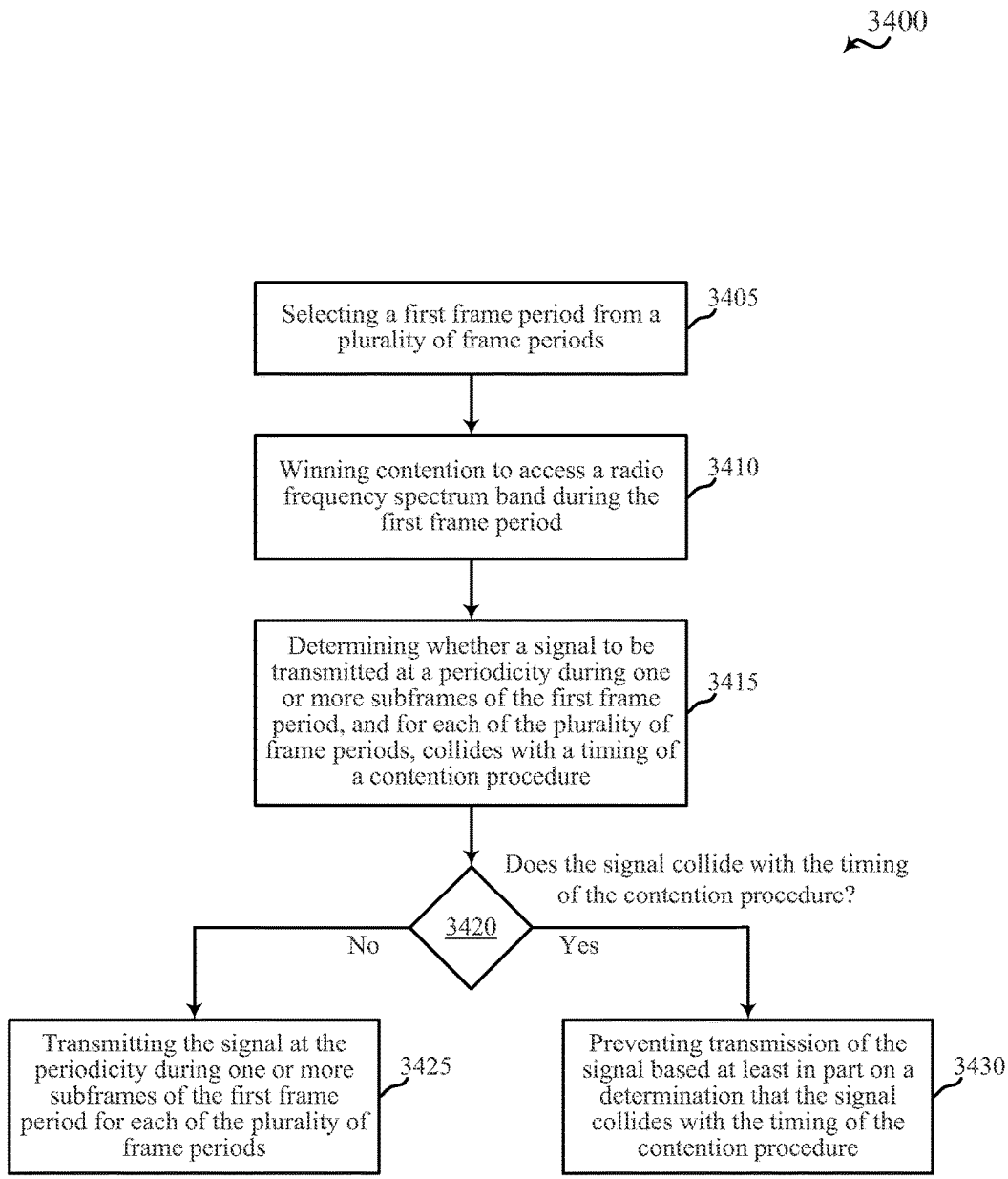
FIG. 34 is a flow chart illustrating an example of a method for wireless communication, in accordance with various aspects of the present disclosure.

FIG. 34 is a flow chart illustrating an example of a method 3400 for wireless communication, in accordance with various aspects of the present disclosure. For clarity, the method 3400 is described below with reference to aspects of one or more of the base stations 105, 205, 205-a, and/or 2505 described with reference to FIGS. 1, 2, and/or 25, aspects of one or more of the UEs 115, 215, 215-a, 215-b, 215-c, and/or 2615 described with reference to FIGS. 1, 2, and/or 26, and/or aspects of one or more of the apparatuses 1705, 2305, and/or 2405 described with reference to FIGS. 17, 23, and/or 24. In some examples, a base station, UE, and/or apparatus may execute one or more sets of codes to control the functional elements of the base station, UE, and/or apparatus to perform the functions described below.

At block 3405, the method 3400 may include selecting a first frame period from a plurality of different frame periods (e.g., from a plurality of different frame periods having durations of two milliseconds, five milliseconds, and/or ten milliseconds). In some examples, the first frame period may be an LBT radio frame period. In some examples, each of the plurality of different frame periods may be an LBT radio frame period. The operation(s) at block 3405 may be performed using the wireless communication management module 1720, 2320, 2420, 2560, and/or 2660 described with reference to FIGS. 17, 23, 24, 25, and/or 26, and/or the frame period selection module 2435 described with reference to FIG. 24.

At block 3410, the method 3400 may include winning contention to access a radio frequency spectrum band during the first frame period. The unlicensed radio frequency spectrum band may be a radio frequency spectrum band for which apparatuses may need to contend for access because the radio frequency spectrum band is available for unlicensed use, such as Wi-Fi use. The radio frequency spectrum band may also be a shared licensed radio frequency spectrum band which a plurality of mobile network operators are authorized to access. The operation(s) at block 3410 may be performed using the wireless communication management module 1720, 2320, 2420, 2560, and/or 2660 described with reference to FIGS. 17, 23, 24, 25, and/or 26, and/or the contention management module 2335 and/or 2440 described with reference to FIGS. 23 and/or 24.

At block 3415, the method 3400 may include determining whether a signal to be transmitted at a periodicity during one or more subframes of the first frame period, and for each of the plurality of different frame periods, collides with a timing of a contention procedure. When it is determined that the signal does not collide with the timing of the contention procedure, block 3420 may direct the flow of the method 3400 to block 3425. When it is determined that the signal collides with the timing of the contention procedure, block 3420 may direct the flow of the method 3400 to block 3430. The operation(s) at block 3415 and/or block 3420 may be performed using the wireless communication management module 1720, 2320, 2420, 2560, and/or 2660 described with reference to FIGS. 17, 23, 24, 25, and/or 26, and/or the signal collision detection module 2445 described with reference to FIG. 24.

At block 3425, the method 3400 may include transmitting a signal at a periodicity during one or more subframes of the first frame period, and for each of the plurality of different frame periods. In some examples, the periodicity may be a fixed periodicity and/or the signal may be transmitted at a fixed time and/or a fixed frequency location, as described, for example, with reference to FIG. 16. The operation(s) at block 3425 may be performed using the wireless communication management module 1720, 2320, 2420, 2560, and/or 2660 described with reference to FIGS. 17, 23, 24, 25, and/or 26, and/or the signal transmission module 2340 and/or 2450 described with reference to FIGS. 23 and/or 24.

In some examples, the signal may be transmitted in an overhead channel, and the overhead channels may include a CRS, eCRS, CSI-RS, synchronization signal, and/or an SIB broadcast channel.

At block 3430, the method 3400 may include preventing transmission of the signal based at least in part on a determination that the signal collides with the timing of the contention procedure, as described, for example, with reference to FIG. 16. The operation(s) at block 3430 may be performed using the wireless communication management module 1720, 2320, 2420, 2560, and/or 2660 described with reference to FIGS. 17, 23, 24, 25, and/or 26, and/or the signal transmission module 2340 and/or 2450 described with reference to FIGS. 23 and/or 24.

Thus, the method 3400 may provide for wireless communication. It should be noted that the method 3400 is just one implementation and that the operations of the method 3400 may be rearranged or otherwise modified such that other implementations are possible.

In some examples, aspects of one or more of the methods 2700, 2800, 2900, 3000, 3100, 3200, 3300, and/or 3400 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
    winning contention during a first symbol period to access a radio frequency spectrum band; and
    after the winning contention to access the radio frequency spectrum band, transmitting, during the first symbol period, a first signal to align a starting point of a second signal in a second symbol period with a reference boundary at an ending point of the first symbol period, the second symbol period beginning subsequent to the first symbol period and following the reference boundary, the reference boundary associated with the radio frequency spectrum band, wherein the first signal comprises a variable length sequence.

2. The method of claim 1, wherein the radio frequency spectrum band comprises an unlicensed radio frequency spectrum band.

3. The method of claim 1, further comprising:
    accessing timing information; and
    determining the reference boundary based at least in part on the timing information and the winning contention to access the radio frequency spectrum band.

4. The method of claim 1, wherein the variable length sequence comprises a variable length training sequence.

5. The method of claim 1, wherein the first signal further comprises at least one fixed length training sequence.

6. The method of claim 1, further comprising:
    operating in a listen before talk (LBT)-load based equipment (LBE) mode of operation in the radio frequency spectrum band.

7. The method of claim 1, wherein the second signal comprises a beacon signal.

8. The method of claim 1, wherein the reference boundary comprises a boundary of an orthogonal frequency-division multiplexing (OFDM) symbol period associated with the radio frequency spectrum band.

9. The method of claim 8, wherein the first signal is associated with a contention priority, and wherein the first signal is transmitted during a portion of the OFDM symbol period based at least in part on the contention priority.

10. An apparatus for wireless communications, comprising:
    a processor;
    memory in electronic communication with the processor; and
    instructions stored in the memory, the instructions being executable by the processor to:
    win contention during a first symbol period to access a radio frequency spectrum band; and
    after winning contention to access the radio frequency spectrum band, transmit, during the first symbol period, a first signal to align a starting point of a second signal in a second symbol period with a reference boundary at an ending point of the first symbol period, the second symbol period beginning subsequent to the first symbol period and following the reference boundary, the reference boundary associated with the radio frequency spectrum band, wherein the first signal comprises a variable length sequence.

11. The apparatus of claim 10, wherein the second signal comprises a beacon signal.

\* \* \* \* \*